US005768505A

United States Patent [19]
Gilchrist et al.

[11] Patent Number: 5,768,505
[45] Date of Patent: Jun. 16, 1998

[54] OBJECT ORIENTED MAIL SERVER FRAMEWORK MECHANISM

[75] Inventors: Frank William Gilchrist; Eric Nels Herness; Eric H. Jenney; John Christopher Ripstra; George James Romano, all of Rochester, Minn.

[73] Assignee: International Business Machines Corporation, Armonk, N.Y.

[21] Appl. No.: 574,820

[22] Filed: Dec. 19, 1995

[51] Int. Cl.$^6$ ............................................. G06F 15/16
[52] U.S. Cl. ........................... 395/200.31; 395/200.32; 395/200.33
[58] Field of Search .................. 395/200.33, 200.6, 395/200.76, 683, 285; 370/401

[56] References Cited

U.S. PATENT DOCUMENTS

| | | | |
|---|---|---|---|
| 4,943,932 | 7/1990 | Lark et al. | 364/513 |
| 5,057,996 | 10/1991 | Cutler et al. | 364/200 |
| 5,101,364 | 3/1992 | Davenport et al. | 395/152 |
| 5,119,475 | 6/1992 | Smith et al. | 395/156 |
| 5,181,162 | 1/1993 | Smith et al. | 364/419 |
| 5,195,172 | 3/1993 | Elad et al. | 395/50 |
| 5,226,161 | 7/1993 | Khoyi et al. | 395/650 |
| 5,247,693 | 9/1993 | Bristol | 395/800 |
| 5,249,270 | 9/1993 | Stewart et al. | 395/200 |
| 5,257,384 | 10/1993 | Farrand et al. | 395/725 |
| 5,261,080 | 11/1993 | Khoyi et al. | 395/500 |
| 5,274,572 | 12/1993 | O'Neill et al. | 364/550 |
| 5,276,775 | 1/1994 | Meng | 395/55 |
| 5,283,856 | 2/1994 | Gross et al. | 395/51 |
| 5,287,447 | 2/1994 | Miller et al. | 395/157 |
| 5,293,470 | 3/1994 | Birch et al. | 395/135 |
| 5,297,283 | 3/1994 | Kelly, Jr. et al. | 395/650 |
| 5,315,703 | 5/1994 | Matheny et al. | 395/164 |
| 5,367,633 | 11/1994 | Matheny et al. | 395/164 |
| 5,369,766 | 11/1994 | Nakano et al. | 395/700 |
| 5,379,430 | 1/1995 | Nguyen | 395/700 |
| 5,388,264 | 2/1995 | Tobias, II et al. | 395/650 |
| 5,390,325 | 2/1995 | Miller | 395/575 |
| 5,396,626 | 3/1995 | Nguyen | 395/700 |
| 5,398,336 | 3/1995 | Tantry et al. | 395/600 |
| 5,424,724 | 6/1995 | Williams et al. | 340/825.05 |
| 5,438,660 | 8/1995 | Lee et al. | 395/155 |
| 5,500,929 | 3/1996 | Dickinson | 395/160 |
| 5,544,297 | 8/1996 | Milne et al. | 395/154 |
| 5,590,178 | 12/1996 | Murakami et al. | 379/96 |
| 5,611,031 | 3/1997 | Hertzfeld et al. | 395/133 |
| 5,625,818 | 4/1997 | Zarmer et al. | 395/615 |
| 5,627,997 | 5/1997 | Pearson et al. | 395/500 |

OTHER PUBLICATIONS

Distributed Object Framework Overview. http://edhs1.gsfc.nasa.gov:8001/waisdata/pdr/cd3050302563/txt Mar. 21, 1995.

Communication Tools. http://www.wrmdesign.com/net-tools/research/watk4.html Oct. 5, 1995 pp. 1–15.

Ware Myers, "Taligent's CommonPoint: The Promise of Objects", IEEE Computer, Mar. 1995, pp. 78–83.

(List continued on next page.)

*Primary Examiner*—Mehmet B. Geckil
*Attorney, Agent, or Firm*—David A. Hall

[57] ABSTRACT

A framework for use with object-oriented programming systems provides a common message processing system structure that can be placed on any OOP platform and be configured to support any e-mail message protocol standard or specific mail server function. The framework defines an e-mail message as a number of distinct objects, each of which contains information that describes some portion of the message. All messages received by a system in which the framework is implemented are defined on this core object structure. Another set of objects and methods define the processing steps required for a mail server to process a message. A message is received as a class of message objects, which are assigned a message type that determines the subsequent processing steps to which the message object is subjected. As a message is processed, the objects of which it is comprised are changed, so that the message processing can be interrupted and then resumed without loss or duplication of processing steps.

92 Claims, 34 Drawing Sheets

OTHER PUBLICATIONS

Text of *IBM Technical Disclosure Bulletin*, vol. 37, DeBinder et al., Feb. 1994, "Results Folder Framework", pp. 431–432.

Text of *IBM Technical Disclosure Bulletin*, vol. 36, Coskun, N., Jun. 1993, "Persistent Framework Independent Record/Playback Framework", pp. 261–264.

Text of *IBM Technical Disclosure Bulletin*, Baker et al., Oct. 1991, "Model View Schema", pp. 321–322.

Text of *IBM Technical Disclosure Bulletin*, Baker et al., Oct. 1991, "Office Container Class", pp. 309–310.

Text of *IBM Technical Disclosure Bulletin*, Cavendish et al., Jul. 1991, "Icon Pane Class", pp. 118–119.

Text of *IBM Technical Disclosure Bulletin*, Baker et al., Jun. 1991, "Distribution List Class", p. 159.

Text of *IBM Technical Disclosure Bulletin*, Cavendish et al., Jun. 1991, "Object–Oriented Documentation Tool", pp. 50–51.

Text of *IBM Technical Disclosure Bulletin*, Allard et al., Feb. 1990, "Object–Oriented Programming in C—the Linnaeus System", pp. 437–439.

Text of *IBM Technical Disclosure Bulletin*, vol. 38, No. 1, Jan. 1995, pp. 411–414, J. Knapman "Generating Specific Server Programs in Distributed Object–Oriented Customer Information Control System".

Text of *IBM Technical Disclosure Bulletin*, vol. 37, No. 12, Dec. 1994, pp. 19–20, Al–Karmi et al., "Events Set for Event Tracing in Distributed Object–Oriented Systems".

Text of *IBM Technical Disclosure Bulletin*, vol. 37, No. 12, Dec. 1994, pp. 375–378, Acker et al., "Automatically Generating Formatted Documentation for Object–Oriented Class Libraries".

Text of *IBM Technical Disclosure Bulletin*, vol. 37, No. 11, Nov. 1994, pp. 71–72, Behrs et al., "Device Support Framework to Support ISO DPA 10175 and POSIX 1387.4".

Text of *IBM Technical Disclosure Bulletin*, vol. 37, No. 7, Jul. 1994, pp. 145–146, Banda et al., "Exception Management Algorithm for Multi–Threaded Method Invocation".

Text of *IBM Technical Disclosure Bulletin*, vol. 37, No. 6B, Jun. 1994, pp. 553–556, Gest et al., "Portable Object–Oriented Event Manager".

Abstract for WIPO Patent Application No. WO 95/04966, F.T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentations with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object Oriented Application Processing Apparatus".

Abstract from WIPO Patent Application No. WO 9422081, Sep. 29, 1994, "Hardware–Independent Interface for Interrupt Processing", G.O. Norman et al.

Abstract for WIPO Patent Application No. 94/19752, Anderson et al., Sep. 1, 1994, "Concurrent Framework Processing Apparatus For Two or More Users".

Abstract for WIPO Patent Application No. 94/19751, Anderson et al., Sep. 1, 1994, "Concurrent Framework Processing Apparatus For Application Users".

Abstract for WIPO Patent Application No. 94/19740, Goldsmith et al., Sep. 1, 1994 "Framework Processor of Object–Oriented Application".

Abstract for WIPO Patent Application No. 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract from WIPO Patent Application No. WO 9415285, Jul. 7, 1994, "Object–Oriented Notification Framework System", D.R. Anderson et al.

Abstract for U.S. Patent No. 5,119,475, Schoen et al., Jun. 2, 1992, "Object–Oriented Framework for Menu Definition".

Abstract No. 95–091003/12, "Flexible Multi–Platform Partitioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract for WIPO Patent Application No. 95/04967, Feb. 16, 1995, "Access Method to Data Held in Primary Memory Based Data Base".

Abstract for WIPO Patent Application No. 95/02210, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Application No. EP 622730, "Encapsulation of Extracted Portions of Documents Into Objects", M.A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9504–7460–042, Coleman et al., 1995, "An End–To–End Simulation of A Surveillance System Employing Architecture Independence, Variable Fidelity Components and Software Reuse".

Inspec Abstract No. C9503–6140D–045, Satoh et al., 1995, "Process Algebra Semantics for a Real Time Object Oriented Programming Language".

Inspec Abstract No. C9501–7160–020, C. Le Pape, 1993, "The Cost of Genericity: Experiments With Constraint-Based Representations of Time–Tables".

Inspec Abstract No. C9501–6140D005, S. Vinoski, 1994, "Mapping CORBA IDL Into C++".

Inspec Abstract No. C9501–7330–007, Salminen et al., 1994, "Modelling Trees Using an Object–Oriented Scheme".

Inspec Abstract No. C9412–6110B–221, Berghel et al., 1992, "A Generic Object–Oriented Concurrency Mechanism for Extensibility and Reuse of Synchronization Components".

Inspec Abstract No. B9412–6210Q–016, from Qingzhong et al., 1992, "An Object–Oriented Model for Intelligent Networks".

Inspec Abstract No. C9412–7810–003, from Jung et al., 1993, "Development of an Object–Oriented Anthropometric Database for an Ergonomic Man Model".

Inspec Abstract No. C9412–6110J–014 from Griss et al., 1994, "Object–Oriented Reuse".

Inspec Abstract No. C9411–6130B–108, from Mili et al., 1992, "Building a Graphical Interface for a Reuse–Oriented CASE Tool".

Inspec Abstract No. C9411–7100–029 from C. Le Pape, 1994, "Implementation of Resource Constraints in ILOG Schedule: A Library for the Development of Constraint–Based Scheduling Systems".

Inspec Abstract No. C9411–6115–035 from Mili et al., 1991, "SoftClass: An Object–Oriented Tool for Software–Reuse".

Inspec Abstract No. C9410–6180G–015, from Eichelberg et al., 1993, "Integrating Interactive 3D–Graphics into an Object–Oriented Application Framework".

Inspec Abstract No. B9409–6210M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., 1994, "An Experimental Study of Using Reusable Software Design Frameworks to Achieve Software Reuse".

Inspec Abstract No. C9408–7420–021, from Pirklbauer et al., 1994, "Object–Oriented Process Control Software".

Inspect Abstract No. C9408–6110J–011 from Gyu–Chung et al., 1993, "System Methodologies of Object–Oriented Programs".

Inspec Abstract No. C9407–7420D–045, from Desai et al., 1994, "Controller Structure Definition Via Intelligent Process Control".

Inspec Abstract No. C9407–6140D–014, from Satoh et al., 1994, "Semantics for a Real–Time Object–Oriented Programming Language".

Inspec Abstract No. C9406–6150N–015, from Schmidt et al., 1994, "The Service Configurator Framework: An Extensible Architecture for Dynamically Configuring Concurrent, Multi–Service Network Daemons".

Inspec Abstract No. C9405–6180G–031, from Woyak et al., 1993, "A Motif–Like Object–Oriented Interface Framework Using PHIGS".

Inspec Abstract No. C9403–6180–027, 1991, "An Event–Object Recovery Model for Objected–Oriented User Interfaces" from Proceedings of ACMSymposium on User Interface Software & Technology.

Inspec Abstract No. C9504–6130B–049, from A. van Dam, 1995, "VR as a Forcing Function: Software Implications of a New Paradigm".

Inspec Abstract No. C9504–6140D–024, from Sheffler et al., 1995, "An Object–Oriented Approach to Nested Data Parallelism".

Inspec Abstract No. C9503–6110B–045, from Rosiene et al., 1995, "A Data Modeling Framework for Queueing Network Models".

Inspec Abstract No. B9503–8110B–023, from Mautref et al., 1995, "An Object–Oriented Framework for the Development of Interactive Decision Support Systems".

Inspec Abstract No. C9502–7160–026, from Menga et al., 1995, "An Object–Oriented Framework for Enterprise Modelling".

Inspec Abstract No. C9502–6130G–006, "Support for Enterprise Modelling in CSCW", P. Hennessy et al., 1994.

Inspec Abstract No. C9502–7810C–058, from Lin et al., 1995, "Can CAL Software Be More Like Computer Games?".

Inspec Abstract No. C9501–6115–039, from Elia et al., 1993, "G++: An Object Environment for Developing Distributed Applications".

Inspec Abstract No. C9412–7330–186 from Righter et al., 1994, "An Object–Oriented Characterization of Spatial Ecosystem Information".

Inspec Abstract No. C9412–6160J–025 from J. Iivari, 1994, "Object–Oriented Information Systems Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–7490–012, "A Discrete–Event Object–Oriented Modeling Environment for Sawmill Simulation".

Inspec Abstract No. C9406–6115–048, 1993, "Constructing Multi–View Editing Environments Using MViews".

Inspec Abstract No.4664213, "Maintaining Information about Persistent Replicated Objects in a Distributed System"., 1993 IEEE Conference on Distributed Computing Systems.

Inspec Abstract No. C9406–6110J–029, "A Comparison of Object–Oriented Analysis and Design Methods", Proceedings of C++ World 1993.

Inspec Abstract No. C9406–0310F–011, 1993, "Cost–Benefit Analysis of Object–Oriented Technology".

Inspec Abstract No. C9406–6110J–009, from, J.D. Grimes, 1993, "Objects 101—An Implementation View", Proceedings of C++World 1993.

Inspec Abstract No. 4647921, from Uhorchak et al., 1993, "An Object–Oriented Class Library for Creating Engineering Graphs Using PHIGS".

Inspec Abstract No. 4642214, from, Marshall et al., 1992, "Using VDM Within an Object–Oriented Framework".

Inspec Abstract No. 4626386, from Arora et al., 1993, "Building Diverse Environments with PCTE Workbench".

Inspec Abstract No. 4622794, from Campbell et al., 1993, "A Technique for Documenting the Framework of an Object–Oriented System".

Inspec Abstract No. 4618974, from Bowers, 1993, "Some Principles for the Encapsulation of the Behaviour of Aggregate Objects".

Inspec Abstract No. 461931, from, Islan et al., 1993, "Uniform Co–Scheduling Using Object–Oriented Design Techniques".

Inspec Abstract No. 4613481, from Thieme et al., 1993, "Schema Integration in Object–Oriented Databases".

Inspec Abstract No. 4603430, from G. Booch, 1994, "Designing an Application Framework".

Inspec Abstract No. 4596323, from Frank et al., 1993, "An Integrated Environment for Designing Object–Oriented Enterprise Models".

Inspec Abstract No. 4593721, Periyasamy et al, 1993, "A Formal Framework for Design and Verification of Robotic Agents".

Inspec Abstract No. 4588839, from L. Fisher, 1992, "Constructing a Class Library for Microsoft Windows".

Inspec Abstract No. 458834, from G. Olander, 1992, "Chembench: Redesign of a Large Commercial Application Using Object–Oriented Techniques".

Inspec Abstract No. 4566447, from J. Rossazza, 1992, "An Object–Centered Fuzzy Representation".

Inspec Abstract No. 4565630, from Karpovich et al., 1993, "A Parallel Object–Oriented Framework for Stencil Algorithms".

Inspec Abstract No. C9402–6150G–002, from Bruegge et al., 1993, "A Framework for Dynamic Program Analyzers".

Inspec Abstract No. 4550414, from Parrish et al., 1993, "Automated Flow Graph–Based Testing of Object–Oriented Software Modules".

Inspec Abstract No. 4540729, from Bailes et al., "The ecology of Class Refinement".

Inspec Abstract No. 4534334, from Campbell et al., 1991, "A Technique for Documenting the Framework of an Object–Oriented System".

Inspec Abstract No. 4534330, from Istavrinos et al., 1992, "Experiences with an Object–Oriented Mapper for Coherent Distributed Shared Memory".

Inspec Abstract No. 4528985, from Beneventano et al., 1993, "Taxonomic Reasoning with Cycles in LOGIDATA+".

Inspec Abstract No. 4525743, from Hakimzadeh et al., 1993, "Instance Variable Access Locking for Object–Oriented Databases".

Inspec Abstract No. 4512593, from H. Sakai, 1993, "A Method for Contract Design and Delegation in Object Behavior Modeling".

Inspec Abstract No. B9310–6210L–099, "Templates, Types and Classes in Open Distributed Processing", 1993.

Inspec Abstract No. 4459325, from Kesim et al., 1992, "On the Evolution of Objects in a Logic Programming Framework".

Inspec Abstract No. 4447153, from Klein et al., 1992, "An Object–Oriented Framework for Curves and Surfaces".

Inspec Abstract No. 4426852, from Benveniste et al., 1992, "Concurrent Programming Notations in the Object–Oriented Language Arche".

Inspec Abstract No. 4425343, from Demurjian et al., 1993, "Programming Versus Databases in Object–Oriented Paradigm".

Inspec Abstract No. 4417604, from Kraiem et al., 1992, "Mapping of Conceptual Specifications Into Object–Oriented Programs".

Inspec Abstract No. 4417563, from E. Maim, 1992, "Recognizing Objects from Constraints".

Inspec Abstract No. 4411998, from Yi Deng et al., 1992, "Unifying Multi–Paradigms in Software System Design".

Inspec Abstract No. 4408394, from Allen et al., 1992, "GEM: Global Event Management in CAD Frameworks".

Inspec. Abstract No. 4400350, from Y. Shoham, 1993, "Agent–Oriented Programming".

Inspec Abstract No. 4395549, from Hogstrom et al., 1992, "Portability and Data Structures in Scientific Computing–Object–Oriented Design of Utility Routines in Fortran".

Inspec Abstract No. 4391388, from Thomas et al., 1992, "A Generic Object–Oriented Concurrency Mechanism for Extensibility and Reuse of Synchronization Components".

Inspec Abstract No. 4387201, from Chu et al., 1992, "A Pattern Based Approach of Integrating Data and Knowledge to Support Cooperative Query Answering".

Inspec Abstract No. 4366189, from Holt, et al., 1992, "A Framework for Using Formal Methods in Object–Oriented Software Development".

Inspec Abstract No. 4356300, from Bertino et al., 1993, "Path–Index: An Approach to the Efficient Execution of Object–Oriented Queries".

Inspec Abstract No. 4341376, from Bertino et al., 1992, "Optimization of Object–Oriented Queries Using Path Indices".

Inspec Abstract No. 4331060, from Lau et al., 1992, "An Object–Oriented Class Library for Scalable Parallel Heuristic Search".

Inspec Abstract No. 4318465, from P. Madany, 1992, "Object–Oriented Framework for File Systems".

Inspec Abstract No. 4302722, from Eggenschwiler et al., 1992, "ET++SwapsManager: Using Object Technology in the Financial Engineering Domain".

Inspec Abstract No. 4298324, from S. Nichol, 1992, "Extending Turbo Vision".

Inspec Abstract No. 4297404, from Tanaka et al., 1992, "Two–Level Schemata and Generalized Links for Hypertext Database Models".

Inspec Abstract No. 4287814, from Natarajan et al., 1992, "Issues in Building Dynamic Real–Time Systems".

Inspec Abstract No. 4281362, from Marshall et al., 1991, "Using VDM within an Object–Oriented Framework".

Inspec Abstract No. 4275707, from Tsukamoto et al., 1991, "DOT: A Term Representation Using DOT Algebra for Knowledge–Bases".

Inspec Abstract No. 4275698, from Van den Bussche et al., 1991, "Evaluation and Optimization of Complex Object Selections".

Inspec Abstract No. 4275693, from Giannotti et al., 1991, "Non–Determinism in Deductive Databases".

Inspec Abstract No. 4270361, from Artale et al., 1991, "Introducing Knowledge Representation Techniques in Database Models".

Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++ Strategies".

Inspec Abstract No. 4258051, from Rundensteiner et al., 1992, "Set Operations in Object–Based Data Models".

Inspec Abstract No. 4244023, from George et al., 1991, "An Object–Oriented Data Model to Represent Uncertainty in Coupled Artificial Intelligence–Database Systems".

Inspec Abstract No. 4234438, from Madany et al., 1991, "Organizing and Typing Persistent Objects Within an Object–Oriented Framework".

Inspec Abstract No. 4152687, from M. Wolczko, 1992, "Encapsulation, Delegation and Inheritance in Object–Oriented Languages".

Inspec Abstract No. 4117514, from Wuwongse et al., 1991, "An Object–Oriented Approach to Model Management".

Inspec Abstract No. C94204–6110J–017, "Choices Frameworks and Refinement", R.H. Campbell et al., 1991.

Inspec Abstract No. 4090970, from P. Kougiouris, 1991, "Device Management Framework for an Object–Oriented Operating System".

Inspec Abstract No. 4077440, from A. Mahler, 1991, "Organizing Tools in a Uniform Environment Framework".

Inspec Abstract No. 4067033, from Shaw et al., 1990, "Experience with the ET++ Application Framework".

Inspec Abstract No. 4060084, from Muller et al., 1990, "ODICE: Object–Oriented Hardware Description in CAD environment".

Inspec Abstract No. 4050569, from Di Giovanni et al., 1990, "HOOD Nets".

Inspec Abstract No. C91072815, from Holtkamp et al., 1990, "DEMOM–A Description Based Media Object Data Model".

Inspec Abstract No. C91072016, from A. Lane, 1991, "/DOS/C++—Application Frameworks".

Inspec Abstract No. C91072574, from Hemery et al., "An Analysis of Communication and Multiprogramming in the Helios Operating System".

Inspec Abstract No. C91064787, from Madany et al., 1989, "A Class Hierarchy for Building Stream–Oriented File Systems".

Inspec Abstract No. C91064580, from Gamma et al., 1989, "Integration of a Programming Environment Into ET++—A Case Study".

Inspec Abstract No. C91058815, from Menga et al., 1990, "G++: An Environment for Object Oriented Analysis and Prototyping".

Inspec Abstract No. B91052096, from Cusack et al., 1990, "Object–Oriented Specification in LOTOS and Z, or My Cat Really is Object–Oriented!".

Inspec Abstract No. C91053475, from Queinnec et al., 1988, "An Open Ended Data Representation Model for EU–LISP".

Inspec Abstract No. C91053151, from E. Cusack, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. C91010951, from T. Helton, 1990, "Level5 Object".

Inspec Abstract No. B90075006, from Gossain et al., 1989, "Designing a Class Hierarchy for Domain Representation and Reusability".

Inspec Abstract No. C91003997, from J. Muys–Vasovic, 1989, "MacApp: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schrefl et al., 1988, "A Knowledge–Based Approach to Overcome Structural Differences in Object Oriented Database Integration".

Inspec Abstract No. C90047457, from Yokoyama et al., 1990, "A Constraint–Based and Object–Oriented Knowledge Representation".

Inspec Abstract No. C90034818, from Q. Chen, 1988, "Extending the Object–Oriented Paradigm for Supporting Complex Objects".

Inspec Abstract No. C90030609, from Forde et al., 1990, "Object–Oriented Finite Element Analysis".

Inspec Abstract No. C90007733, from Weinand et al., 1989, "Design and Implementation of ET++, A Seamless Object–Oriented Application Framework".

Inspec Abstract No. C89062837, from Pasquier–Boltuck et al., 1988, "Prototyping an Interactive Electronic Book System Using an Object–Oriented Approach".

Inspec Abstract No. C89056727, from Campbell et al., 1989, "Principles of Object–Oriented Operating System Design".

Inspec Abstract No. C89056859, from Hull et al., 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., 1988, "PO: An Object Model to Express Parallelism".

Inspec Abstract No. C89014870, from R. King, 1988, "Semantic and Object–Oriented Database Support for Software Environments".

Inspec Abstract No. 89003142, from Tenma et al., 1986, "A System for Generating Language–Oriented Editors".

Inspec Abstract No. C88013915, from Woelk et al., 1987, "Multimedia Information Management in an Object–Oriented Database System".

Inspec Abstract No. C88007447, from P. Allen, 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039588, from K. Fukunaga., 1985, "PROMPTER: A Knowledge Based Support Tool for Code Understanding".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

OBJECT ORIENTED MAIL SERVER FRAMEWORK MECHANISM

BACKGROUND OF THE INVENTION

1. Field of the Invention

The present invention relates generally to data processing and, more specifically, to object-oriented programming systems and processes.

2. Description of the Related Art

Electronic mail or "e-mail", as it is widely known, refers to messages that are sent from one computer user to another over interconnected computer networks. Computer systems that support e-mail facilitate such message transfer by providing a means for composing messages, transferring them from the message originator to the intended recipient, notifying the recipient and reporting to the originator upon message receipt, and placing messages in the proper format for transmission over the networks.

Early e-mail systems comprised terminal-to-terminal message transfer between users at a common computer site, or between users at different computer sites who used common data processing equipment. For example, some early e-mail systems used simple file transfer protocols for intra-network communication specifying predefined message header data fields that identified originators and recipients with respective network terminal nodes, followed by message text. Many modern e-mail systems support information types including ASCII text, analog facsimile (fax) data, digital fax data, digital voice data, videotex, and many others.

In response to the desire for inter-computer network communications, a variety of communication protocols evolved to define more versatile e-mail message systems. Two examples of network communications protocols are the Systems Network Architecture Distribution Services (SNADS) protocol specified for networks communicating according to the Systems Network Architecture specification of the International Business Machines Corporation (IBM Corporation) and what is known as the Simple Mail Transfer Protocol (SMTP). Other networks include the Message-Oriented Text Interchange Systems (MOTIS) standard developed by the International Organization for Standardization (ISO) and USENET, a Unix-based network protocol.

Mail server systems easily process messages that are composed according to the protocol of the mail server system, often referred to as the "native" protocol. Message transfer among users that communicate with different protocols typically must be routed through a network gateway processor that transforms the message from the foreign protocol to the native protocol. Thus, gateways that are used for message transfer among interconnected networks, such as over what is commonly referred to as the "Internet", accept e-mail messages from other gateways and from connected networks. Users on connected networks may be connected to the gateway via a local area network (LAN) connection. If a message is from another gateway, a check is made to determine if the recipient identified in the message is local. That is, the recipient might be a computer user on the LAN of the receiving gateway. If the recipient is local to the gateway, the message is delivered to a gateway network mailbox or other delivery mechanism where the message can be retrieved by the recipient. If the recipient is not local, then the message is sent on to another gateway. If a message is from an originator, that is, a gateway LAN user who has just created the message, then the message is checked for valid format and syntax. The message is then treated as a message received from another gateway, meaning it is sent on its way to the gateway of another network.

Thus, each gateway can include a computer network that operates in accordance with a native protocol. Each gateway can potentially be required to recognize (and determine appropriate information of) a message generated from a different protocol. For example, a SNADS-protocol gateway might receive a MOTIS-standard message. If the SNADS gateway is to move the message along toward its intended recipient, the gateway must first convert or transform the message into a SNADS protocol so the message can travel on the SNADS gateway network. The gateway that receives the message might have to make a similar conversion. Conversion between protocols can become difficult because features supported by one protocol might be unknown to another protocol. Also, one protocol might be based on a particular communications model that is different from another. For example, the SNADS system is based on a communication session (with concomitant message parameters) while the SMTP system model is not session based.

Many e-mail system gateways cannot efficiently perform the needed message processing tasks to convert between different message protocols. Moreover, many e-mail systems require extensive modification before they can support and manage protocols other than the ones for which they were originally designed. Thus, such systems will experience high maintenance costs as new protocols are developed or as the system users decide to utilize non-native protocols. It would be advantageous if e-mail system gateways could quickly and efficiently support and manage message processing between multiple protocols and adapt to new ones.

From the discussion above, it should be apparent that there is a need for an electronic mail inter-protocol gateway mechanism that can efficiently receive e-mail messages from a sending location in one protocol and transfer such messages to a destination location in another protocol, and that can adapt to new protocols so that messages in the new protocol can be received and transferred. The present invention satisfies this need.

SUMMARY OF THE INVENTION

In accordance with the present invention, a reusable object-oriented (OO) framework for use with object-oriented programming (OOP) systems provides a common message processing system structure that can be placed on any OOP platform and be configured to support any e-mail message protocol standard or specific mail server function. The message processing system structure is based on a set of defined object classes that form an object oriented framework. Framework users can easily tailor the framework to meet their requirements and provide a mail server system, thus reducing development and support costs related to client/server e-mail message processing. The design of the framework provides an object structure that defines messages in terms of standard constituent parts that, consistent with OOP features, define attributes and behaviors. In this way, message processing can be broken down into a series of sequential steps, or OOP object methods, that process specific parts of a message.

The series of sequential steps defined by the framework represent an architecturally neutral implementation of the mail server system. The framework defines an e-mail message as a number of distinct objects, each of which contains information that describes some portion of the message. All messages received by a system in which the framework is implemented can be defined on this core object structure. Another set of objects and methods define the processing steps required for a mail server to process a message. A message is received as a class of message objects, which are assigned a message type that determines the subsequent processing steps to which the message object is subjected. For example, a message might be assigned to be a SNADS-class message type or an SMTP-class message type. As a message is processed, the objects of which it is comprised are changed, so that the message processing can be interrupted and then resumed without loss or duplication of processing steps.

Because the mail server processing system is provided as an OOP framework, object methods that process message objects corresponding to particular e-mail protocols can be easily integrated into an implementation of the framework without changing the mail server system. Framework users are assured that e-mail function object methods defined on the framework structure of classes and subclasses will operate with the core framework objects and methods to process messages in the desired manner. In this way, a framework user can define object methods that process new e-mail protocols to tailor the mail server system to their particular requirements without modifying the entire system and without recompiling the system programming. This reduces the time and cost needed to implement specific mail server changes to an e-mail gateway system.

Other features and advantages of the present invention should be apparent from the following description of the preferred embodiment, which illustrates, by way of example, the principles of the invention.

DESCRIPTION OF THE PREFERRED EMBODIMENT

Figure 1:
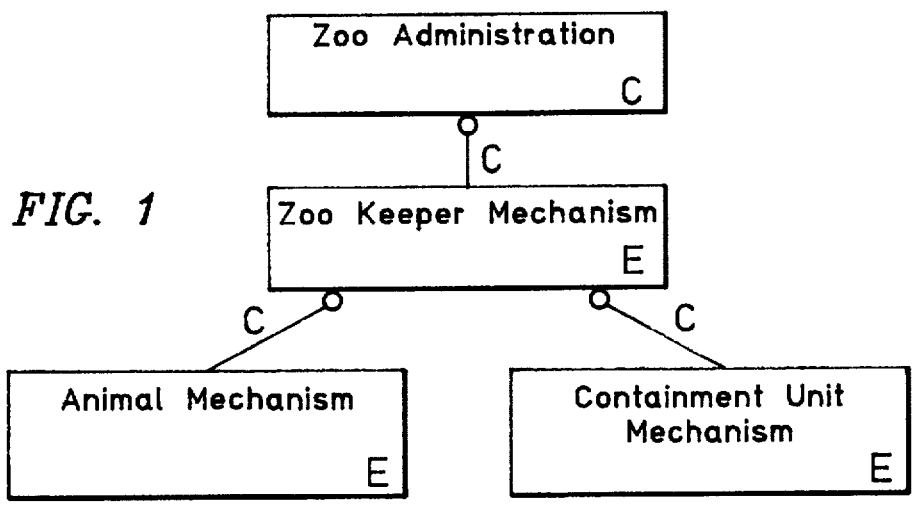
FIG. 1 is a category diagram of an exemplary Zoo Administration framework that illustrates the principles implemented by the system of the present invention.

Overview
Object Oriented Technology

As discussed in the Summary section, the present invention was developed using Object-Oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-Oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Stated another way, OO technology is significantly different from procedural technology because problems are broken down into sets of cooperating objects instead of into hierarchies of nested computer programs or procedures. That is, procedural technology defines a system in terms of data variables and process functions whereas OO technology defines a system in terms of objects and classes.

The Term "Framework"

There has been an evolution of terms and phrases which have particular meaning to those skilled in the art of OO design. However, the reader should note that one of the loosest definitions in the OO art is the definition of the word "framework." The word framework means different things to different people. Therefore, when comparing the characteristics of two supposed OO frameworks, the reader should take care to ensure that the comparison is indeed one of "apples to apples." As will become more clear in the forthcoming paragraphs, the term framework is used in this specification to describe an OO technology system that has been designed to have core function and extensible function. The core function is that part of the framework that is not subject to modification by the framework purchaser. The extensible function, on the other hand, is that part of the framework that has been explicitly designed to be customized and extended by the framework purchaser as part of its implementation.

OO Framework

While in general terms an OO framework can be properly characterized as a type of OO solution to a programming problem, there is nevertheless a fundamental difference between a framework and a basic OO programming solution. The difference is that frameworks are designed in a way that permits and promotes customization and extension of certain aspects of the OO solution, whereas a basic OO solution can be said to comprise a particular collection, or library, of classes and objects. In other words, frameworks provide an OO programming solution that can be customized and extended to address individualized requirements that change over time. Of course, the customization/ extension quality of frameworks is extremely valuable to purchasers (referred to herein as framework consumers) because the cost of customizing or extending a framework is much less than the cost of replacing or reworking an existing program solution.

Therefore, when framework designers set out to solve a particular problem, they should do more than merely design individual objects and specify how those objects interrelate. They should also design the core function of the framework (i.e., that part of the framework that is not subject to potential customization and extension by the framework consumer) and the extensible function of the framework (i.e., that part of the framework that is subject to potential customization and extension). In the end, the ultimate worth of a framework rests not only on the quality of the object design, but also on the design choices involving which aspects of the framework represent core function and which aspects represent extensible function.

ZAF

An Illustrative Framework

While those skilled in the art appreciate that framework design is necessarily an intertwined and iterative process, example design choices for a simplistic framework are set forth in the paragraphs that follow. It should be understood, though, that this is only an example framework that is being used in this specification to illustrate and best explain frameworks such that the reader can better understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for the illustrative framework is that of zoo administration. The specific problem presented is that of designing a framework that assists zoo keepers in the care and feeding of zoo animals. In the example, which will be referred to as a Zoo Administration Framework (ZAF), an OO framework designer would look to the zoological problem domain and decide that any ZAF would of necessity involve an abstraction that represents the relationship between zoo keepers and animals (i.e., represents how zoo keepers care for animals). The framework designer would also likely recognize that zoo animals usually live in cages, pens, tanks, and other sorts of containment units. Therefore, the framework designer also would start with the idea that the framework would have to involve abstractions or mechanisms that represent all of these fundamental entities and relationships.

How ZAF is Designed

To begin the design process, the framework designer would likely begin with what is called a category diagram. Category diagrams are used to describe frameworks at a high level and to define how the framework components relate to one another. FIG. 1 is a category diagram for the example framework ZAF. The notation used in FIG. 1, and that used in the other figures of this specification, is explained in detail in the Notation section at the end of this portion of the specification. Each entity, or icon, in a category diagram represents groupings of data objects that perform a particular function. For the purposes of illustration, assume that the framework designer decides that ZAF should be made up of four components that, at a high level perspective, will be referred to as mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a "using" relationship with the zoo keeper mechanism. (Again, please refer to the notation section of this specification for an explanation of this relationship and the other notation used in this specification.)

As discussed above, the zoo administration mechanism has been designed to have responsibility for overall control of ZAF. Accordingly, the zoo administration mechanism is responsible for scheduling the operation of the zoo keeper mechanism. Note also that the framework designer has designed the zoo administration mechanism to be a core function of ZAF, which means that it has been designed such that it will not be subject to potential customization and extension. The upper case block letter "C" in the category box for the zoo administration mechanism denotes this fact. Note further that the "uses" relationship between the zoo administration mechanism and the zoo keeper mechanism also has been designed as a core function such that it is not available for ultimate customization by the framework consumer.

The zoo keeper mechanism has been designed to be generally responsible for the care and feeding of the zoo animals. Accordingly, it uses the animal and containment unit mechanisms to perform its tasks. Unlike the design of the zoo administration mechanism, however, the framework designer has designed the zoo keeper mechanism to be an extensible function, which again means that the zoo keeper mechanism has been designed to be available for modification and/or extension by the framework consumer to address future care and feeding requirements. This fact is denoted by the upper case block letter "E" in the zoo keeper mechanism category box.

The framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible functions, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

The framework designer next designs the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are also called methods, method programs, and/or member functions.) When taken together, the defined operation(s) and data are said to be the behavior of the object. In essence, then, a class definition defines the behavior of its member object or objects.

Figure 2:
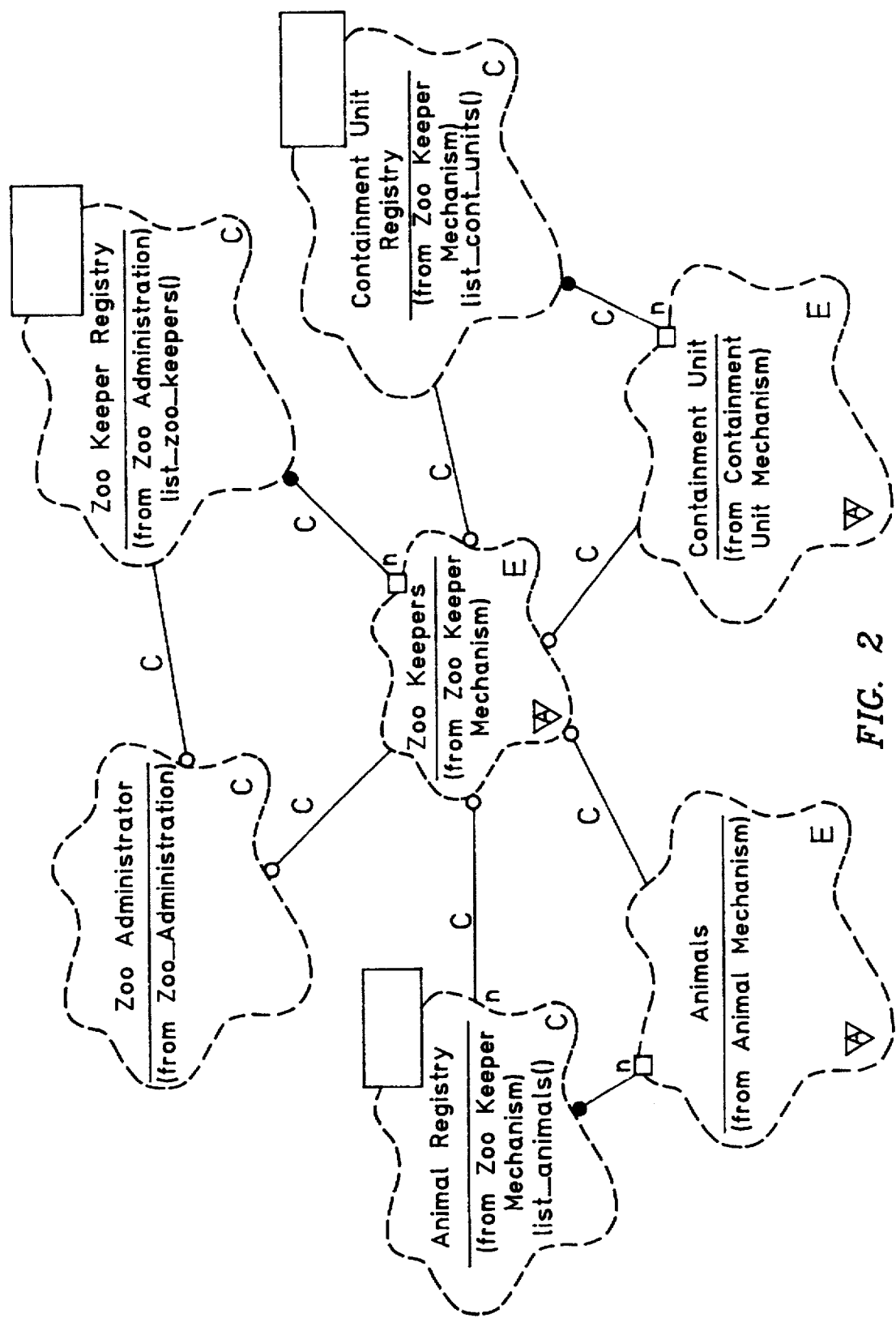

FIG. 2 is an OO class diagram that shows the fundamental classes that the framework designer has designed for ZAF. Each class representation indicates its relationship to the mechanisms shown on FIG. 1. For example, the zoo keepers class is denoted as being from the Zoo Keeper mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism. It should be noted that the relationships between the classes have been designed as core functions of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that one is able to understand how the objects of the framework mechanism have been designed to provide a living solution that can be customized and/or extended to address future requirements.

The zoo administration class has been designed to have a "uses" relationship with the zoo keeper registry. The framework designer has designed the zoo administration and zoo registry classes to be a core function of ZAF because the designer has decided that ZAF's consumers should not be allowed to modify the behavior of objects that are members of these class definitions. The zoo keeper registry, which has what is called a "contains by reference" relationship with the zoo keeper class, is simply a class that defines an object that is a container for all zoo keeper objects. Accordingly, the zoo keeper registry includes a definition for a list_zoo_keepers( ) operation. As will be described later, this operation is responsible for providing a list of zoo keeper objects to other objects that request such a list.

Figure 3:
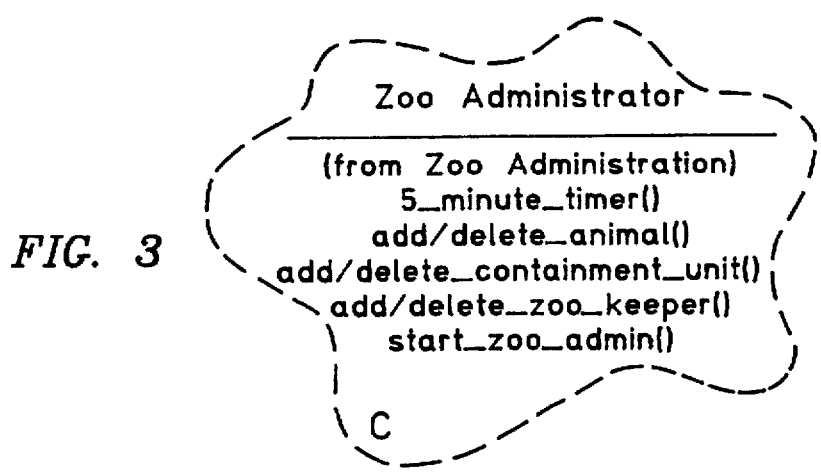
FIGS. 2, 3, 4, 5, and 6 are class diagrams for the exemplary Zoo Administration framework of FIG. 1.

FIG. 3 shows a lower level view of the zoo administrator class. Because objects of type zoo administrator have responsibility for overall control of ZAF, the zoo administrator class has been designed to include operations that perform tasks oriented towards zoo administration. The class definition includes the following five operations: 5_minute_timer( ), add_animal( ), add_containment_unit( ), add_zoo_keeper( ), and start_zoo_admin( ).

The start_zoo_admin( ) operation is responsible for starting ZAF. That is, a user or system administrator will interact with the start_zoo_admin( ) operation to begin administration of a zoo via ZAF. The start_zoo_admin( ) operation has been designed to initiate the 5_minute_timer( ) operation such that, every five minutes, the 5_minute_timer( ) operation instructs the zoo keeper objects to go out and check on the zoo animals. The add/delete_zoo_keeper( ) operation is responsible for interacting with users of ZAF to define additional zoo keepers (i.e., additional zoo keeper classes), to add additional zoo keepers (i.e.; zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. The ZAF framework designer has provided this flexibility by designing the zoo keeper mechanism as an extensible function.

Like the add/delete_zoo_keeper( ) operation, the add/delete_animal( ) operation is responsible for interacting with users to define additional zoo animal classes and objects and also to remove classes and objects that are no longer needed. Again, it is quite natural for a zoo to need to add and remove animals. The add/delete_containment_unit( ) operation is responsible for the definition of new containment unit classes and objects and for removal of classes and/or objects that are no longer necessary. Again, the framework designer has provided such flexibility by designing the animal and containment unit mechanisms as extensible functions.

Referring back to FIG. 2, the zoo keepers class definition has a "uses" relationship with the animal registry, animals, containment unit registry, and containment units classes. Since the value of ZAF is enhanced by allowing ZAF's consumers to customize and extend the zoo keepers, animals, and containment unit classes, the ZAF framework designer has designed these classes as extensible functions. However, changing the behavior of the animal and containment unit registry classes would disrupt the basic operation of ZAF. Therefore, the framework designer has designed these classes to be core functions of ZAF.

Figure 4:
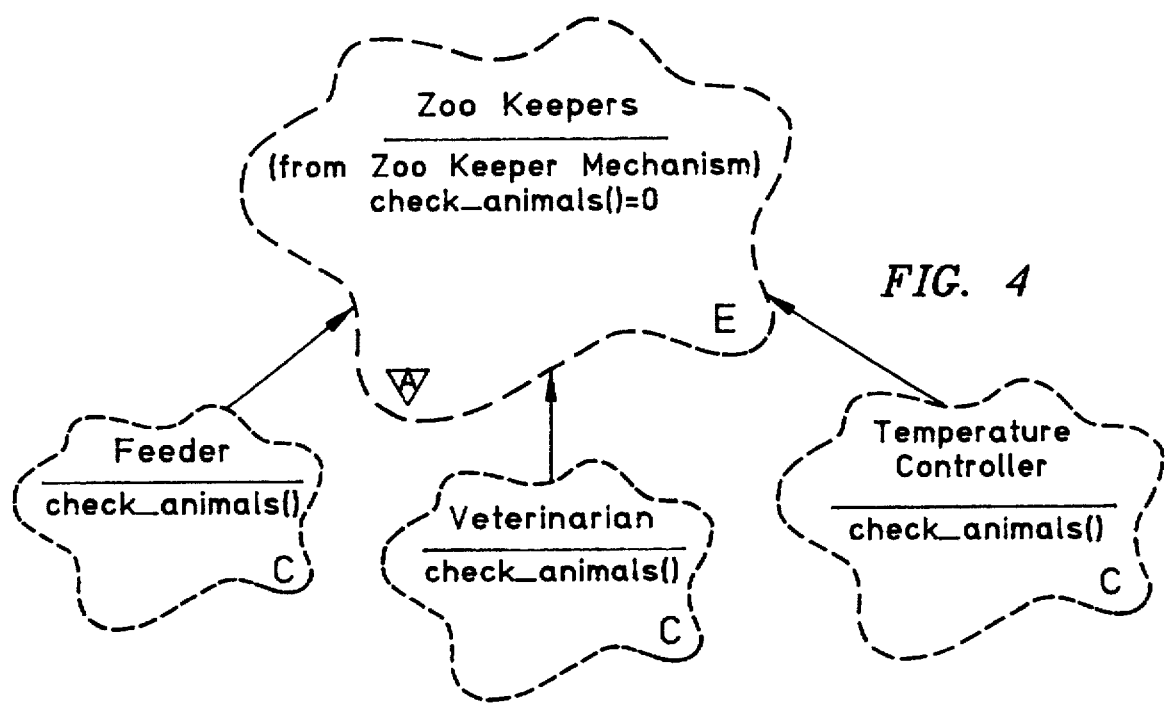

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals_operation definition that is contained in the zoo keeper class. An operation is marked as a pure virtual operation when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (such as the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact that the action is actually performed. In other words, client objects need only understand that certain objects perform certain functions, not how those functions are actually carried out. This is one way in which a properly designed OO framework can be readily customized and extended to satisfy future requirements.

Figures 5, 6:
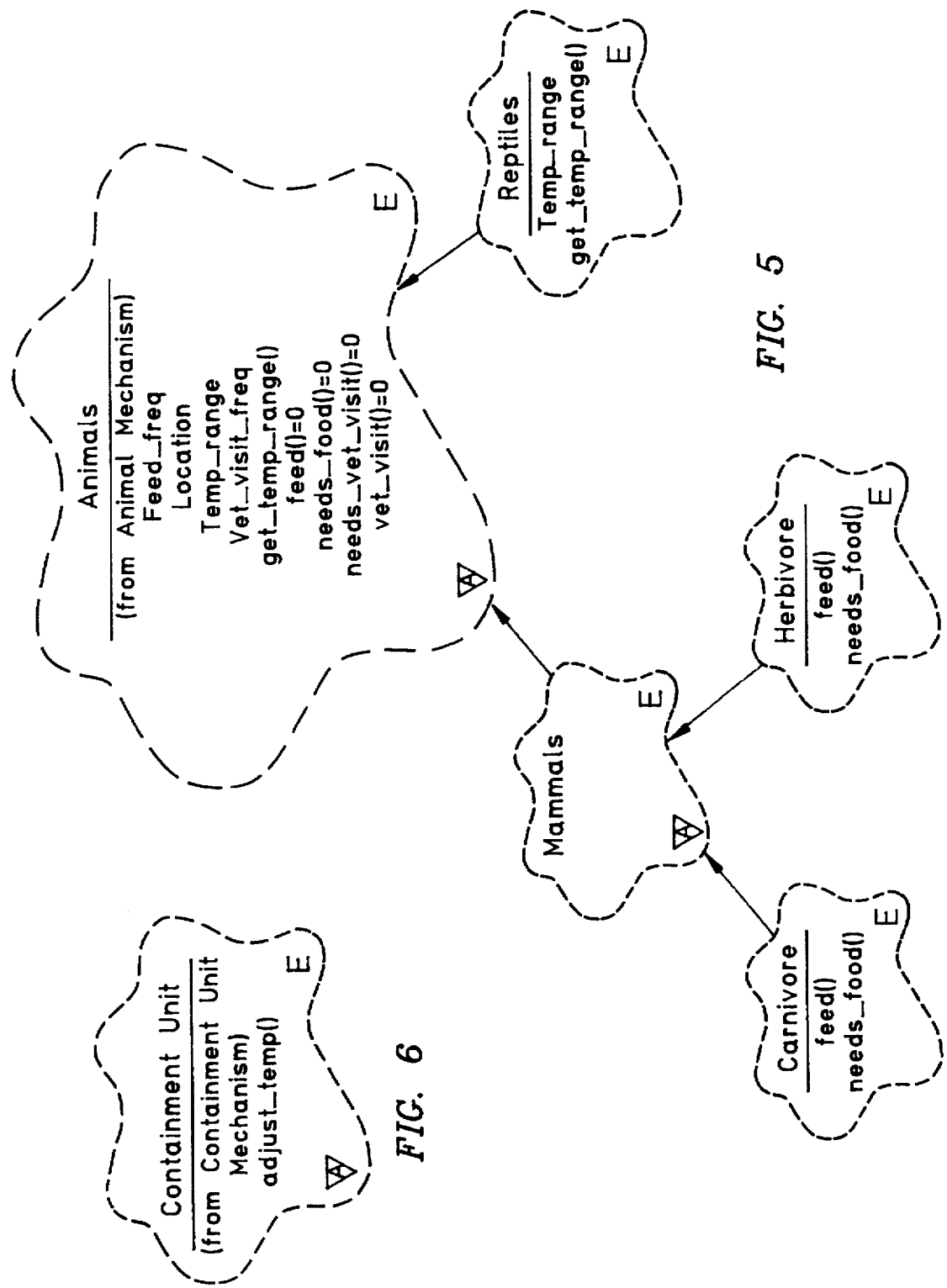

As previously discussed, the framework designer has designed the ZAF framework such that zoo keeper objects interact with animal and containment unit objects to perform their respective tasks. FIG. 5 is a class diagram for the class hierarchy of the abstract class animal. Because the animal class definition is responsible for representing the characteristics and behavior of zoo animals, the framework designer has designed the abstract class animal in a way that reflects this responsibility. As shown, the example class definition for animal includes data definitions feed_freq, location, and temp_range and operation definitions get_temp_range( ), feed( ), needs_food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus, which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In the ZAF framework, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extent the default operations by redefinition. Redefinition of a default operation is called overriding the default operation.

Mammals is a subclass of the class animals and, as such, the mammals class inherits all of the characteristics of the animals class. The mammals class is also designed as an abstract class, which again means that it has not been designed to have objects created as its members, but has instead been designed to provide a common interface for its subclasses. Subclass mammal is further subclassed into classes carnivore and herbivore.

Because definition of the feed( ) operation has been left up to the subclasses, the subclasses carnivore and herbivore each have their own definition of the feed( ) operation. Again, this is a good design choice because meat-eating carnivores are going to have different needs than their plant-eating counterparts.

Temp_range is a data definition for the range of temperatures that coincides with that of the specific animal's natural habitat and the get_temp_range( ) operation definition is designed to retrieve the temp_range for a specific animal and return it to a requesting client object. Subclass reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

FIG. 6 is a class diagram showing a lower level view of the containment unit class. The containment unit class contains a virtual operation definition adjust_temp( ). The adjust_temp( ) definition defines both the interface and mechanism used to actually adjust the temperature in the containment units of the zoo (i.e., via heating and cooling mechanisms that are not shown).

How the ZAF Objects Interact

Beyond designing the objects that make up the solution to the specific programming problem, the framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7:
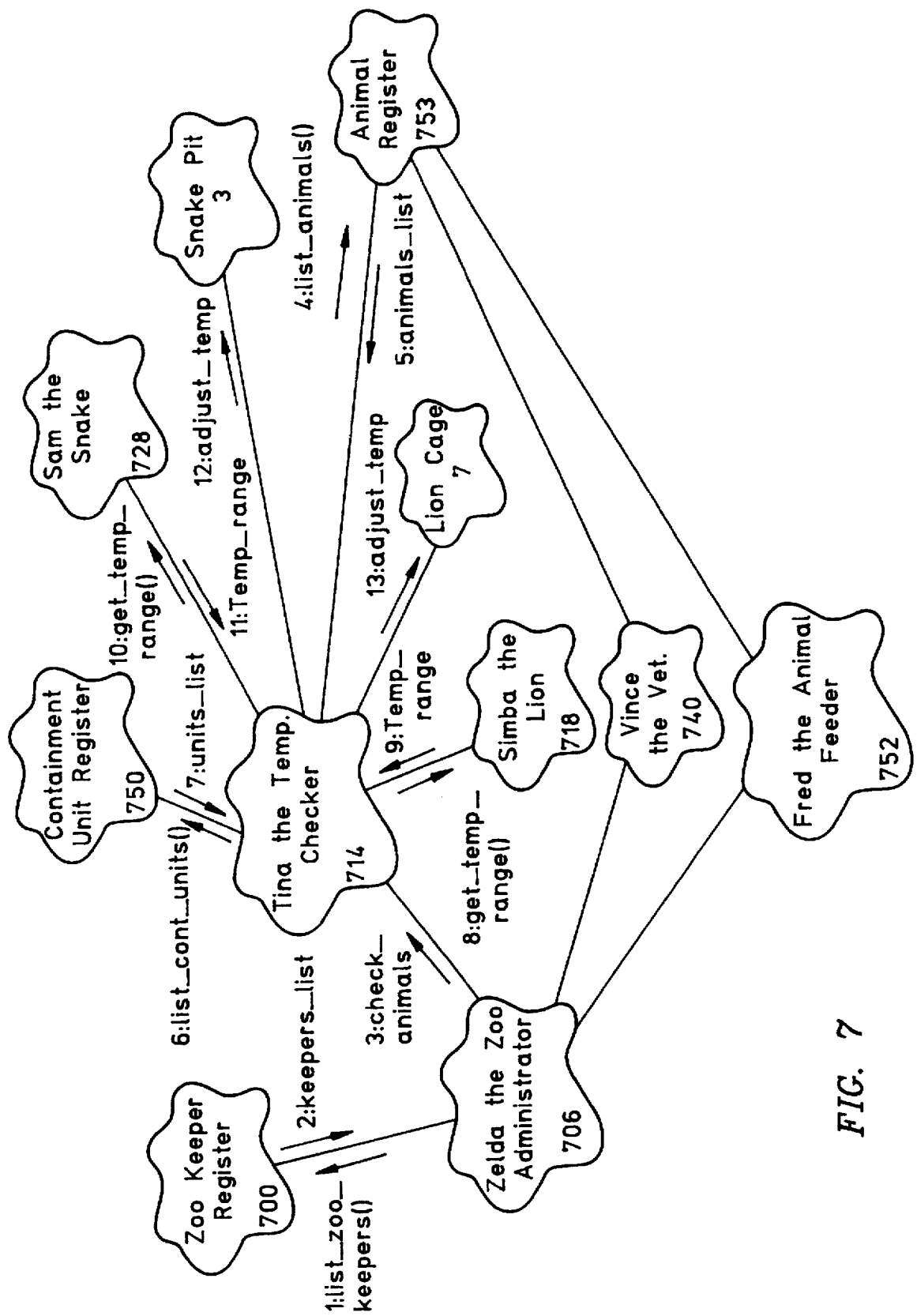
FIG. 7 is an object diagram for the exemplary framework of FIGS. 1 through 6.

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects in an OO environment interact to solve problems.

As mentioned, an object is created to be a member of a particular class. Therefore, the object Zelda the Zoo Administrator 706 is an object that is a member (actually, the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object 700 has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda 706, object Zelda instructs each zoo keeper in the list to check the animals by calling the check_animals( ) operation of each zoo keeper object. Only the call to Tina the Temp. Checker is shown, indicated as step 3. It should be noted that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animals( ) operation. For example, object Tina's check_animals( ) operation retrieves a list of current animals from the animal registry object by calling the list_animals( ) operation [step 4] and then a list of containment units from the containment unit register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust tempo operations is polymorphic. In other words, the check_animals( ) operation of object Tina 714 does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF system is an extremely simplistic framework that has been presented to help novice readers understand some basic framework concepts so as to better appreciate the benefits and advantages of the present invention. These benefits and advantages will become more clear upon reference to the following Detailed Description.

DETAILED DESCRIPTION

Figure 8:
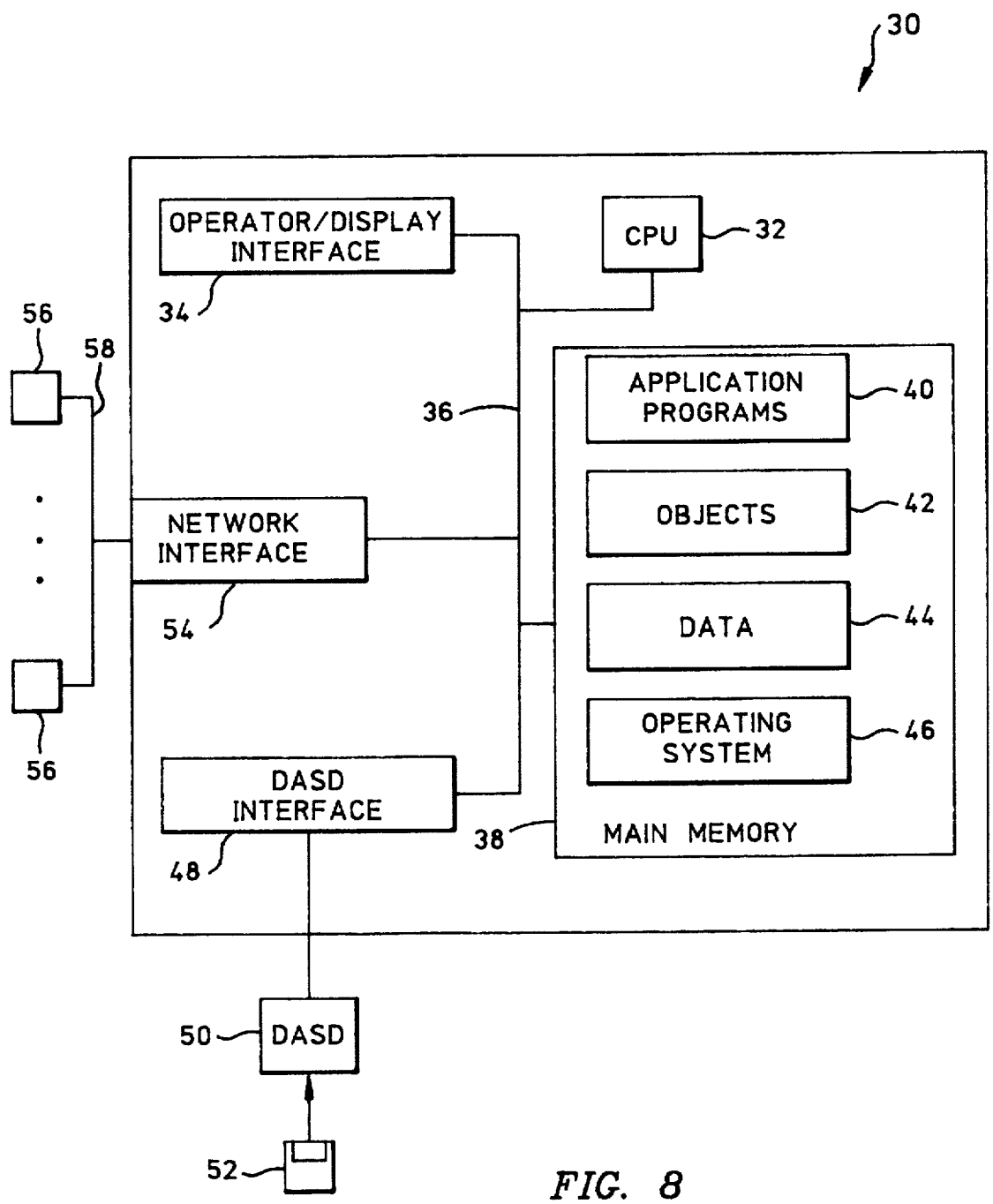
FIG. 8 is a functional block diagram of a computer processing system constructed in accordance with the present invention.

FIG. 8 is a block diagram of a computer system 30 constructed in accordance with the present invention. The computer system includes a central processing unit (CPU) 32 that operates in response to operator commands, which it receives from an operator/display interface 34 to which it is connected by a system bus 36. The CPU also communicates over the system bus with a main memory 38, which is illustrated with a variety of data structures, including application programs 40, objects 42, data 44, and an operating system 46. The main memory 38 is represented as a single entity, but those skilled in the art will appreciate that the main memory can comprise a combination of random access memory (RAM), hard disk drives, optical disk drives, and other storage devices containing logically segmented storage locations.

The operating system 46 preferably supports an object oriented programming environment such as provided, for example, by the C++ programming language. The application programs 40 are invoked, or launched, by a user through the operator/display interface 34. The application programs can be written in a variety of languages, including C++. The objects 42 are object data structures of an object oriented programming language, such as C++.

The computer system 30 also includes a direct access storage device (DASD) interface 48 that is connected to the system bus 36 and is also connected to a DASD 50. Those skilled in the art will appreciate that the DASD 50 can receive and read from program products comprising machine-readable storage devices 52, such as magnetic media disks on which are recorded program instructions whose execution implements the framework of the present invention. The storage devices 52 also can comprise, for example, media such as optical disks and other machine-readable storage devices. The computer system 30 also includes a network interface 54 that permits communication between the CPU 32 and other computer systems 56 over a network 58. The other computer systems 56 can comprise, for example, computer systems similar in construction to the exemplary computer system 30. In that way, the computer system 30 can receive data into the main memory 38 over the network 58 after communication between the computer systems has been established by well-known methods that will be understood by those skilled in the art without further explanation. The network interface 54 is the means by which the framework user receives messages from other network users and transfers messages to other network users.

Message Processing Sequence diagrams

Figures 9, 10:
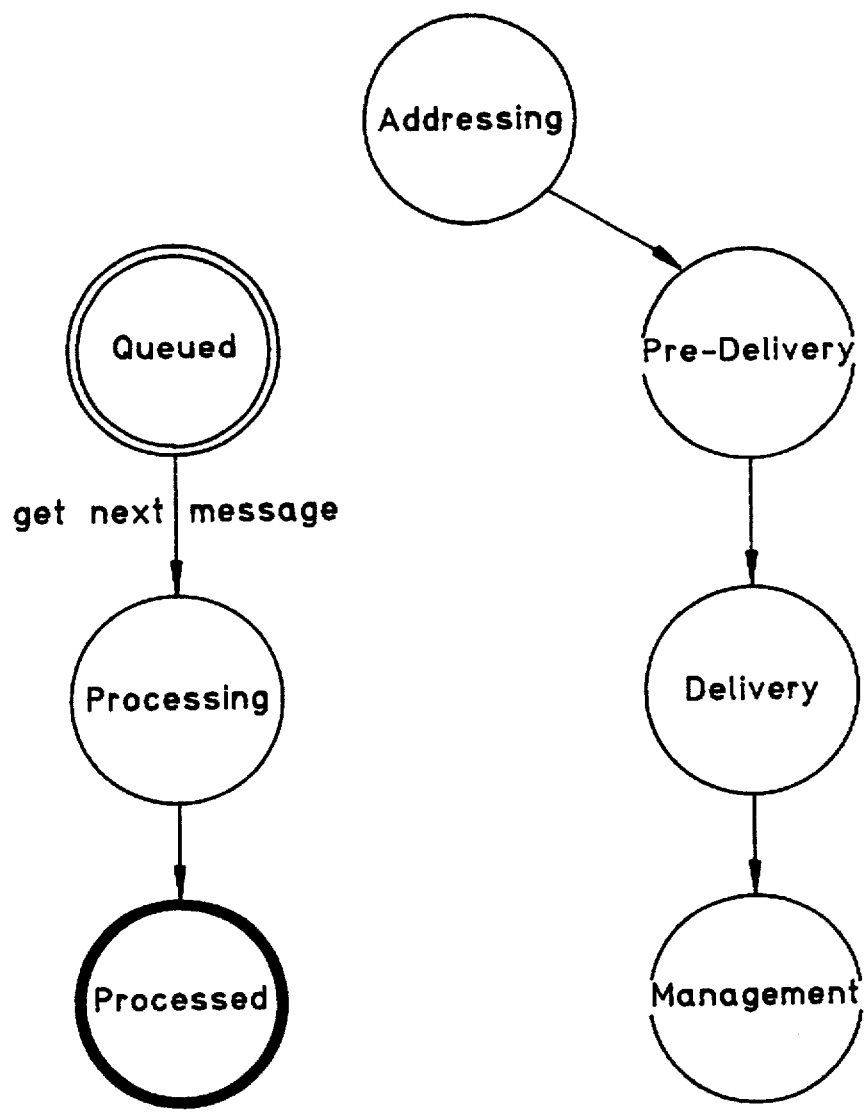
FIGS. 9, 10, and 11 are process diagrams that illustrate the message processing steps performed by the computer processing system illustrated in FIG. 8.

A better understanding of the preferred embodiment of the invention will be obtained by considering the sequence of message processing steps performed by the computer system of FIG. 8 before describing the object oriented framework mechanism. FIG. 9 is a processing diagram that illustrates the processing steps to which a message is subjected as it is processed by the system illustrated in FIG. 8. The FIG. 8 system invokes the framework mechanism to retrieve received messages from a message queue. The system processes the messages for each entry in a recipient list. Thus, the system either provides the message to a local delivery mechanism, forwards the message along to a remote address, or indicates that the message is invalid or otherwise cannot be delivered. Initially, a message is received into an input queue, as indicated by the first circle in FIG. 9, indicating a "queued" condition. When a message is retrieved from the input queue, it can be said to enter a "processing" phase, as represented by the second circle in FIG. 9. Finally, when all processing is completed, the message can be said to enter a "processed" condition, as represented by the third circle of FIG. 9. Typically, a processed message is simply deleted from the input queue of the processing system.

FIG. 10 represents a more detailed view of the operating steps that comprise the "processing" phase of a message. The operating steps are represented as four circles. FIG. 10 shows that, during processing, the message is first subjected to addressing process steps, followed by what can be characterized as pre-delivery steps. The actual transfer of the message to the next destination is indicated by the delivery steps. Finally, after the message has completed the delivery processing steps, the processing phase concludes with management processing steps.

Figure 11:
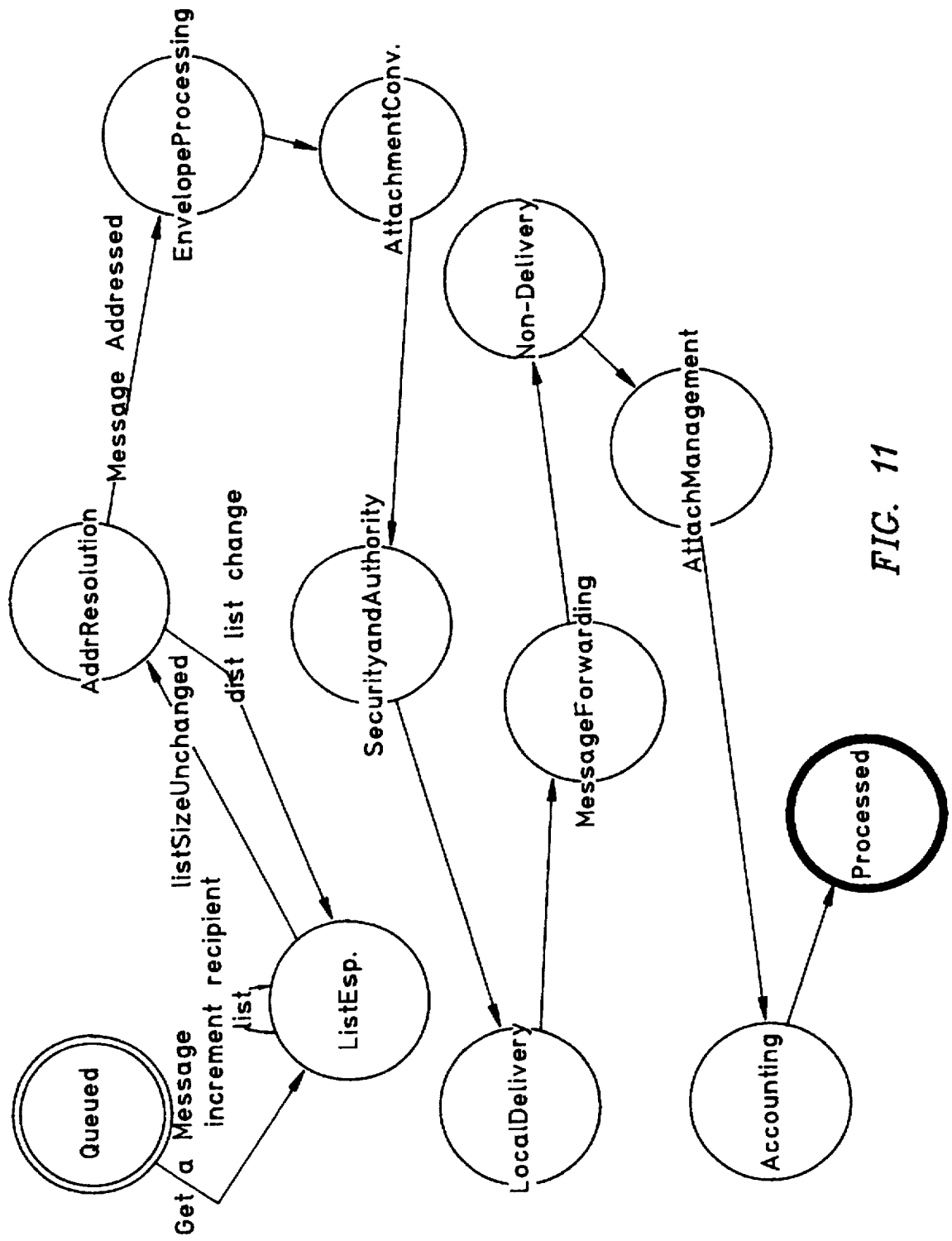

The simplified representation of the processing steps in the "processing" phase can be viewed in greater detail in FIG. 11, which represents a sequence of processing steps performed during the message processing phase. Retrieving a message from the message queue is represented in FIG. 11 as a "get a message" event that causes the message to undergo list expansion (List Exp.) processing. During list expansion, the system repeatedly expands recipient list entries into destination addresses. The expansion can be one-for-one, as where a recipient list entry represents a single intended recipient, or can be one-to-many, as where a recipient list entry represents a distribution list of multiple intended recipients. In this way, the recipient list is expanded so as to identify one or more e-mail destination addresses. An e-mail address, for example, might identify a conventional Internet address that comprises domain and subdomain names. In the preferred embodiment, e-mail destination addresses define the message protocol type of the recipient. As long as there are recipient list entries to be processed, the system continues to expand them. While the message is undergoing list expansion, the message content is not changed.

FIG. 11 shows that when the recipient list has been fully processed into a list of destination addresses and no more recipients remain to be identified, the message is subjected to Address Resolution processing. During address resolution, the system resolves each destination address to a method of delivery, such as the SNADS protocol, SMTP protocol, and the like. The arrow in FIG. 11 shown as "distribution list change" leading from the Address Resolution processing circle back to the List Expansion processing circle indicates that address resolution processing can cause a change in the recipient list. This can occur, for example, where a destination address that is identified in the list expansion processing is recognized during address resolution as requiring a message routing that demands a different destination address from that assigned from list expansion. In such a case, the list expansion processing is repeated. This type of re-routing might occur, for example, if the message must be sent to a gateway other than a network gateway to which the recipient is connected.

If an address resolution does not result in a distribution list change event, then it results in a message that is properly addressed. This means that the message has been assigned a destination address, message protocol type, and status. As indicated in FIG. 11, this means the message has been properly addresses and the message is next processed during an envelope processing phase.

In the e-mail processing system of the preferred embodiment, message contents, represented as a text string, are packaged with system "envelopes" that indicate protocols, originators, intended recipients, and the like. During envelope processing, appropriate system envelopes are created and associated with the messages. The envelope processing circle of FIG. 11 corresponds to the beginning of the "Pre-Delivery" phase illustrated in FIG. 10. When the envelope processing is completed, attachment conversion is performed. In the FIG. 8 system of the preferred embodiment, the message contents are referred to as an attachment. Thus, a message is processed into an envelope and associated attachment. An attachment can contain text characters, voice, graphics, or video data, or any other information that can be stored in an electronic representation and sent over a computer network.

During attachment conversion, the message text string is processed according to the e-mail system associated with each recipient. For example, recipients on one e-mail system might require text to be represented in ASCII display characters while recipients on another system might require text to be represented in EBCDIC (Extended Binary Coded Decimal Interchange Code) characters. Attachment conversion includes any necessary text conversion and other formatting issues for the destination system. The framework user can specify such message processing for different protocols without modifying the object classes of the framework and in that way can easily accommodate protocols added following initial system integration.

After attachment conversion, FIG. 11 shows that the message processing moves to the security and authority phase. In this phase, confidentiality checks are performed for the message. This processing can affect the text of the message by changing the delivery status based on those confidentiality checks. For example, message text might be restricted, masked, or encrypted in accordance with the confidentiality checks. The security and authority state completes the "Pre-Delivery" phase of message processing illustrated in FIG. 10. The next phase is the "Delivery" phase.

To deliver a message, the system first checks for local delivery. That is, if a message has a "local" status, then the recipient of the message is assumed to be located on the present system that is processing the message. Therefore, the framework system passes the message to a local message delivery processor so that message processing can be completed. The particular processing necessary to complete delivery of a message to an individual destination is not part of the processing performed by the framework system.

If the message does not have a "local" status, then it is assumed that local delivery cannot be completed and, as illustrated in FIG. 11, message processing moves to the message forwarding phase. In the message forwarding phase, each message recipient is checked for status. If the status associated with a recipient is "remote" status, then the message is moved from the local network and the message is forwarded to another network for further processing. In this way, the system of the framework implementation acts as a network gateway processor.

The next processing state illustrated in FIG. 11 is non-delivery processing. During non-delivery processing, the message status for each recipient is checked. If the status indicates a non-delivery event, then any special handling is completed. For example, a non-delivery indication might be immediately returned to the originator if the message could not be delivered to a particular recipient. Other events, such as communications failure, also might be indicated, if appropriate. Again, the framework user can easily specify such processing and can easily change such processing within the specifications of the framework without major modification.

After the non-delivery processing is completed, the message processing shown in FIG. 11 moves to the attachment management phase. This processing corresponds to the beginning of the "Management" phase illustrated in FIG. 10. Attachment management processing is performed only if a message has an attachment. FIG. 11 shows that the message next undergoes accounting processing. No changes to the message text occur during accounting. Account charges, processing fees, and the like can be resolved and charges billed or invoices generated. Also, system operating statistics can be accumulated or updated. When the accounting state is completed, the message processing is completed and the message is typically deleted from the system. Thus, the framework mechanism operation is completed and other system processing can resume.

The present invention provides an object oriented framework. The operation of the mail server system developed using the framework can be understood with reference to the state diagrams of FIGS. 9, 10, and 11. Persons skilled in the art, however, will appreciate that the framework objects, their relationships, and their processing also can be precisely and completely described in terms of object oriented programming representations. Therefore, the framework of the preferred embodiment will next be described in terms of category diagrams and object diagrams similar to those described above in conjunction with FIGS. 1 through 7 for the zoo keeper example, in accordance with the mail server framework mechanism classes described above.

Category/Class diagrams

Figure 12:
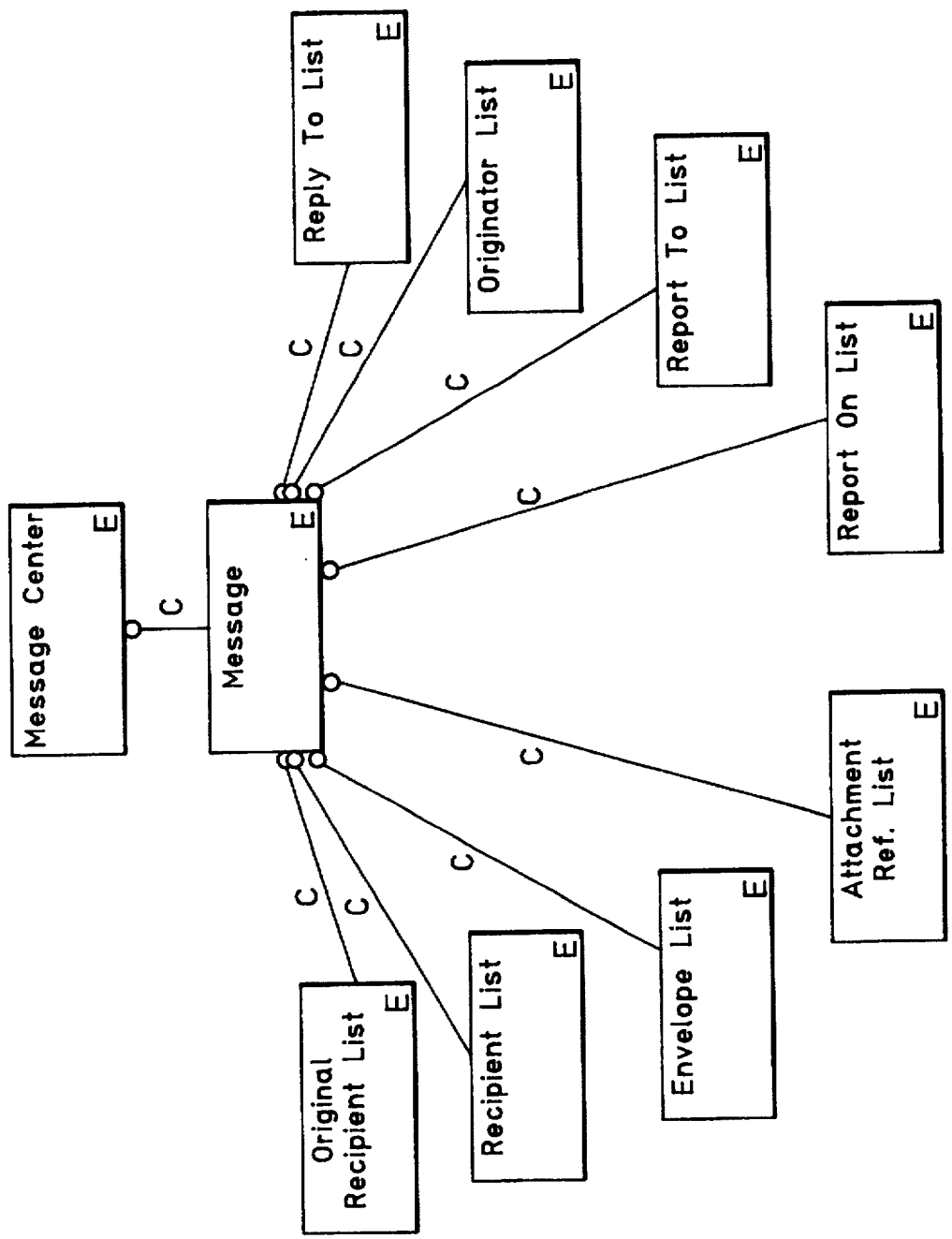
FIG. 12 is a category diagram representation of the Object Oriented Framework implemented by the computer processing system illustrated in FIG. 8.

FIG. 12 is a category diagram for the framework implemented in the computer system of FIG. 8. Those skilled in the art will appreciate that the categories illustrated in FIG. 12 represent collections of object oriented programming (OOP) objects that encapsulate data attributes and behaviors and are stored in the main memory illustrated in the block diagram of FIG. 8. Such objects can be implemented, for example, in a computer system operating environment that supports the C++ programming language.

The FIG. 12 category diagram representation of the framework shows the primary class category components, or mechanisms, of the framework. All of the mechanisms are labelled with an "E" in their respective class category boxes to indicate they are all extensible class categories, meaning that their object classes and attributes can be extended and thereby customized by the framework user. The class category called Message_Center contains the messages that the framework will create and process. FIG. 12 shows that the Message_Center class category has a "using" relationship with a class category called Message. Message contains e-mail message information in the form of lists of objects that store the information that permits the extended framework to process the e-mail messages of Message_Center.

The "using" association relationship indicated by the connecting lines from the Message_Center category box to the Message category box is labelled "C" to indicate that it is a core relationship that cannot be changed by the framework user. The "using" relationship represents an association in which the Message_Center mechanism processes, or uses, messages from Message. FIG. 12 shows that the Message class category in turn has a core "using" relationship with class categories called OriginalRecipientList, RecipientList, EnvelopeList, AttachmentRefList, ReportOnList, ReportToList, OriginatorList, and ReplyToList. These class categories will be described in greater detail below. The relationships (connecting lines) are labelled with a "C" to indicate that they cannot be changed by the framework user. That is, although the class attributes and behaviors are extensible (can be changed) by the user, the relation structure between the classes cannot be changed.

Figure 13:
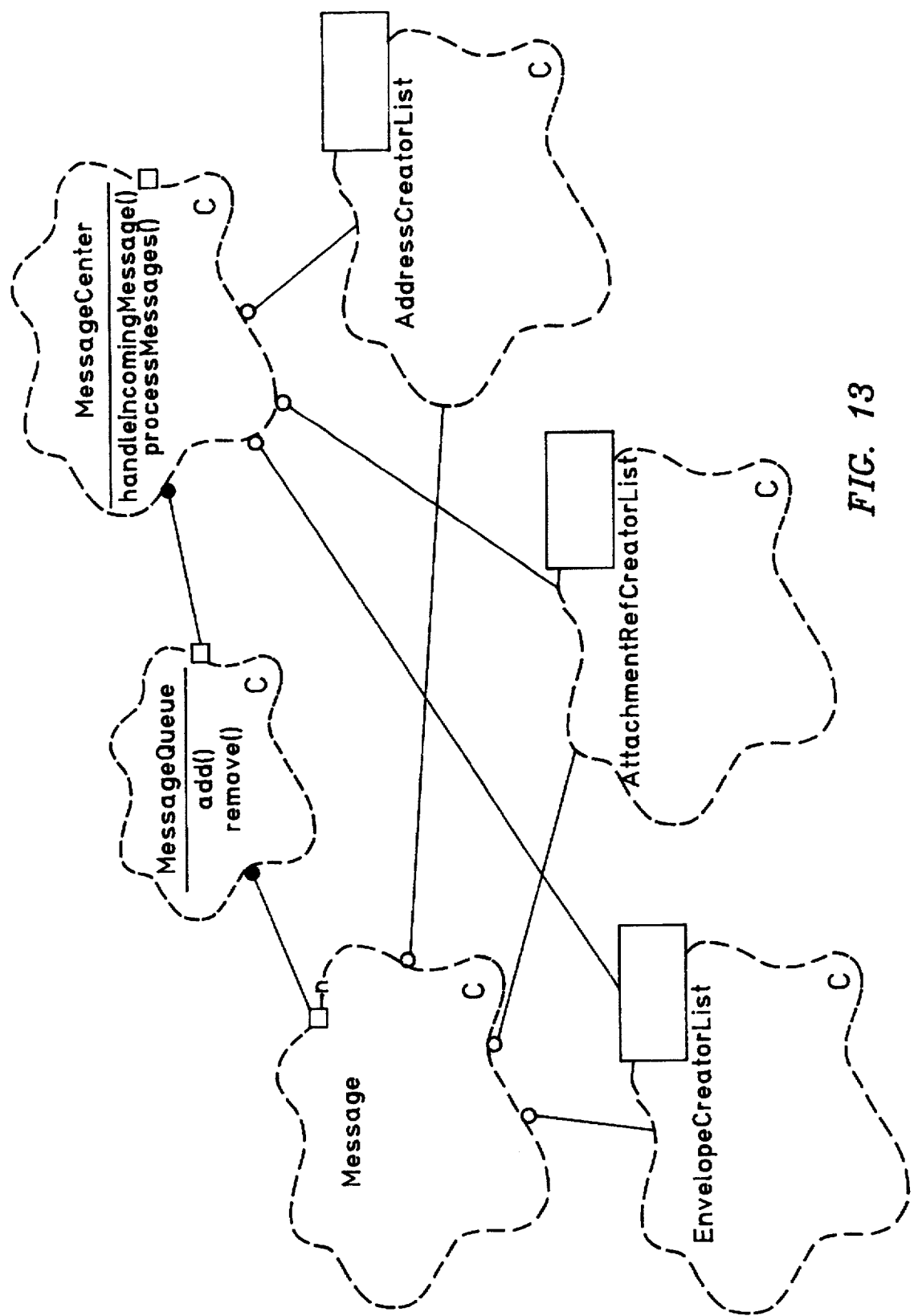
FIG. 13 is a class diagram representation of the "MessageCenter" category and related classes implemented by the computer processing system illustrated in FIG. 8.

FIG. 13 is a class diagram that represents the objects of the class category Message_Center. The objects that are in the Message_Center category and the relationships between those objects are considered "core" characteristics that cannot be modified by the user of the framework. Objects in the MessageCenter class belong to the Message_Center category and are responsible for invoking methods (also called operations) that provide the initial creation of all the Message member objects. In the preferred embodiment, implemented in the C++ programming language, a MessageCenter object creates Message objects by invoking C++ object creator methods. The creator methods of the framework implementation will depend on the particular programming language in which the framework is implemented.

Each MessageCenter object includes a handleIncomingMessage( ) method, which creates the Message object that is to be processed. This method takes as input a string which is used with the creation methods identified by objects in a respective creator list to create an instance of a Message object. The behavior of the MessageCenter object includes the processMessage( ) method shown in FIG. 13. It is this method that receives the content of the e-mail message that is to be processed, encapsulating it within the Message object. That is, this method parses the contents of the message into objects that are expected by the framework design.

The framework does not completely define the processing that takes place on the message contents. The definition of the processing actions is part of the framework extension by the user that complete the methods invoked as part of the framework's defined set of steps that handle e-mail. When the creator method of the framework creates a MessageCenter object, it also creates the class called MessageQueue and three CreatorList objects shown, comprising EnvelopeCreatorList, AttachmentRefCreatorList, and AddressCreatorList. Typically, there is only a single MessageQueue object, though there can be multiple MessageCenter objects. The processMessage( ) method continually removes the next Message object from the MessageQueue and invokes the Message object methods.

FIG. 13 shows that the relationship between the class MessageCenter of the Message_Center category and the class MessageQueue is a "has" relationship, meaning that the MessageCenter class contains a MessageQueue object within it. The MessageQueue object is maintained as a first-in, first-out (FIFO) queue.

MessageCenter keeps track of Message objects using objects in the MessageQueue class. FIG. 13 shows that the class MessageQueue includes methods called add( ) and remove( ). The add( ) method is used by MessageCenter for adding (also called registering) a reference to a message object to the MessageQueue and the remove( ) method is used for removing a Message object reference from the MessageQueue. The object reference can comprise, for example, a message pointer or message index. Such addition and removal operations are characteristics of particular object-oriented programming languages in which the framework can be programmed, such as the C++ programming language.

After creating a Message object, MessageCenter uses the add( ) method to add a message reference to the MessageQueue and then removes the next reference in the FIFO queue using the remove( ) method. After a message object reference is removed from the queue, the MessageCenter object processes the referenced message object by sequentially invoking Message class methods that result in e-mail processing. Such e-mail processing methods are defined by the framework user (as described further below) and are produced via inheritance when the framework is extended, or implemented, by the user.

FIG. 13 also illustrates that a class called MessageQueue has a relationship with the class called Message such that MessageQueue "has" multiple Message objects. That is, MessageQueue comprises a collection of Message objects. A MessageQueue object is used by MessageCenter as a specific container object to maintain a relationship of Message objects that it has created but not yet processed.

Figure 14:
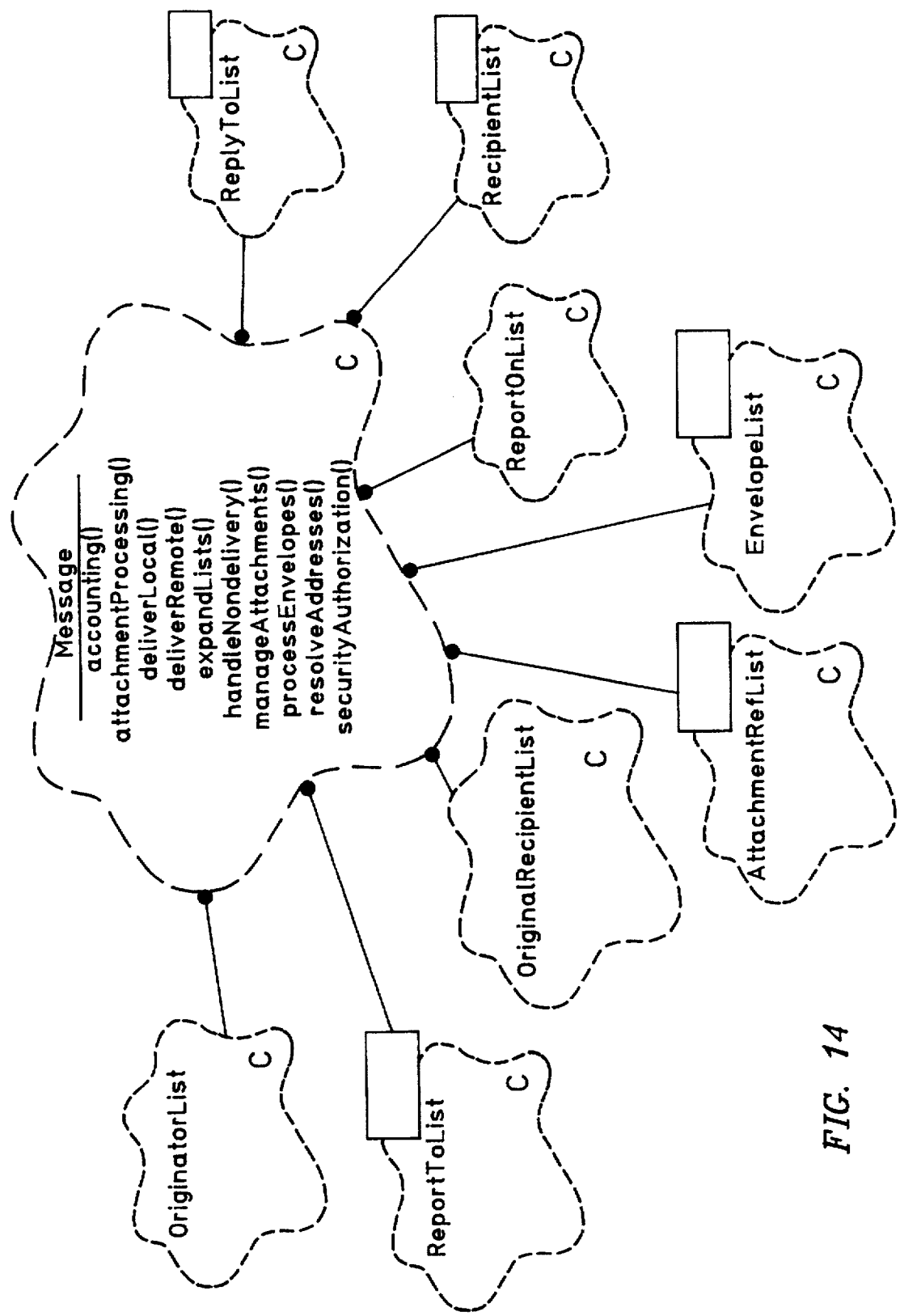
FIG. 14 is a class diagram representation of the "Message" category implemented by the computer processing system illustrated in FIG. 8.

FIG. 14 is a class diagram of the Message class. The objects that are in the Message class and the relationships between those objects are considered "core" characteristics that cannot be modified by the user of the framework. A Message object has all the information about a piece of e-mail needed to process it. The FIG. 14 class clouds show the Message class having a "has" relationship with the classes called OriginatorList, ReportToList, OriginalRecipientList, AttachmentRefList, EnvelopeList, ReportOnList, RecipientList, and ReplyToList. Each of these classes contains list objects. Keeping such information in core classes helps to organize and control such access. In this way, a Message object has all the information about a piece of e-mail needed to process it within the framework. Each of the list objects contains information that is kept in the core objects so the information is accessible by the extensions of the framework. There is at most one unique list object for every Message object, except for RecipientList objects.

FIG. 14 indicates that objects in the Message class define a number of methods. In the preferred embodiment, these methods comprise (in alphabetical order) accounting( ), attachmentProcessing( ), deliverLocal( ), deliverRemote( ), expandList( ), handleNonDelivery( ), manageAttachments( ), processEnvelopes( ), resolveAddresses( ), and securityAuthorization( ). Each of these methods comprises a processing step of the system. The sequence in which these methods are performed and their associated processing behavior will be described in greater detail below in conjunction with the object diagrams of the framework. The methods have been selected to provide the flexibility desired for the system and also to provide enhanced system operation.

The Message object retrieves objects from the FIG. 14 classes of OriginatorList, ReportToList, OriginalRecipientList, AttachmentList, EnvelopeList, ReportOnList, RecipientList, and ReplyToList. Objects in the Message class can retrieve objects from these classes using appropriate operations described below. These classes and the operations used will next be described in greater detail.

Figure 15:
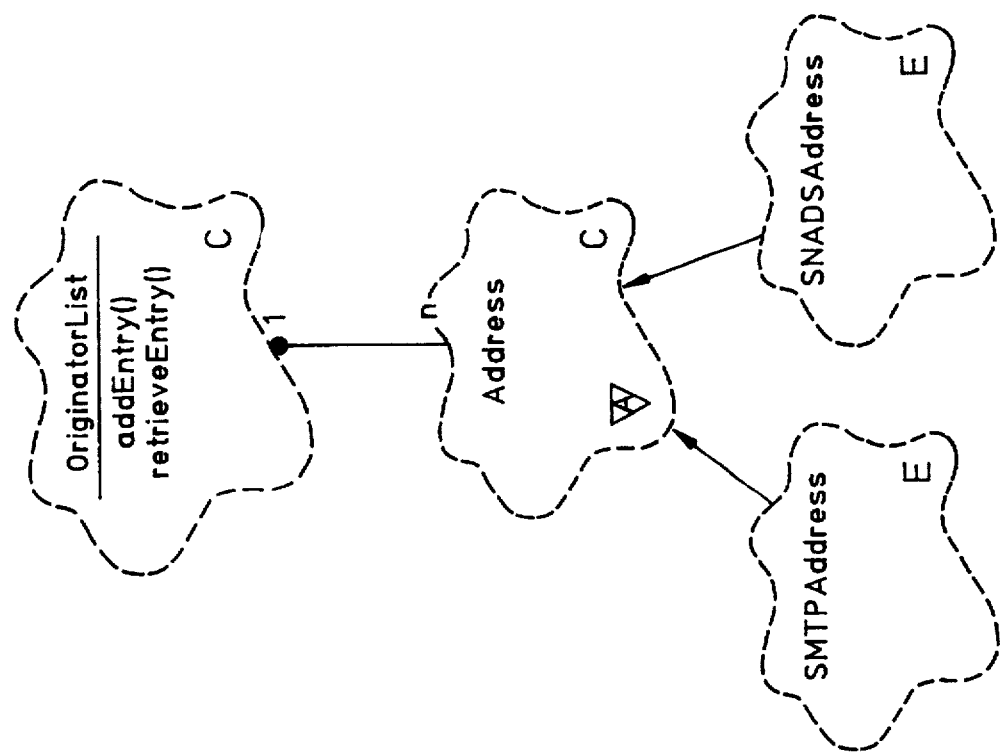
FIG. 15 is a class diagram representation of the "OriginatorList" category implemented by the computer processing system illustrated in FIG. 8.

FIG. 15 is a class diagram of the OriginatorList class. That is, FIG. 15 illustrates the objects that make up the framework's OriginatorList class. The class is shown having a "has" relationship with a class called Address. The "n" on the association line indicates multiple Address classes. The relationship of the objects in the Address class to the OriginatorList class is considered to be "core" or not modifiable in terms of the framework. There can be any number of OriginatorList objects, but each is used or referenced by a unique Message object. An OriginatorList object contains the list of originating addresses of a specific e-mail message. The framework does not define e-mail address formats or their contents. Such a definition is part of the framework extension done by the framework implementer. The OriginatorList objects define two methods, addEntry( ) that is used when adding a new address to an OriginatorList object, and retrieveEntry( ) that is used when accessing an entry in a Message object's OriginatorList entries.

In FIG. 15, the class adornment in the Address class cloud indicates this is an abstract object type. Thus, this object must be subclassed as part of extending the framework to support a specific e-mail address form as part of its customization. An implementer of the framework will have to extend the Address object in this manner. The framework allows any number of subclassed Address objects to exist within the same framework. Each extended Address class is assumed to define a unique identifying object type. There are no OriginatorList object requirements as to what kinds of Address objects might be in a given message's OriginatorList.

Two framework extensions that might be made by a framework implementer are illustrated in FIG. 15. One Address subclass or object extension contains the Internet standard SMTP (Simple Message Transport Protocol) form of e-mail addresses (shown as SMTPAddress in the figure). Another Address subclass holds the IBM Corporation SNADS/OfficeVision (System Network Architecture Distribution Services) form of e-mail addresses (shown as SNADSAddress in the figure). Object oriented technology permits these extended object classes to further define their own specific methods or attributes. These particular subclasses are not part of the framework definition, but might be part of their support, as required by the framework implementer.

Figure 16:
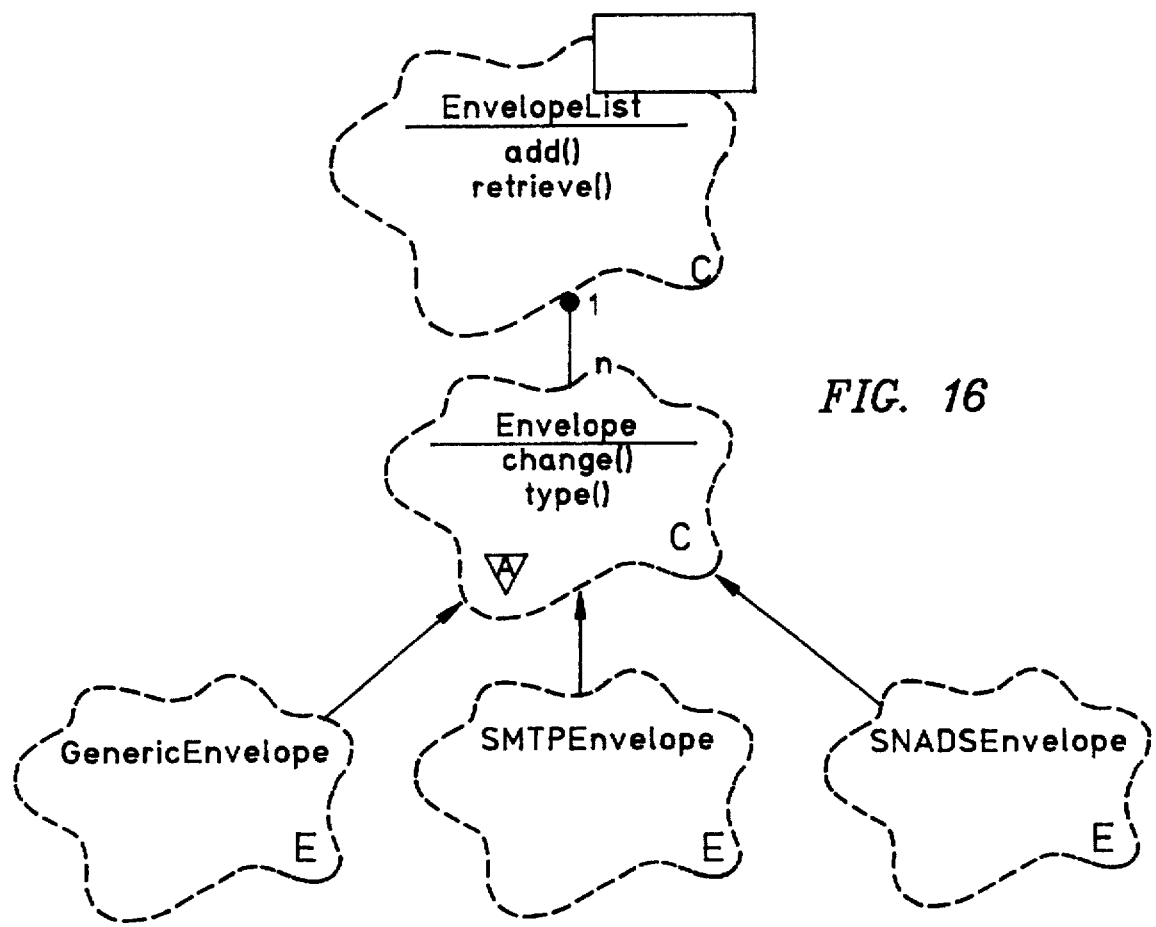
FIG. 16 is a class diagram representation of the "EnvelopeList" category implemented by the computer processing system illustrated in FIG. 8.

FIG. 16 is a class diagram that illustrates the objects that make up the framework's EnvelopeList class. The class is shown having a "has" relationship with a class called Envelope. The relationship of the objects in the Envelope class to the EnvelopeList class is considered to be "core", which means it is not modifiable in terms of the framework. There can be any number of EnvelopeList objects, but each is used or referenced by a single instance of a Message object. An EnvelopeList object contains the list of Envelope objects of a specific e-mail message. An Envelope object is defined by the framework to hold information about an e-mail message, such as its priority, title, subject matter, and so forth. This information is also known as e-mail "header" information, as it describes attributes of an e-mail message to the messaging service but is not the message content. Thus, there will be an Envelope object associated with the e-mail message and the Envelope objects help determine the processing that the e-mail message will receive as it is transferred by the framework system to the message recipients.

The framework of the invention does not define envelope formats or their contents. Its design permits many envelope objects that are part of a single e-mail message's EnvelopeList. Each might have been created to hold different information or the same information about a piece of e-mail, but in various formats. The actual content of an instantiated EnvelopeList object can be added or changed as part of the processing of a Message object. The EnvelopeList object defines the methods called add( ), used when adding a new envelope to an EnvelopeList, and retrieve( ), used when accessing an entry in a Message object's EnvelopeList.

The class called Envelope is shown in FIG. 16 to be an abstract base class. The design of the framework assumes that objects in this class are subclassed as part of extending the framework to support a specific e-mail envelope format (or multiple possible formats) as part of its customization. An implementer of the framework has to extend the Envelope object in this manner. The framework permits any number of subclassed Envelope objects to exist within the same framework. Each extended Envelope class is assumed to define a unique identifying object type. There are no EnvelopeList object requirements as to what kinds of envelope objects might be in a given message's EnvelopeList.

FIG. 16 shows three framework extensions that might be made by a framework implementer. One Envelope object extension has been designed to hold the Internet standard SMTP forms of e-mail message attributes (shown as SMTPEnvelope in the figure). Another extension has been designed to hold the IBM Corporation SNADS/OfficeVision forms of e-mail message attribute (shown as SNADSEnvelope in the figure). Another extension holds a "generic" or non-protocol-specific form of e-mail message attributes (shown as GenericEnvelope in the figure). These extended objects can further define specific methods or attributes that are part of their required support as determined by the implementer of the framework. The Envelope object defines two methods, change( ), used when changing an Envelope, and type( ), used to retrieve the Envelope's protocol identifying type.

Figure 17:
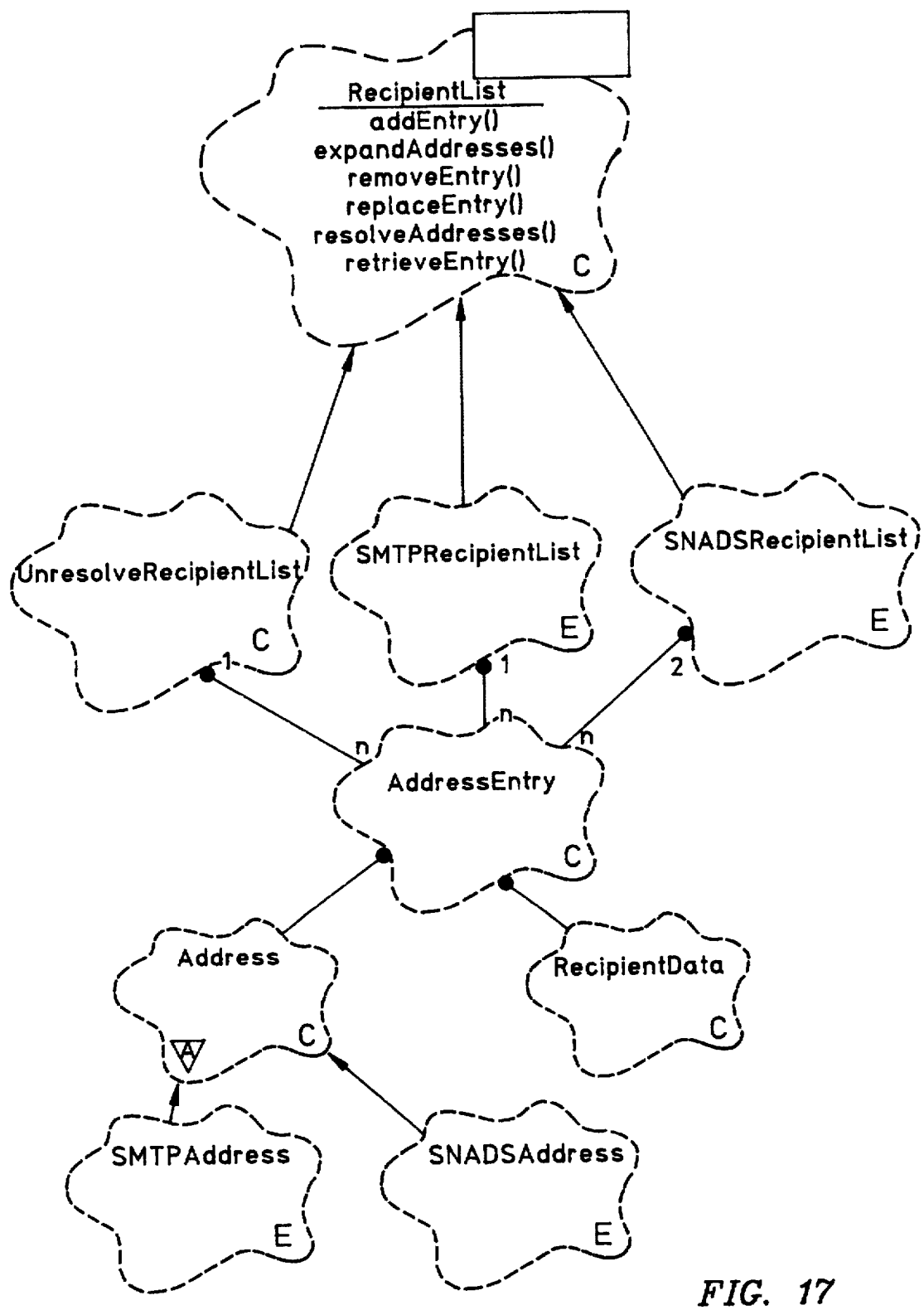
FIG. 17 is a class diagram representation of the "RecipientList" category implemented by the computer processing system illustrated in FIG. 8.

FIG. 17 is a class diagram that illustrates the objects that make up the framework's RecipientList class. The relationship of the recipient objects to the RecipientList class is considered to be "core" or not modifiable in terms of the framework. A recipient object is defined by the framework to hold information about an e-mail message's destination (s), as specified by an e-mail address. The framework does not define e-mail address formats or their contents. This definition is part of the framework extension that is carried out by the framework implementer. The framework permits recipients to be added, changed, or replaced as part of the processing of a Message.

The RecipientList class is designed to support a key function of the framework: "resolving" an e-mail address. Resolving an e-mail address means determining a specific set of e-mail services and support that are required for transferring the e-mail message to its intended recipients. These services and support are implemented in object class methods. Resolving an e-mail address permits the framework to have the flexibility to support multiple instances of class object extensions that each support different requirements of processing for e-mail messages. The framework can be extended to support multiple specific sets of e-mail functions in subclassed methods. Any one of these sets or possibly all of them might be invoked as part of processing of a single Message object. In resolving an e-mail address, the RecipientList of a message is processed to generate separate, specific objects that are defined by their framework class extensions. For example, an e-mail message recipient list that includes a SNADS address is resolved into a SNADSRecipientList object, which therefore defines a SNADS-protocol recipient.

When a Message object is created, it is assumed that all the addresses of a piece of e-mail are in an unresolved condition. One of the methods that is invoked as part of the framework's processing of every Message object is the resolveAddresses( ) method, which is invoked against the Message object. The resolveAddresses( ) method in turn uses a resolveAddresses( ) method that is defined against the RecipientList object class. This method operates on the UnresolvedRecipientList object. This object belongs to a subclass of the RecipientList object class and is predefined as a core part of the framework, as indicated by the "C" in its class cloud. The framework removes AddressEntry objects from the unresolved recipient list and adds them to another RecipientList class object that has been defined as part of the implementer's extension of the framework. In this manner, the framework essentially "steers" (or resolves) unresolved addresses into the appropriate RecipientList object class that has the method defined to process messages with recipient addresses of that class.

Each specific Address object type must be supported by a resolveAddresses( ) method that is used by the framework when an Address object of that type exists in the UnresolvedRecipientList list object of a Message. The resolveAddresses( ) method reclassifies the Address object from the unresolved list to a list of the appropriate recipient type. Thus, the resolveAddresses( ) method could be said to help the address to "resolve itself" by the method's functioning and be removed from the UnresolvedRecipientList list and added to another recipient list object that is attached to the same instance of the message. The RecipientList class shown in FIG. 17 is an abstract base class. The framework design assumes that objects in this class are subclassed as part of extending the framework to support specific e-mail attachment recipient lists as part of framework customization by the framework user. A user of the framework extends the RecipientList class in this manner.

Two exemplary framework extensions that might be made by a framework user are illustrated in FIG. 17. One RecipientList object extension has been designed to define a class of RecipientList objects for recipients identified as being resolved to Internet standard SMTP forms of e-mail methods (shown as SMTPRecipientList in the figure). Another RecipientList object extension has been designed to define a class of RecipientList objects for recipients resolved to the IBM Corporation SNADS/OfficeVision form of e-mail (shown as SNADSRecipientList in the figure). FIG. 17 illustrates the framework being extended such that the framework user has allowed for the support of messages that require both these kinds of processing. Because a single message can have multiple recipients, it is possible that an Address is resolved either to one of these recipient lists or to both of the recipient lists, as the extended framework processes each message. These extended objects can further define specific methods or attributes that are part of their required support, as seen by the implementer.

FIG. 17 shows that the RecipientList object defines the following methods: an addEntry( ) method that is used when adding a new AddressEntry object to a RecipientList, and expandAddresses( ) method used when expanding a recipient list AddressEntry object into many AddressEntry objects from a single e-mail address that represents a list of e-mail addresses, as in a named distribution list. Another method is resolveAddresses( ), which is used when processing the UnresolvedRecipientList object's AddressEntry objects. A retrieveEntry( ) method is used when the RecipientList object is accessing an AddressEntry object in a Message object's RecipientList type object entries. A removeEntry( ) method is used when removing an AddressEntry object from a Message object's RecipientList. This is needed so as to implement a "resolve" function, since it implies an AddressEntry object is removed from the UnresolvedRecipientList as part of its resolution. Finally, a replaceEntry( ) method is used when replacing an AddressEntry object in a Message object's RecipientList. This is needed so as to implement a "replace" function, because it implies an AddressEntry object is removed from any RecipientList and replaced by another AddressEntry object. It should be noted that invoking a removeEntry( ) method followed by an addEntry( ) method could have substituted for the replaceEntry( ) method, but there could be specific differences in how the replaceEntry( ) method works as compared with combining these two methods, and having a separate method permits these differences to exist within the framework.

Another object in the RecipientList class is that of AddressEntry. The framework requires that any subclassed RecipientList objects must reference AddressEntry objects. AddressEntry objects reference specific framework objects of a class called RecipientData, and also the Address object of the recipient. RecipientData objects provide an open area for attributes specific to an e-mail address, such as information about its status (i.e. local, remote, or non-deliverable) associated with every instance of an Address object in a recipient list. The class of Address objects are the same as described in the OriginatorList object section above.

Figure 18:
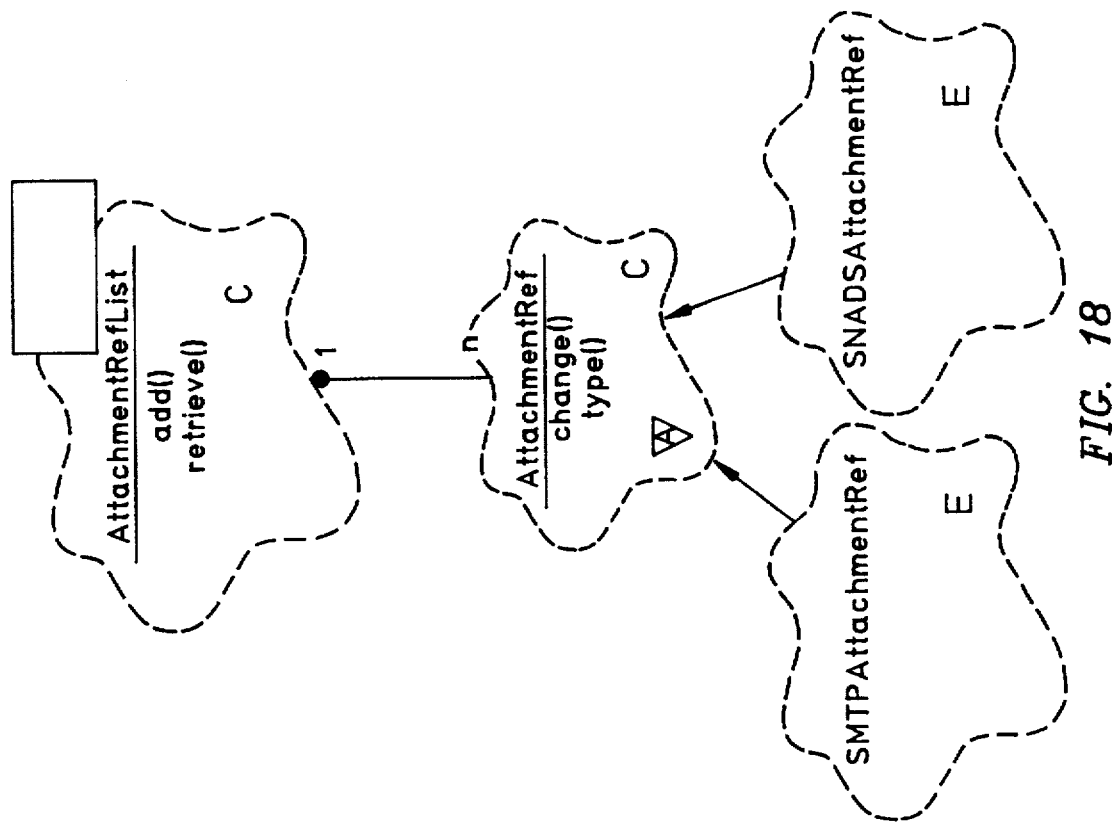
FIG. 18 is a class diagram representation of the "AttachmentRefList" category implemented by the computer processing system illustrated in FIG. 8.

FIG. 18 is a class diagram that illustrates the inheritance structure of the framework's AttachmentRefList. The relationship of the AttachmentRef objects to the AttachmentRefList class is considered to be "core", or not modifiable in terms of the framework. The framework does not define e-mail attachment reference formats or their contents. The design of the framework does assume (but does not require) that the attachment is usually a reference to the location of what might be message content. That is, the message body is treated as an attachment. The framework design permits any number of attachments in a Message object's AttachmentRefList and permits attachments to be added or changed as part of the processing of a Message. There can be any number of AttachmentRefList objects, but each is used or referenced by a unique Message object. The framework doesn't define or restrict an AttachmentRef object on one e-mail message from referencing the same physical AttachmentRef as another message. An attachment list contains the list of attachments of a message. An attachment is defined by the framework to hold information about an e-mail message's content as specified by a reference that is part of the attachment list entry. This is also known as e-mail "body" or "content" information.

The framework also does not define attachment formats or their contents. Its design permits many attachment objects that are part of a single e-mail message's AttachmentRefList. Each attachment object might have been created to hold different information or the same information about the attachment to a piece of e-mail, but in various formats. An attachment can be added or changed as part of the processing of a Message. There are no restrictions made that a Message object must use any AttachmentRefList object at all, as in the case where an e-mail message has no attachments (as in a report of delivery).

If the implementer of the framework decides to treat the message contents, or body, of an e-mail message as an AttachmentRef object, then every Message object for an e-mail message having a message body would include an AttachmentRef object. Alternatively, if the implementer of the framework decides to use AttachmentRef objects strictly for message attachments, such as text attached to a reply message, then a Message object would include an AttachmentRef object only if the e-mail message included a message attachment. In any case, because the AttachmentRefList class is an abstract base class and the associated objects are core objects, the framework implementer must define at least one such AttachmentRef object and the associated processing methods.

The objects of the AttachmentRefList class define the following methods: an add( ) method used when adding a new attachment to an AttachmentRefList, and a retrieve( ) method used when accessing an entry in a Message object's AttachmentRefList entries. An AttachmentRef object is an abstract object type. The framework design assumes that an AttachmentRef object must be subclassed as part of extending the framework to support a specific e-mail attachment reference format as part of its customization. An implementer of the framework will have to extend the AttachmentRef object in this manner. The framework permits any number of subclassed AttachmentRef objects to exist. Each extended AttachmentRef class is assumed to define a unique identifying object type. There are no AttachmentRefList object requirements as to what kinds of attachments might be in a given message's AttachmentRefList.

Two exemplary framework extensions that might be made by a framework user are illustrated in FIG. 18. One AttachmentRef object extension defines a reference to an Internet standard SMTP (or MIME) form of e-mail attachments (shown as SMTPAttachmentRef in the drawing figure). Another object extension defines a reference to an IBM Corporation SNADS/OfficeVision form of e-mail message attachment (shown as SNADSAttachmentRef in the figure). These extended objects can further define specific methods or attributes that are part of their required support as seen by the user of the framework. FIG. 18 shows the AttachmentRef object defines methods called change( ), used when changing an AttachmentRef, and type( ), used to retrieve the AttachmentRef's identifying type.

Figure 19:
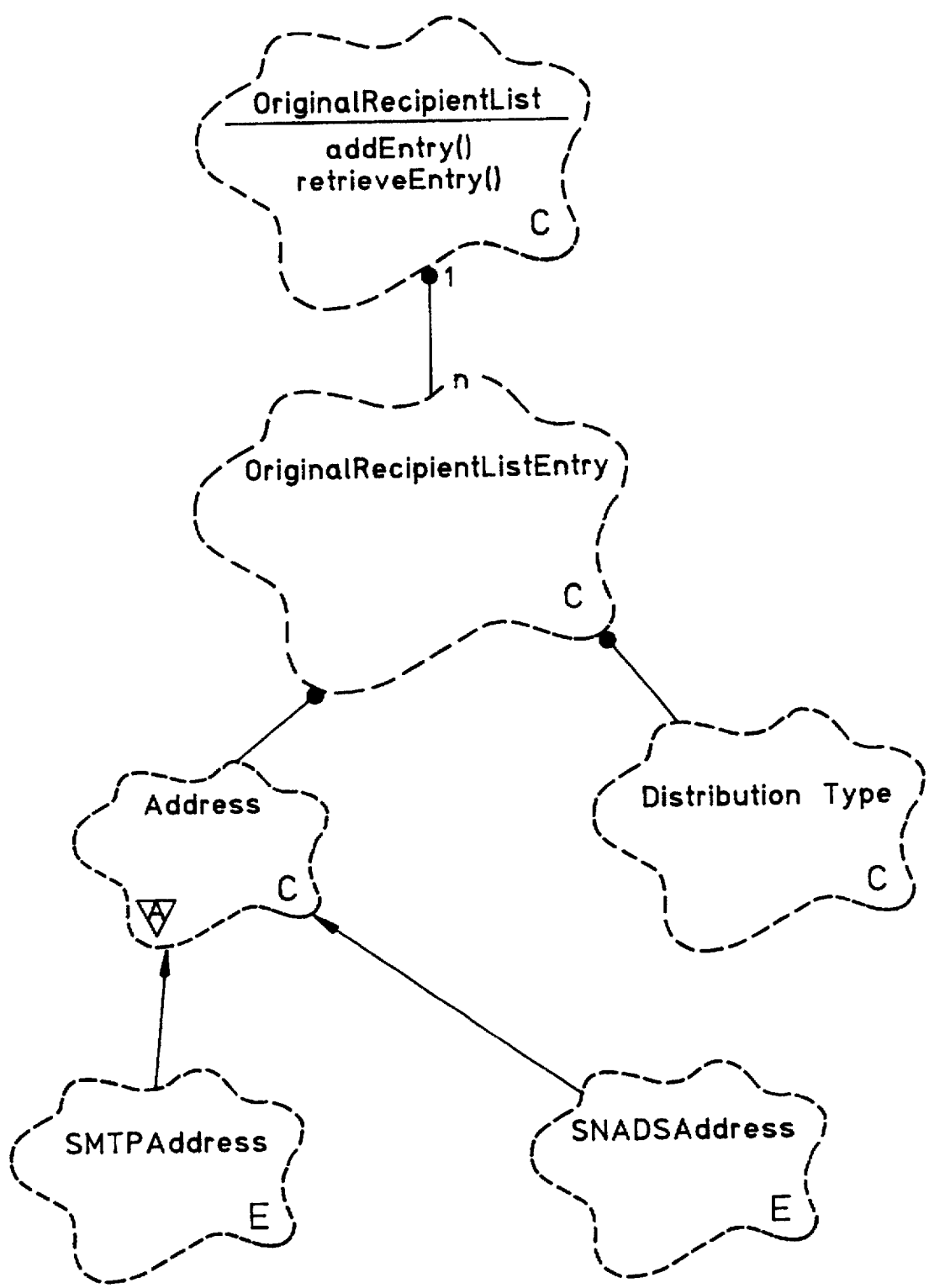
FIG. 19 is a class diagram representation of the "OriginalRecipientList" category implemented by the computer processing system illustrated in FIG. 8.

FIG. 19 is a class diagram that illustrates the objects that make up the framework's OriginalRecipientList. The relationship of the OriginalRecipientList objects to the OriginalRecipientList class is considered to be "core", or not modifiable in terms of the framework. A recipient object is defined by the framework to hold information about an e-mail message's destination(s), as specified by an e-mail address. An OriginalRecipientList object contains the list of original recipients of a message when it was first created by the originating application. When the mail is received, the OriginalRecipientList entries permit the receiver to see where that piece of e-mail was originally sent.

This processing is different from the recipient list processing in that an object in the OriginalRecipientList class is assumed to remain the same when a message is processed by a mail service. The recipient list might be divided into subsets as copies of a piece of e-mail are moved from system to system through an e-mail network. The OriginalRecipientList is assumed to contain the original list of recipients that are not used for routing and forwarding mail, but rather for reporting where the mail was originally sent to all recipient's of the piece of mail. The framework does not define e-mail address formats or their contents. Such definitions must be part of the framework extension done by the framework user.

FIG. 19 shows that the OriginalRecipientList object defines methods called addentry( ), which is used when adding a new OriginalRecipientListEntry object to an OriginalRecipientList class, and retrieveEntry( ), which is used when accessing an OriginalRecipientListEntry object in a Message object's OriginalRecipientList class. Thus, the OriginalRecipientList references OriginalRecipientListEntry objects, and OriginalRecipientListEntry objects reference a specific Address object and a DistributionType object of the original recipient. Objects in the DistributionType class permit the originator of an e-mail message to identify if the original address being sent to was specified as "to:", "cc:" (carbon copy), or "bcc:" (blind carbon copy). The framework assumes that message handling will be performed according to convention for these specifications, but is not involved with what comprises such handling. That is, the information that such entries were included in the message are passed on, but do not result in additional processing steps performed by the framework system. The Address objects are the same as described in the OriginatorList object section above.

Figure 20:
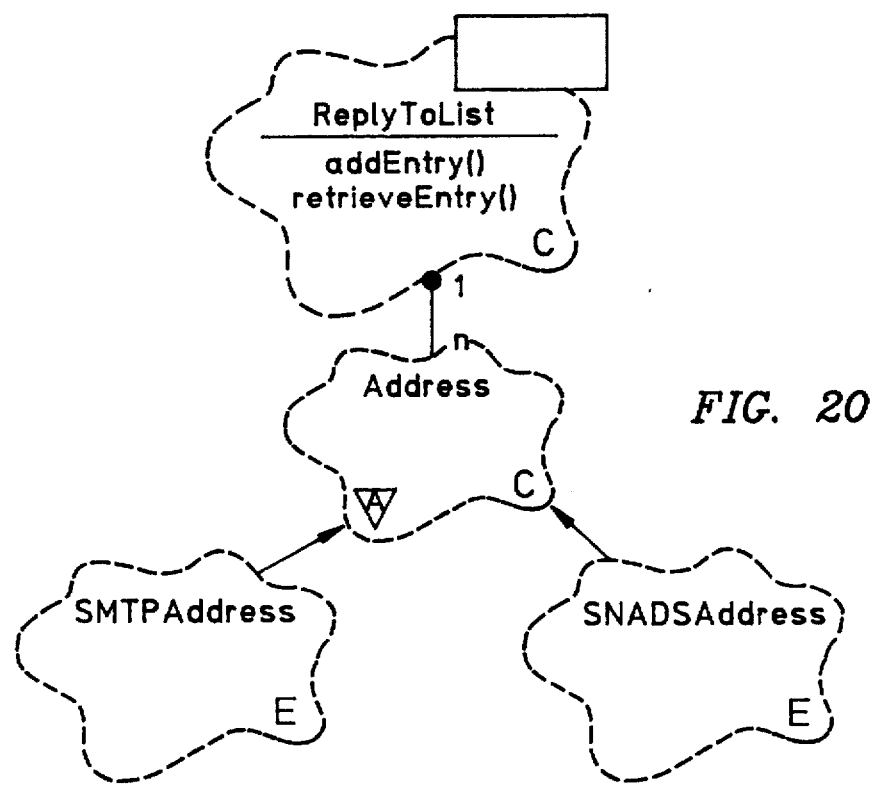
FIG. 20 is a class diagram representation of the "ReplyToList" category implemented by the computer processing system illustrated in FIG. 8.

FIG. 20 is a class diagram that illustrates the objects that make up the framework's ReplyToList class. The relationship of the Address objects to the ReplyToList class is considered to be a "core" relationship that is not user modifiable. There can be any number of ReplyToList objects, but each is used or referenced by a unique Message object. The ReplyToList class contains the list of e-mail addresses that should be copied on any reply made to a message by a receiving person (e-mail destination). E-mail message replies would be assumed to only be generated by a receiving application. The framework does not define e-mail address formats or their contents. Such definitions must be part of the framework extension done by the framework user.

FIG. 20 shows the ReplyToList objects define methods called addEntry( ), which is used when adding a new address to a ReplyToList, and retrieveEntry( ), which is used when accessing an entry in a Message object's ReplyToList entries. The Address objects are the same as described in the OriginatorList object section above.

Figure 21:
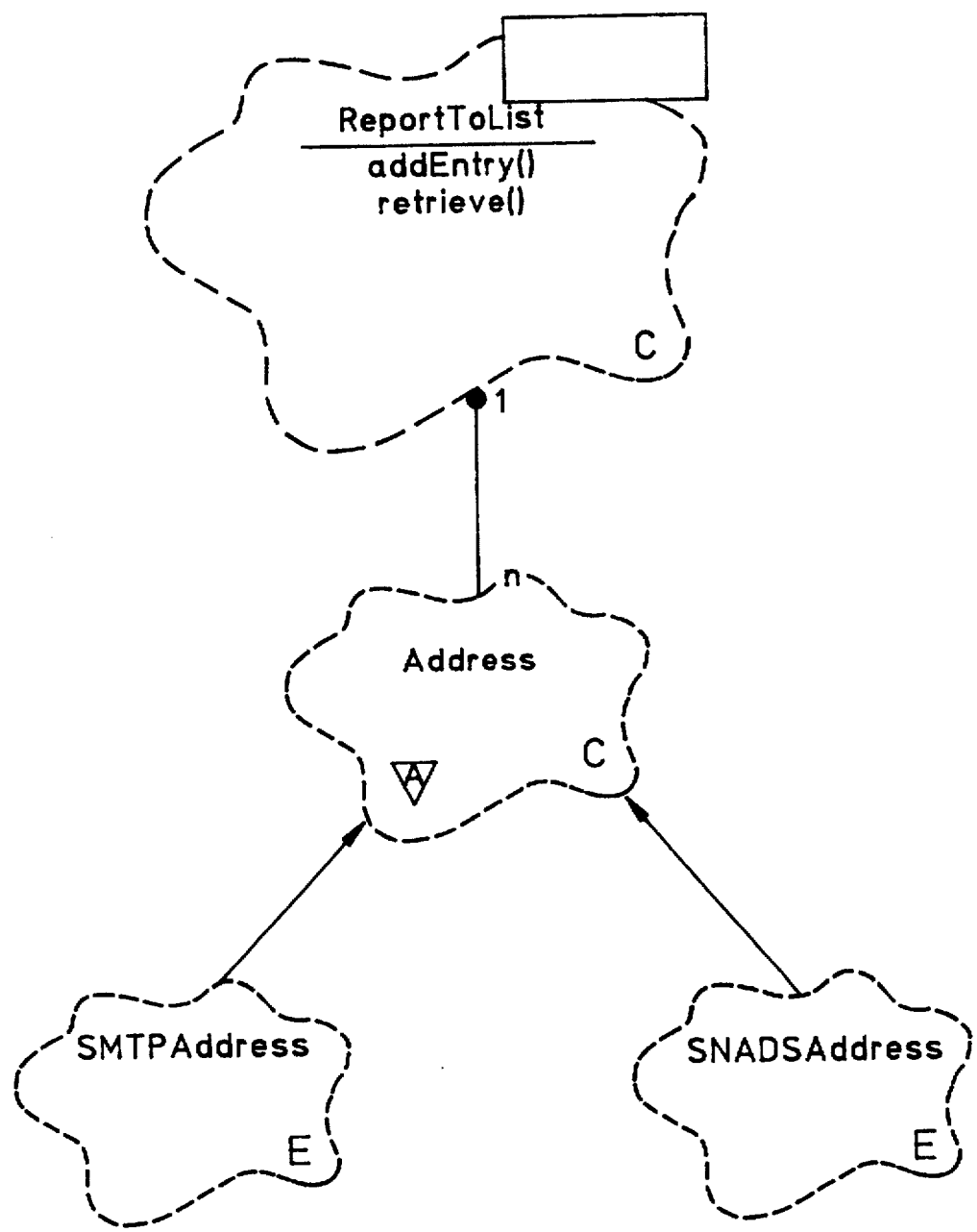
FIG. 21 is a class diagram representation of the "ReportToList" category implemented by the computer processing system illustrated in FIG. 8.

FIG. 21 is a class diagram that illustrates the objects that make up the framework's ReportToList class. The relationship of the Address objects to the ReportToList class is considered to be a core relationship and not modifiable.

There can be any number of ReportToList objects, but each is used or referenced by a unique Message object. The objects of the ReportToList class comprise the list of e-mail addresses that should be reported to for reasons of delivery, non-delivery, or forwarding for an e-mail message. Reports would be assumed to be generated by any extended framework class method or application receiving a piece of e-mail. The framework does not define e-mail address formats or their contents. Such definitions must be part of the framework extension done by the framework user.

FIG. 21 shows the ReportToList objects define methods called addEntry( ), which is used when adding a new address to a ReportToList, and retrieveEntry( ), which is used when accessing an entry in a Message object's ReportToList entries. The Address objects are the same as described in the OriginatorList object section above.

Figure 22:
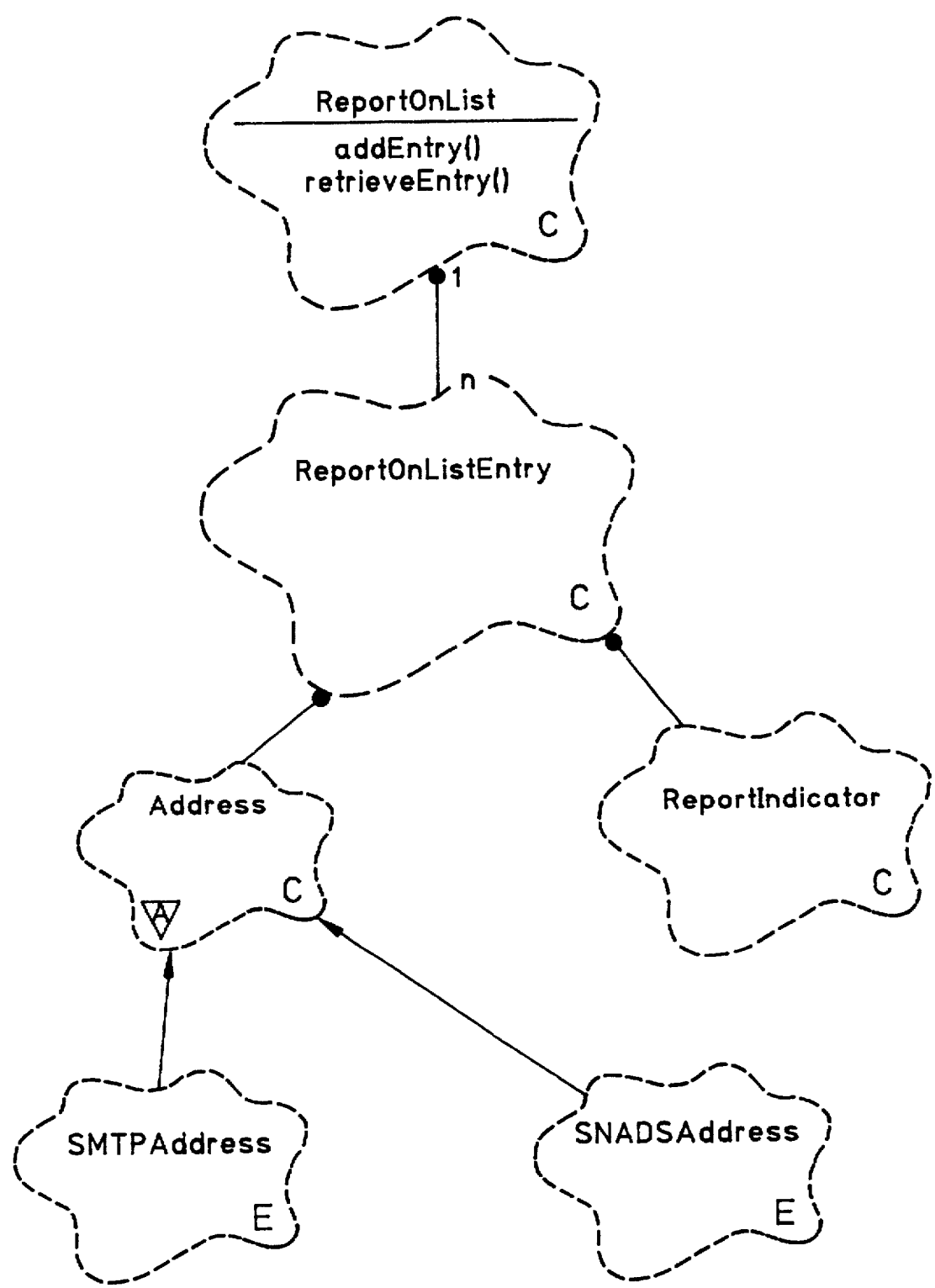
FIG. 22 is a class diagram representation of the "ReportOnList" category implemented by the computer processing system illustrated in FIG. 8.

FIG. 22 is a class diagram that illustrates the objects that make up the framework's ReportOnList class. The relationship of the Address objects to the ReportOnList class is considered to be core and not modifiable in terms of the framework. There can be any number of ReportOnList objects, but each is used or referenced by a unique Message object. The objects of the ReportOnList comprise the list of e-mail addresses on which reports are being generated. In the case that an e-mail message is a report of delivery, non-delivery, or forwarding, the message indicates the recipients for which such reports are being generated. Reports would be assumed to be generated by any extended framework class method. The framework does not define e-mail address formats or their contents. Such definitions must be part of the framework extension done by the framework user.

FIG. 22 shows the ReportOnList objects define methods called addEntry( ), which is used when adding a new address to a ReportOnList, and retrieveEntry( ), which is used when accessing an entry in a Message object's ReportOnList entries. Objects in the ReportOnListEntry class reference ReportOnListEntry objects. ReportOnListEntry objects reference a specific Address object and a Report Indicator object of the reported-on recipient. Objects in the ReportIndicator class contain the information about what is being reported on, such as whether the message is the report of delivery or an error and, if error, the type of error. The Address objects are the same as described in the OriginatorList object section above.

Figure 23:
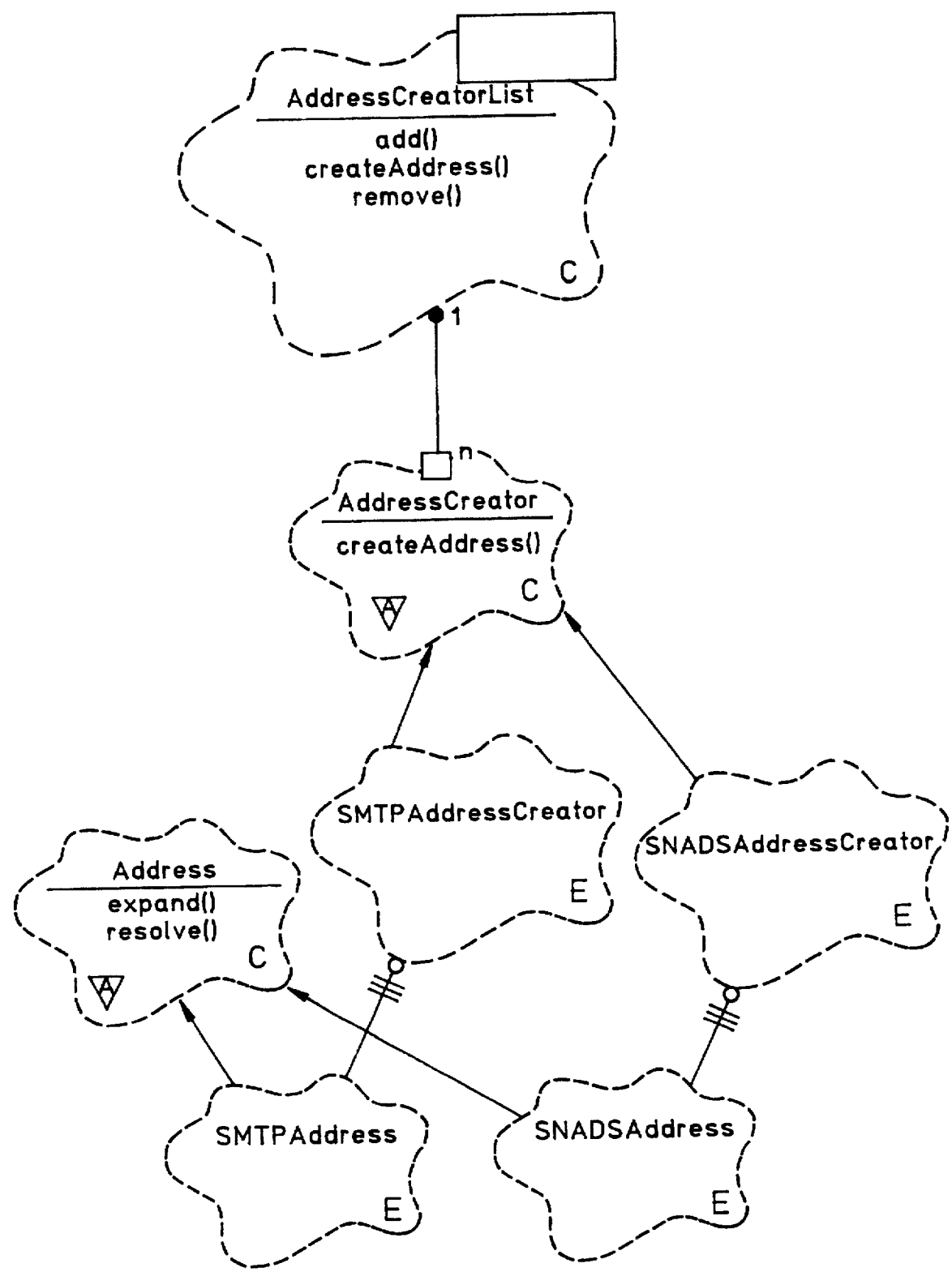
FIG. 23 is a class diagram representation of the "AddressCreatorList" class that belongs to the Message Center category implemented by the computer processing system illustrated in FIG. 8.

FIG. 23 is a class diagram that illustrates the objects that make up the framework's AddressCreatorList class. There is one AddressCreatorList object for every MessageCenter object. The relationship of the objects of the AddressCreator class to the objects of the AddressCreatorList is considered to be core and not modifiable in terms of the framework. The AddressCreatorList is used by the MessageCenter in the construction of every Address object. Note that addresses are contained within many other framework objects. The framework does not define e-mail address formats or their contents. Such definitions must be part of the framework extension done by the framework user. In this case, the extensions to the framework are made by subclassing the AddressCreator object to produce a new specific class that creates an Address object.

FIG. 23 shows the AddressCreatorList objects define methods called addEntry( ), which is used when adding a new AddressCreator to the AddressCreatorList, and removeEntry( ), which is used when removing an AddressCreator object from the AddressCreatorList class. The objects of the AddressCreator class are abstract object types. The framework design assumes that such objects must be subclassed as part of extending the framework to support a specific e-mail address format as part of its customization. A framework user will have to extend the AddressCreator object in this manner. Exemplary subclasses are shown in FIG. 23, where AddressCreator objects are subclassed to create SMTPAddress and SNADSAddress objects. FIG. 23 shows the AddressCreator object defines a method called createAddress( ), which is used by the framework to create an Address object.

Figure 24:
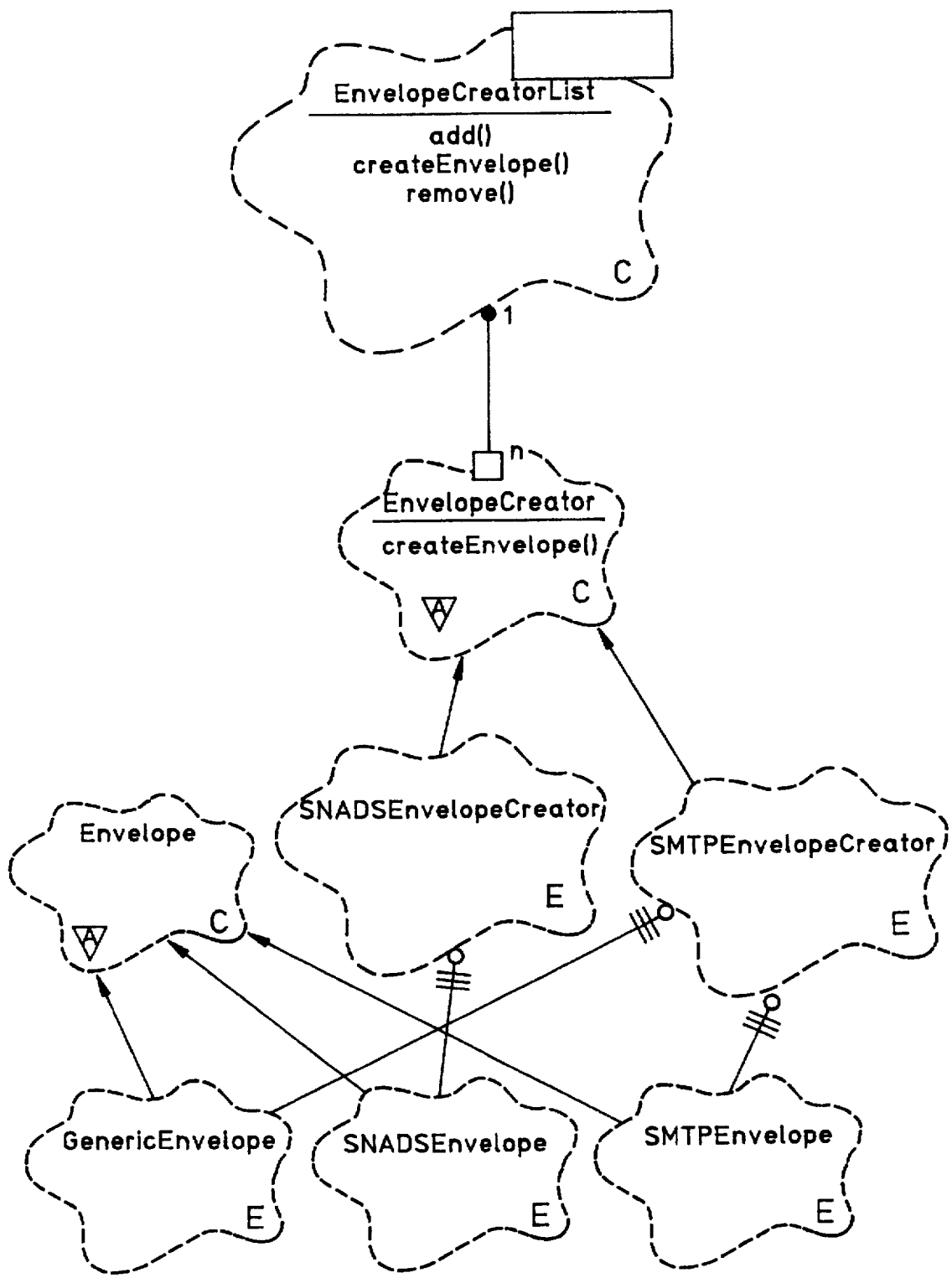
FIG. 24 is a class diagram representation of the "EnvelopeCreatorList" class that belongs to the Message Center category implemented by the computer processing system illustrated in FIG. 8.

FIG. 24 is a class diagram that illustrates the objects that make up the framework's EnvelopeCreatorList class. There is one EnvelopeCreatorList object for every MessageCenter object. The relationship of the EnvelopeCreator objects to the EnvelopeCreatorList class is considered to be core and not modifiable in terms of the framework. The EnvelopeCreatorList is used by the MessageCenter in the construction of every Envelope object. The framework does not define e-mail envelope formats. Such definitions are part of the framework extension done by the framework user. In this case the extensions to the framework are made by subclassing the EnvelopeCreator objects to produce a new specific class that creates an Envelope object.

FIG. 24 shows that the EnvelopeCreatorList object defines methods called addEntry( ), which adds a new EnvelopeCreator to the EnvelopeCreatorList, and removeEntry( ), which removes an EnvelopeCreator from the EnvelopeCreatorList. The EnvelopeCreator objects are abstract object types. The framework design assumes that such objects are subclassed as part of user framework customization that extends the framework to support a specific e-mail envelope format. That is, a framework user must extend the EnvelopeCreator object in this manner. FIG. 24 shows three exemplary sub-classed EnvelopeCreator objects that create objects in classes called SMTPEnvelope, SNADSEnvelope, and GenericEnvelope. In the exemplary system illustrated by FIG. 24, the GenericEnvelope class conveniently provides a general specification class into which messages can be categorized. FIG. 24 shows that the EnvelopeCreator object defines a method called createEnvelope( ), which creates an Envelope object.

Figure 25:
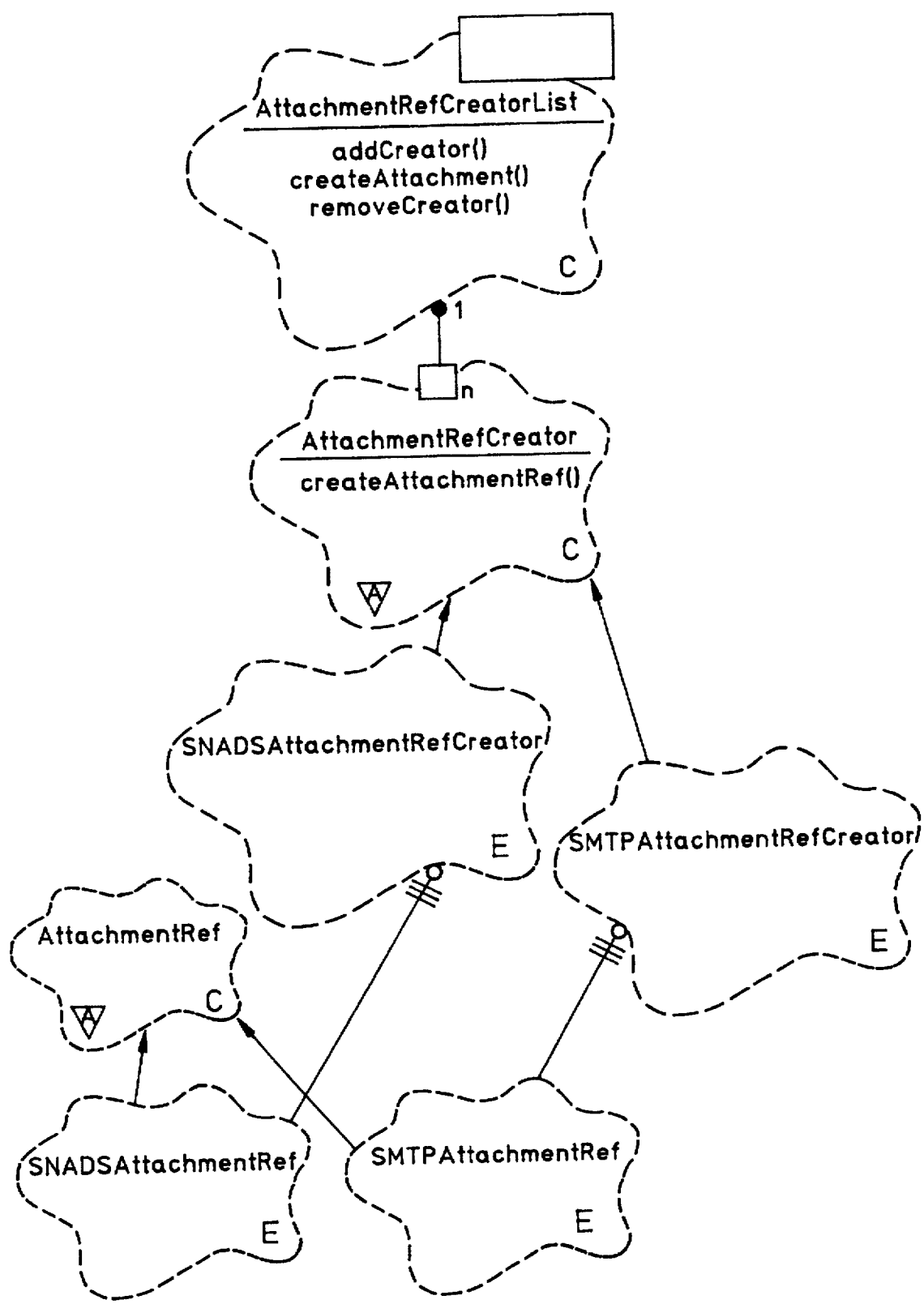
FIG. 25 is a class diagram representation of the "AttachmentRefCreatorList" class that belongs to the Message Center category implemented by the computer processing system illustrated in FIG. 8.

FIG. 25 is a class diagram that illustrates the objects that make up the framework's AttachmentRefCreatorList class. There is one AttachmentRefCreatorList object for every MessageCenter object. The relationship of the AttachmentRefCreator objects to the AttachmentRefCreatorList class is considered to be core and not modifiable in terms of the framework. The AttachmentRefCreatorList is used by the MessageCenter in the construction of every AttachmentRef object. The framework does not define e-mail attachments nor does it define how attachments are referenced by a message. Such definitions are part of the framework extension done by the framework user. In this case, the extensions to the framework are made by subclassing the AttachmentRefCreator object to produce a new specific class that creates an AttachmentRef object.

FIG. 25 shows that the AttachmentRefCreatorList object defines methods called addEntry( ), which adds a new AttachmentRefCreator object to the AttachmentRefCreatorList, and removeEntry( ), which removes an AttachmentRefCreator object from the AttachmentRefCreatorList. FIG. 25 shows the AttachmentRefCreator to be an abstract object type. The design of the framework assumes that such objects are subclassed as part of a user extending the framework to support a specific e-mail attachment reference format. A framework user must extend the AttachmentRefCreator object in this manner.

Two examples of such extension are shown in FIG. 25. Sub-classed AttachmentRefCreator objects create SMTPAttachmentRef objects and SNADSAttachmentRef objects. It might be possible that there not actually be any need for more than one kind of reference, so that a file name might serve more than one kind of e-mail protocol. The abstraction of attachment references within the framework allows the framework user to extend it in this manner. FIG. 25 shows the AttachmentRefCreator object defines a method called createAttachmentRef( ), which creates an AttachmentRef object.

Scenario diagrams

The operating steps performed by the mail server system constructed in accordance with the invention will be better understood with reference to object diagrams, which those skilled in the art will understand show processing for an object oriented programming framework implementation. Object diagrams illustrate how object classes interact to provide the framework functions. The object diagrams described next assume some extension to the framework by a framework user. The scenarios use the exemplary class extensions used in the class definitions described above. The actual extensions implemented by a framework user can vary in accordance with the framework implementation.

Figure 26:
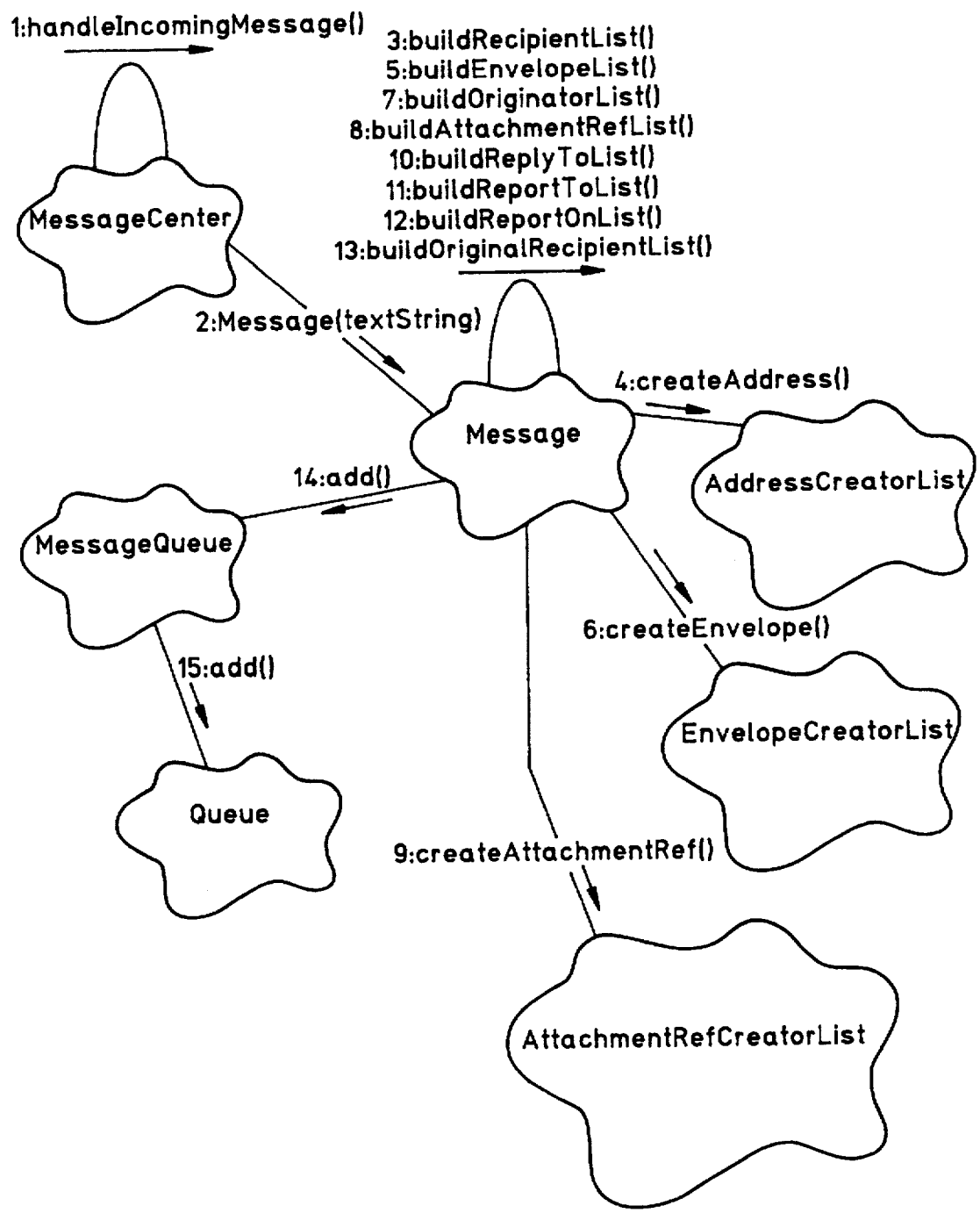
FIG. 26 is an object diagram that represents processing steps executed by the host processor illustrated in FIG. 8 when processing an incoming message and creating a Message object.

FIG. 26 is an object-scenario diagram for the framework implemented in the computer system illustrated in FIG. 8. FIG. 26 is a scenario that shows how an instantiation of a MessageCenter object (represented by the MessageCenter object cloud) responds to receipt of information comprising an e-mail message by creating a message object and starting to process it, as represented by the line that loops from the MessageCenter object cloud back to itself with the label "1: handleIncomingMessage( )".

More particularly, the handleIncomingMessage( ) method is called to handle the incoming information and create the Message object. The framework assumes that the method is passed one or more parameters that it uses to construct the Message object. The handleIncomingMessage( ) method assumes that one of the parameters it receives is a message text string. That is, the message is viewed by the framework processing as a string of text that is parsed into constituent parts, mapped onto the object classes described above in the class diagrams. The message text string is indicated in FIG. 26 as "textString". The contents of the textString are used as input to the rest of the methods of this scenario.

It should be noted that the framework does not specify the syntax of the textString used as input, but the methods added as part of the implementation of the framework will impose syntactical rules on the input textString because they will use it as input to build addresses, envelopes, and attachment references for pieces of e-mail that are handled by the framework. Part of the framework user's task is to consider the sources of e-mail messages and the form of the information to be received (it can be in other objects) in e-mail messages that are to be handled by the mail server system. The construction methods listed in this scenario are extensions to the framework that can recognize the information in these information forms.

The next step illustrated in the FIG. 26 scenario diagram is a call to the Message object constructor, as indicated by the legend "2: Message(textString)" on the connecting line from the MessageCenter object cloud to the Message object cloud. Thus, the MessageCenter object creates the Message object. The Message object constructor invokes all the other methods in this scenario in the order described. Next, the various objects necessary for message processing must be built. The next step is to call the buildRecipientList( ) method to create the RecipientList object of the Message object using the message textString as input, represented by "3: buildRecipientList( )" at the Message object cloud. As noted above, every Message object has a RecipientList.

Although it is possible for a Message object to have more than one RecipientList object, the normal scenario is that initially all e-mail recipients will be contained in an UnresolvedRecipientList object. A RecipientList object is a container of AddressEntry objects. Each AddressEntry object consists of an Address object and a RecipientData object. The createAddress( ) method is called next, represented by the legend "4: createAddress( )" on the connecting line from the Message object cloud to the AddressCreatorList object cloud, to build the Address object. The createAddress( ) method is called until there are no more recipient Address objects to add to the RecipientList object(s) of a message. This method returns the completed RecipientList object(s) to the Message constructor.

The createAddress( ) method is also called from buildOriginatorList, buildReplyList, buildReportToList, buildReportOnList, and buildOriginalRecipientList, as all these objects contain Address objects. This should be clear from the respective class diagrams described above. The respective method calls to createAddress( ) are not shown in the drawing, but are part of this scenario. The createAddress( ) method processing is described in greater detail below.

The next processing step is a call to the buildEnvelopeList( ) method to create the EnvelopeList object of the Message object using the textString as input. Again, every Message has an EnvelopeList. This step is represented by the legend "5: buildEnvelopeList( ) at the Message object cloud. An EnvelopeList is a container for Envelope objects. The createEnvelope( ) method is called to build each Envelope object, as represented by the legend "6: createEnvelope( )" on the connecting line from the Message object cloud to the EnvelopeCreatorList object cloud. This method is described in greater detail below. The createEnvelope( ) method is called until there are no more Envelopes to add to the EnvelopeList object of a Message. The createEnvelope( ) method returns the completed EnvelopeList object to the Message constructor.

The next step in FIG. 26 message processing is a call to the buildOriginatorList( ) method to create the OriginatorList object of the Message object using the textString as input, represented by "7: buildOriginatorList( )" at the Message object cloud. Every Message has an OriginatorList object, which is a container for Address objects. As part of the processing for this step, the createAddress( ) method is called to build each Address object. The createAddress( ) method is called until there are no more Addresses to add to the OriginatorList object of a Message. This method returns the completed OriginatorList object to the Message constructor.

The next step is represented by "8: buildAttachmentRefList( )" at the Message object cloud, which indicates a call to the buildAttachmentRefList( ) method to create the AttachmentRefList object of the Message object using the textString as input. The AttachmentRefList is an optional part of the Message object, and this method might not create one for a given textString, if the framework user chooses. An AttachmentRefList object is a container for AttachmentRef objects. The next step is to call the createAttachmentRef( ) method to build each AttachmentRef object, as represented by the legend "9: createAttachmentRef( )" on the connecting line from the Message object cloud to the AttachmentRefCreatorList object cloud. This method processing is described in greater detail below. The createAttachmentRef( ) method is called until there are no more AttachmentRef objects to add to the AttachmentRefList object of a Message. This method returns the completed AttachmentRefList object to the Message constructor.

The next step of message processing is to call the buildReplyToList( ) method to create the ReplyToList object of the Message object using the textString as input. The processing is represented by the legend "10: buildReplyToList" at the Message object cloud. The ReplyToList is an optional part of the Message object and this method might not create one for a given textString. A ReplyToList is a container for Address objects. As part of the processing for this step, the createAddress( ) method is called to build each Address object. The createAddress( ) method is called until there are no more Addresses to add to the ReplyToList object of a Message. This method returns the completed ReplyToList object to the Message constructor.

The next FIG. 26 processing step is represented by "11: buildReportToList( )" at the Message object cloud, which is a method call to create the ReportToList object of the Message object using the textString as input. The ReportToList is an optional part of the Message object, and this method might not create one for a given textString. A ReportToList is a container for Address objects. Therefore, part of the processing for this step is to call the createAddress( ) method to build each Address object. The createAddress( ) method is called until there are no more Addresses to add to the ReportToList object of a Message. This method returns the completed ReportToList object to the Message constructor.

After the ReportToList object is created, the next step is represented by "12: buildReportOnList( )", which is a method call to create the ReportOnList object of the Message object using the textString as input. The ReportOnList is an optional part of the Message object, and this method might not create one for a given textString. A ReportOnList is a container of ReportOnListEntry objects, which consist of an Address object and a ReportIndicator object. The processing for this step includes calling the createAddress( ) method to build the Address object. The createAddress( ) method is called until there are no more Addresses to add to the ReportOnList object of a Message. This method returns the completed ReportOnList object to the Message constructor.

The next processing step is represented by "13: buildOriginalRecipientList( )" at the Message object cloud, which is a method call to create the OriginalRecipientList object of the Message object using the textString as input. An OriginalRecipientList is a container of OriginalRecipientListEntry objects, which consist of an Address object and a DistributionType object. The processing for this step includes calling the createAddress( ) method to build the Address object. The createAddress( ) method is called until there are no more Addresses to add to the OriginalRecipientListEntry object of a Message. This method returns the completed OriginalRecipientList object to the Message constructor.

The Message object has now been constructed. The next step is to add the now constructed Message object to the MessageCenter's MessageQueue object, where it will remain until removed by the processMessage( ) method. The step of adding the Message object is represented in FIG. 26 by "14: add( )" on the connecting line from the Message object cloud to the MessageQueue object cloud. The processMessage( ) processing is described in greater detail below. Finally, the last step illustrated is to add the now constructed Message object to the MessageQueue's Queue object with an add( ) call, represented by the legend "15: add( )" on the connecting line from the MessageQueue object cloud to the Queue object cloud.

Figure 27:
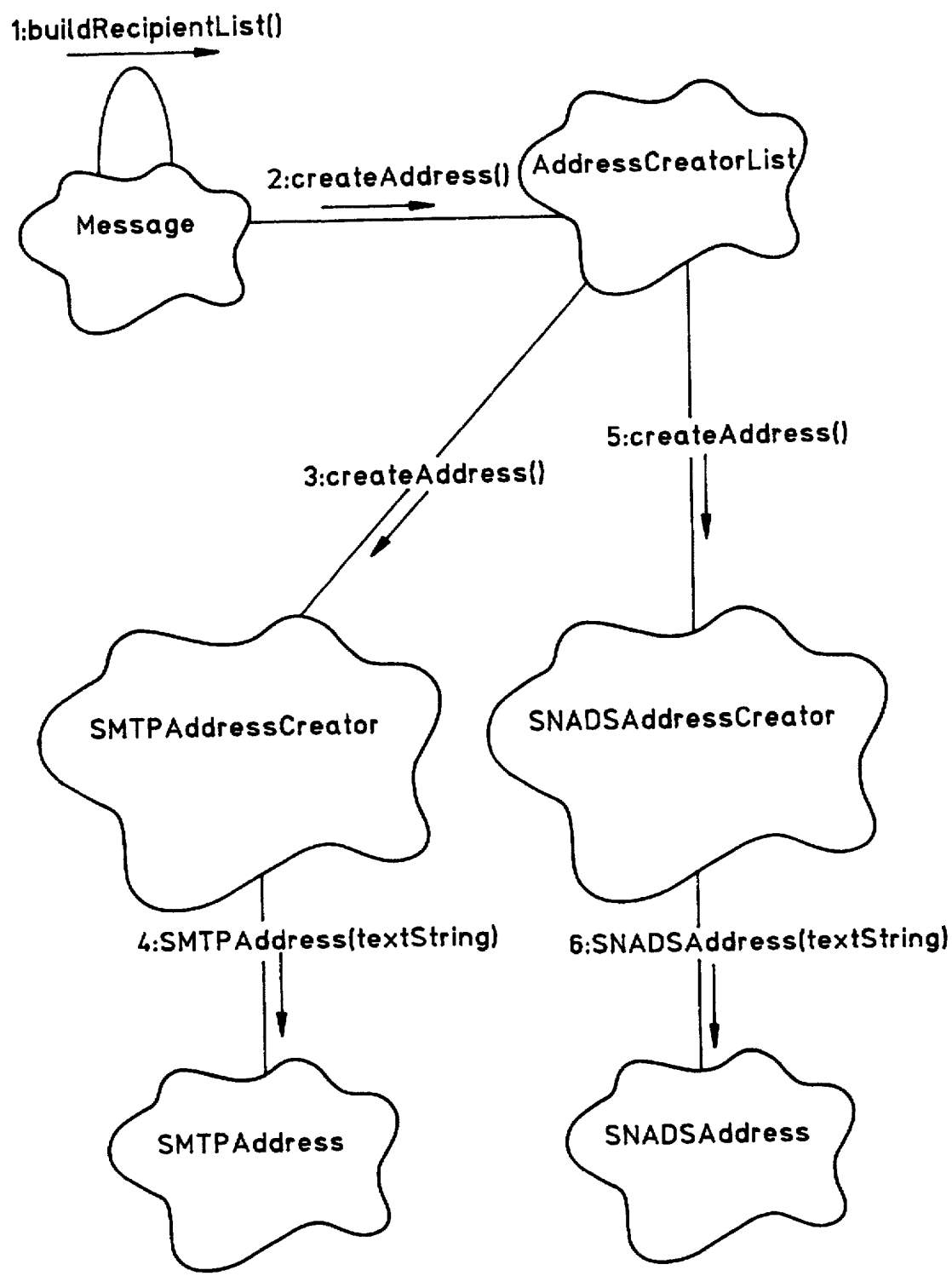
FIG. 27 is an object diagram that represents processing steps executed by the host processor illustrated in FIG. 8 when creating an Address object.

FIG. 27 shows the createAddress( ) method processing for the buildRecipientList( ) method, but it also applies similarly to the methods of buildOriginatorList( ), buildReplyToList( ), buildReportToList( ), buildReportOnList( ), and buildOriginalRecipientList( ), as all these methods involve Address objects. The createAddress( ) method processing ends with the completed Address objects being returned to the Message constructor within the list object that is being built (a RecipientList object, OriginatorList object, etc.). It must be possible to parse every valid message (as specified by textString) into at least one OriginatorList entry and one RecipientList entry. Therefore, a valid Message should include at least two such Address objects.

The FIG. 27 processing starts with a buildRecipientList( ) method call to the createAddress( ) method to build all RecipientList objects attached to the message, represented by "1: buildRecipientList( )" at the Message object cloud. In this scenario the assumption is that there are at least two Address creators, one for SNADS addresses and one for SMTP addresses. The next step, represented by "2: createAddress( )" from the Message object cloud to the AddressCreatorList cloud, is a method call against the AddressCreatorList with a textString that is to be constructed as an Address object that will be added to the RecipientList being built for a Message.

Next, the createAddress( ) method has to invoke each AddressCreator object that it contains until one of them returns an Address object that will be returned and added to the RecipientList object. This is represented by the legend "3: createAddress( )" on the connecting line from the AddressCreatorList object cloud to the SMTPAddressCreator object cloud. The next step is to call the SMTPAddress object constructor, represented by the legend "4: SMTPAddress(textString)" on the connecting line from the SMTPAddressCreator cloud to the SMTPAddress object cloud, passing it the textString that is used as input to create the SMTPAddress. The FIG. 27 scenario does not show that there could be other information used by the constructor to create the SMTPAddress object.

The createAddress( ) method is called again as part of this scenario when the SMTPAddressCreator object does not recognize the textString and therefore does not create an SMTPAddress object. Because, in this example, there is a SNADSAddressCreator object also known to the AddressCreatorList, the object will be called to make its own attempt to recognize the textString. This processing is represented by the connecting line with the legend "5: createAddress( )" to the SNADSAddressCreator object cloud and "6: SNADSAddress(textString)" to the SNADSAddress object cloud, passing it the textString that is used as input to create the SNADSAddress object. The FIG. 27 scenario does not show that there could be other information used by the constructor to create the SNADSAddress object.

Figure 28:
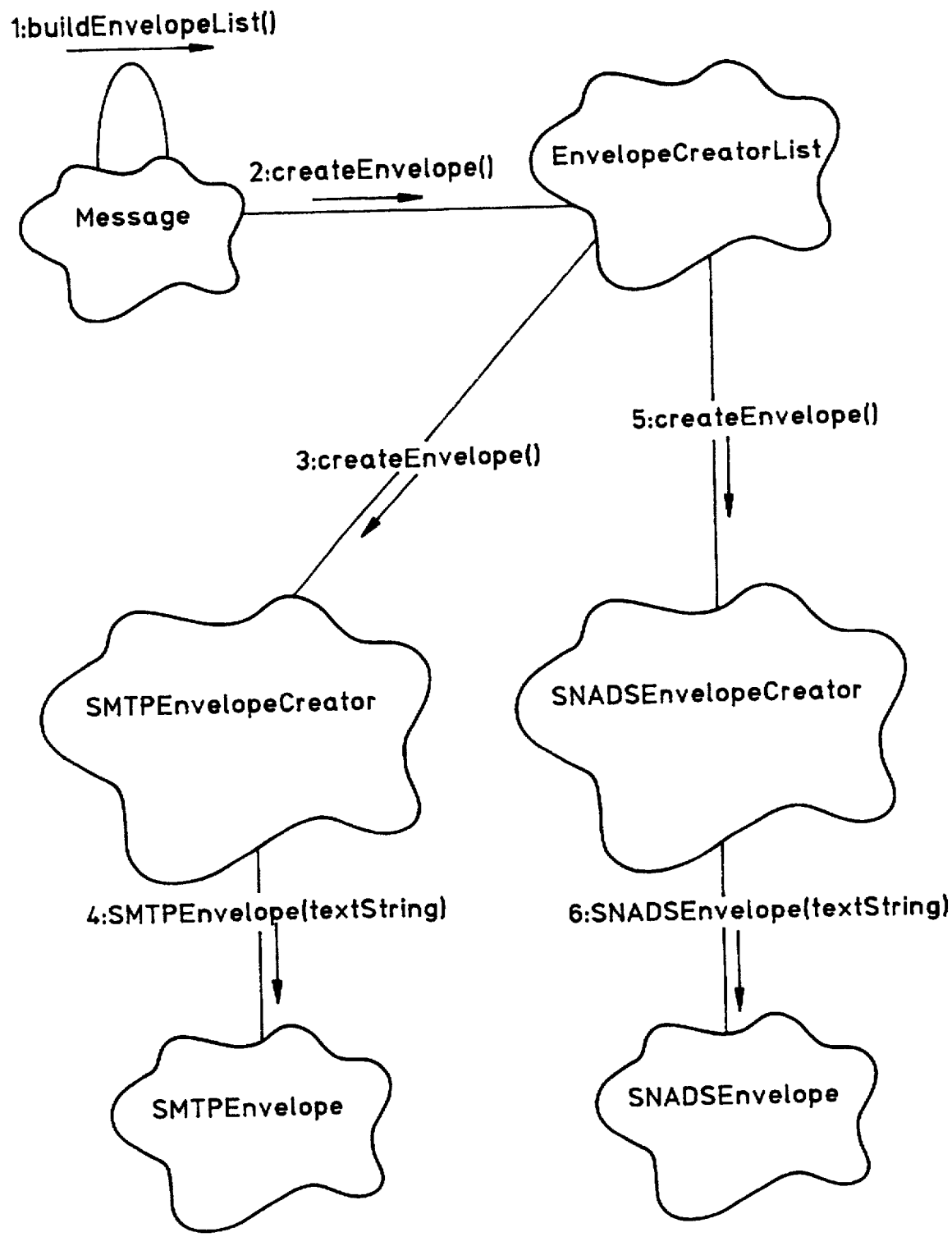
FIG. 28 is an object diagram that represents processing steps executed by the host processor illustrated in FIG. 8 when creating an Envelope object.

The createEnvelope( ) method is called to build each Envelope object. The createEnvelope( ) method is called until there are no more Envelopes to add to the EnvelopeList object of a message. This scenario ends with the completed Envelope objects being returned to the Message constructor within the EnvelopeList object that is being built. FIG. 28 illustrates the createEnvelope( ) processing.

First, the buildEnvelopeList( ) method will call the createEnvelope( ) method to build all EnvelopeList objects attached to the message. In this scenario, the assumption is that there are at least two Envelope creators. This step is represented by "1: buildEnvelopeList( )" on the loop at the Message object cloud. The createEnvelope( ) method is called next against the EnvelopeCreatorList with a textString that is to be constructed as an Envelope object that will be added to the EnvelopeList being built for a Message. This processing is represented by "2: createEnvelope( )" on the connecting line from the Message cloud to the EnvelopeCreatorList cloud.

The createEnvelope( ) method has to invoke each EnvelopeCreator object that it contains until one of then returns an Envelope object that will be returned and added to the EnvelopeList object. Such processing is represented by the connecting line with the legend "3: createEnvelope( )" on the connecting line to the SMTPEnvelopeCreator cloud. Next, the SMTPEnvelope( ) object constructor is called, passing it the textString that is used as input to create the SMTPEnvelope. This is represented by the legend "4: SMTPEnvelope(textString)" on the connecting line to the SMTPEnvelope cloud. The FIG. 28 scenario does not show that there could be other information used by the constructor to create the SMTPEnvelope object.

The createEnvelope( ) method is called again as part of this scenario when the SMTPEnvelopeCreator does not recognize the textString and therefore does not create an SMTPEnvelope object. Because, in this example, there also is a SNADSEnvelopeCreator known to the EnvelopeCreatorList, it will then be called to make its own attempt to recognize the textString, as represented by the legend "5: createEnvelope( )" on the connecting line from the EnvelopeCreatorList cloud to the SNADSEnvelopeCreator cloud. Next, the SNADSEnvelope( ) object constructor method is called, passing it the textString that is used as input to create the SNADSEnvelope, represented by the legend "6: SNADSEnvelope(textString)". The FIG. 28 scenario does not show that there could be other information used by the constructor to create the SNADSEnvelope object.

As part of the message processing, the AttachmentRef objects must be built. To do this, the createAttachmentRef( ) method is called until there are no more AttachmentRef objects to add to the AttachmentRefList object of a Message. The scenario ends with the completed AttachmentRef objects being returned to the Message constructor within the AttachmentRefList object that is being built.

Figure 29:
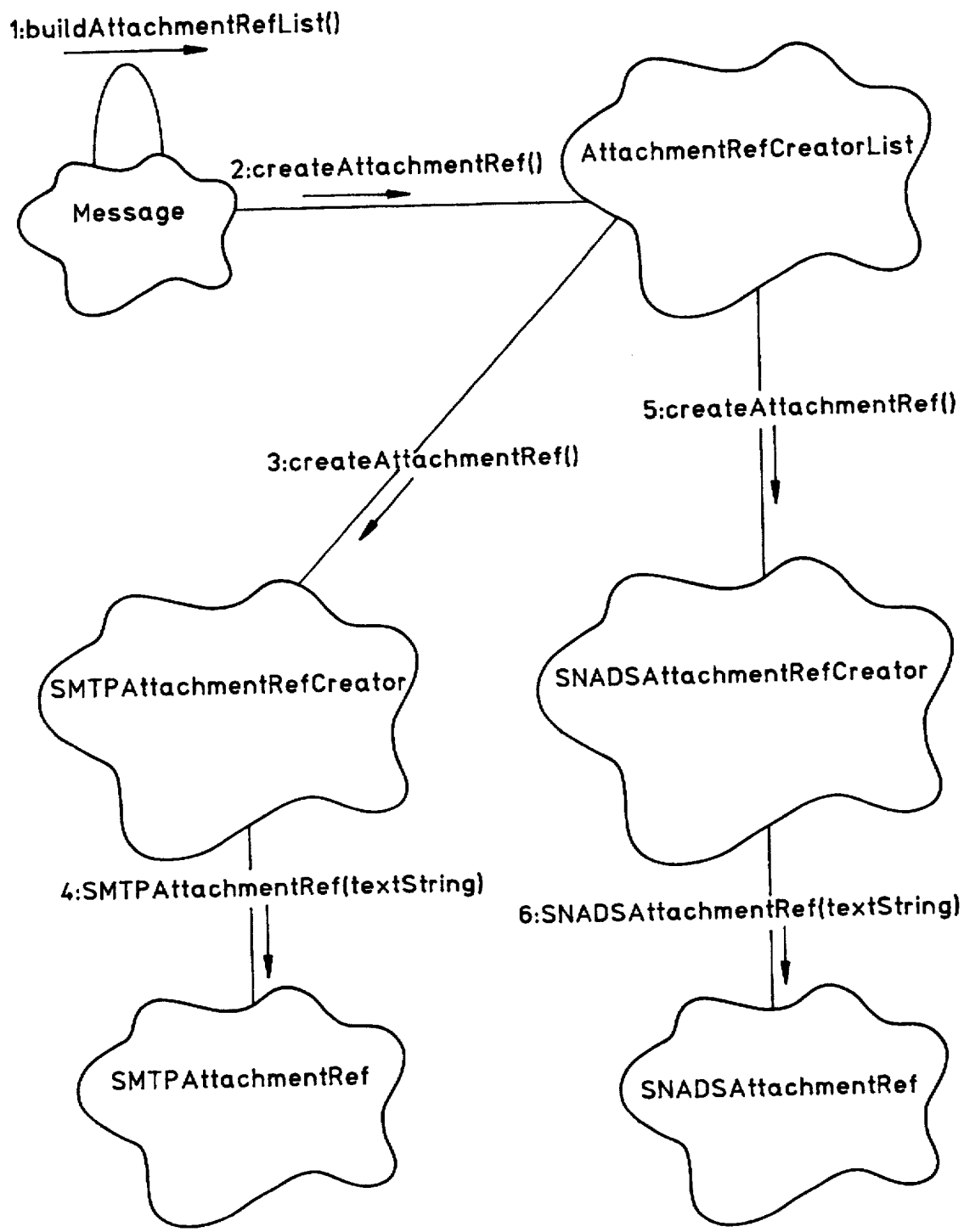
FIG. 29 is an object diagram that represents processing steps executed by the host processor illustrated in FIG. 8 when creating an AttachmentRef object.

As shown in FIG. 29, the AttachmentRef( ) processing begins with a call to the buildAttachmentRefList( ) method to start the processing. The buildAttachmentReList( ) method then calls the createAttachmentRef( ) method to build all AttachmentRefList objects attached to the Message. In this scenario the assumption is that there are at least two attachment reference creators. This is represented by the legend "1: buildAttachmentRefList( )" on the loop at the Message class cloud. Next, the createAttachmentRef( ) method is called against the AttachmentRefCreatorList object. The call is made with a textString that is to be constructed as an AttachmentRef object that will be added to the AttachmentRefList being built for a Message.

The createAttachmentRef( ) method has to invoke each AttachmentRefCreator object that it contains until one of them returns an AttachmentRef object that is added to the AttachmentRefList object. FIG. 29 shows an exemplary scenario having two AttachmentRefCreator objects, in which the first AttachmentRefCreator invoked is for an SMTP address, represented by the connecting line from the AttachmentRefCreatorList object cloud to the SMTPAttachmentRefCreator object cloud with the legend "3: createAttachmentRef( )".

Next, the SMTPAttachmentRef( ) object constructor is called, passing it the textString that is used as input to create the SMTPAttachmentRef. The constructor call is represented by the legend "4: SMTPAttachmentRef(textString)" on the connecting line from the SMTPAttachmentRefCreator object cloud to the SMTPAttachmentRef object cloud. The FIG. 29 scenario does not show that there could be other information used by the constructor to create the SMTPAttachmentRef object.

The createAttachmentRef( ) method is called again as part of this scenario when the SMTPAttachmentRefCreator( ) method does not recognize the textString and therefore does not create an SMTPAttachmentRef object. Because in this example the SNADSAttachmentRefCreator also is known to the AttachmentRefCreatorList object, it will be called to make its own attempt to recognize the textString. This processing is represented by the legend "5: createAttachmentRef( )" on the connecting line from the AttachmentRefCreatorList cloud to the SNADSAttachmentRefCreator object cloud. Next, the SNADSAttachmentRef object constructor is called by the creator object, passing the constructor the textString that is used as input to create the SNADSAttachmentRef object. The scenario does not show that there could be other information used by the constructor to create the SNADSAttachmentRef object. This last object creation processing step is represented by the legend "6: SNADSAttachmentRef(textString)" on the line from the SNADSAttachmentRefCreator cloud to the SNADSAttachmentRef cloud.

Figure 30:
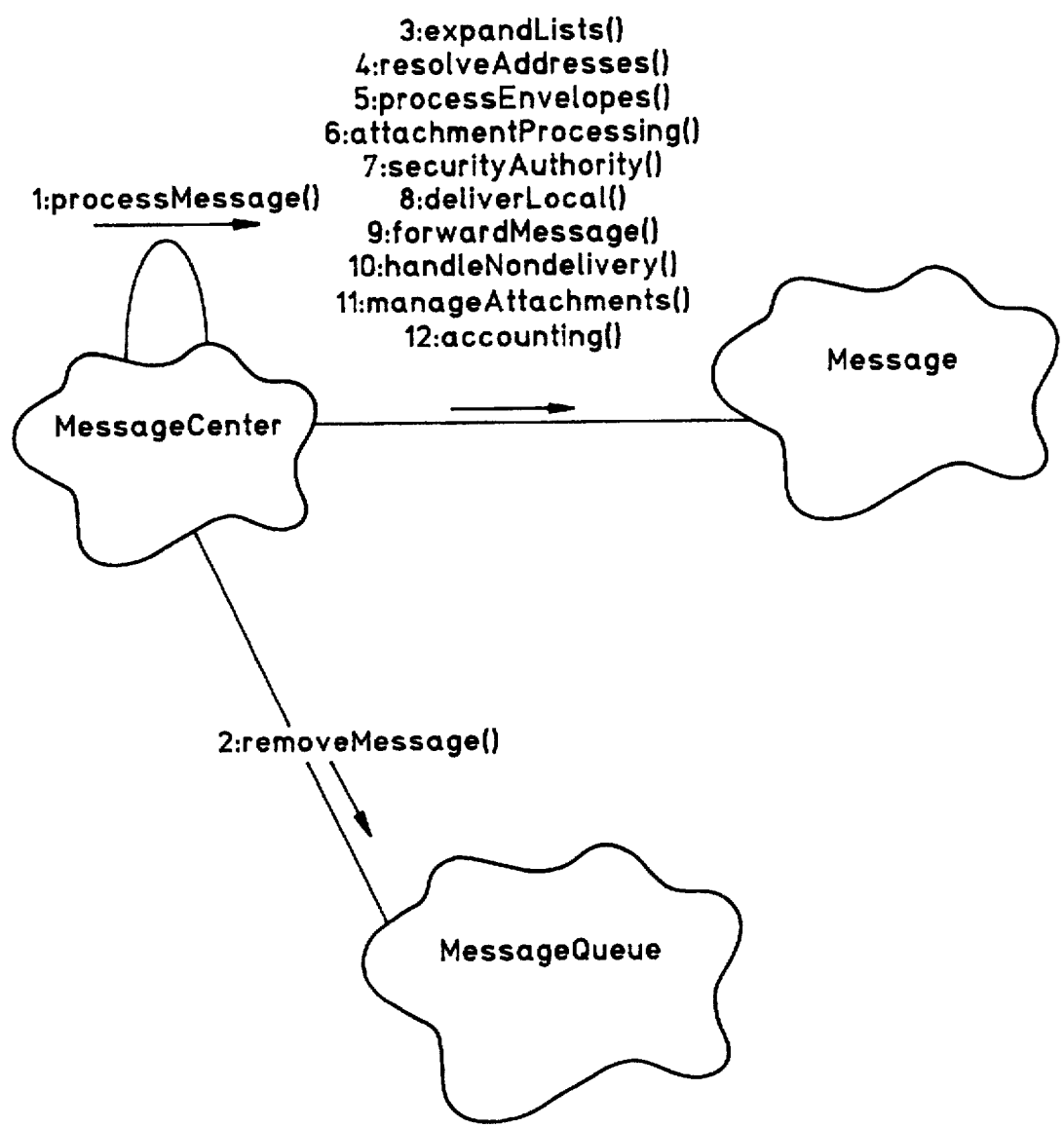
FIG. 30 is an object diagram that represents processing steps executed by the host processor illustrated in FIG. 8 when processing a Message object.

The processing of every Message object is accomplished using the processMessage( ) method. FIG. 30 illustrates the processing steps through which the framework objects interact to control the processing, and shows that the processing begins with the processMessage( ) method call. The processMessage( ) method is called to instruct the MessageCenter object to process each e-mail message, performing the framework's set of steps on each Message object and then deleting that object from the MessageQueue. The step of initially calling processMessage( ) is represented by the legend "1: processMessage( )" on the loop from the MessageCenter object back on itself. The processing continues with a call to the removeMessage( ) method, which gets a Message object to process via the framework. This processing is represented by the legend "2: removeMessage( )" on the line from MessageCenter to MessageQueue. The method returns a Message object to the MessageCenter. The remaining methods are then performed sequentially on the Message object that was removed from the MessageQueue, as described next.

The next step of processing the removed Message object is represented by the legend "3: expandLists( )", which is a call of the expandLists( ) method on the Message object. This method will operate on a Message's recipient list(s) to possibly expand them. The expandList( ) method is described in greater detail below. The next processing step is to call the resolveAddresses( ) method on the Message object. This method will operate on the recipient list objects of a Message to perform the "resolution" for each entry in the UnresolvedRecipientList so that when this method returns there are no more objects in the list. This processing is represented by the legend "4: resolveAddresses( )" on the line from the MessageCenter object cloud to the Message object cloud. The processing of this method is described in greater detail below.

After the addresses are resolved, the processing continues with a call to the processEnvelopes( ) method on the Message object. The method will support any specific extensions to the framework that perform special functions on (or using) Envelope objects in the EnvelopeList. This method call is represented by the legend "5: processEnvelopes( )", which is described in greater detail below. Next, the attachmentProcessing( ) method is called on the Message object. This method will support any specific extensions to the framework that perform special functions on (or using) AttachmentRef objects in the AttachmentRefList. It should be noted that there may not be an AttachmentRefList object for any given instance of a Message object. This processing, represented by "6: attachmentprocessing( )", is described in greater detail below.

The next step of FIG. 30 processing is a call on the securityAuthority( ) method. The securityAuthority( ) method supports any specific extensions to the framework that perform special functions regarding security or authorization. The designer of the framework must decide what, if any, functions this might include and what parts of a Message object might be used by the method. This method also is described in greater detail below, and is represented in FIG. 30 by the legend "7: securityAuthority( )". The next processing step is to call the deliverLocal( ) method on the Message object. The deliverLocal( ) method will support any specific extensions to the framework that perform special functions regarding the local delivery of the contents of an e-mail message. Again, the designer of the framework must decide what, if any, functions this might include and what parts of a Message object might be used by the method. The functions are not part of the framework. The intent of this method is that parts or all of a Message object's information be copied. The deliverLocal( ) method processing is described in greater detail below.

After the local delivery processing is complete, the next step is a call to the forwardMessage( ) method, which supports any specific extensions to the framework that perform special functions regarding the forwarding of the contents of an e-mail message to other parts of a network. The designer of the framework must decide what, if any, functions this might include and what parts of a Message object might be used by the method. The intent is that parts or all of a Message object's information be copied. This step is represented by the legend "9: forwardMessage( )" and is described in greater detail below.

After any e-mail message forwarding, the next step is to call the handleNonDelivery( ) method on the Message object. This method supports any specific extensions to the framework that perform special functions regarding the returning or reporting of the contents of an e-mail message. Once again, the designer of the framework must decide what, if any, functions this might include and what parts of a Message object might be used by the method, and the intent is that parts or all of a Message object's information that must be reported be copied (possibly by creating a new "report" Message object). The handleNonDelivery( ) step is represented by the legend "10: handleNonDelivery( )".

The next step is to call the manageAttachments( ) method on the Message object. The method supports any specific extensions to the framework that perform special functions on (or using) AttachmentRef objects in the AttachmentRefList. Note that there may not be an AttachmentRefList object for any given instance of a Message object. This processing is represented by "11: manageAttachments( )". Finally, the last step is to call the accounting( ) method on the Message object. The accounting step supports any specific extensions to the framework that perform special functions regarding accounting for e-mail messages handled by the framework. The designer of the framework must decide what, if any, functions this might include and what parts of a Message object might be used by the method. The intention is that parts or all of a Message object's information that must be accounted for be copied.

Figure 31:
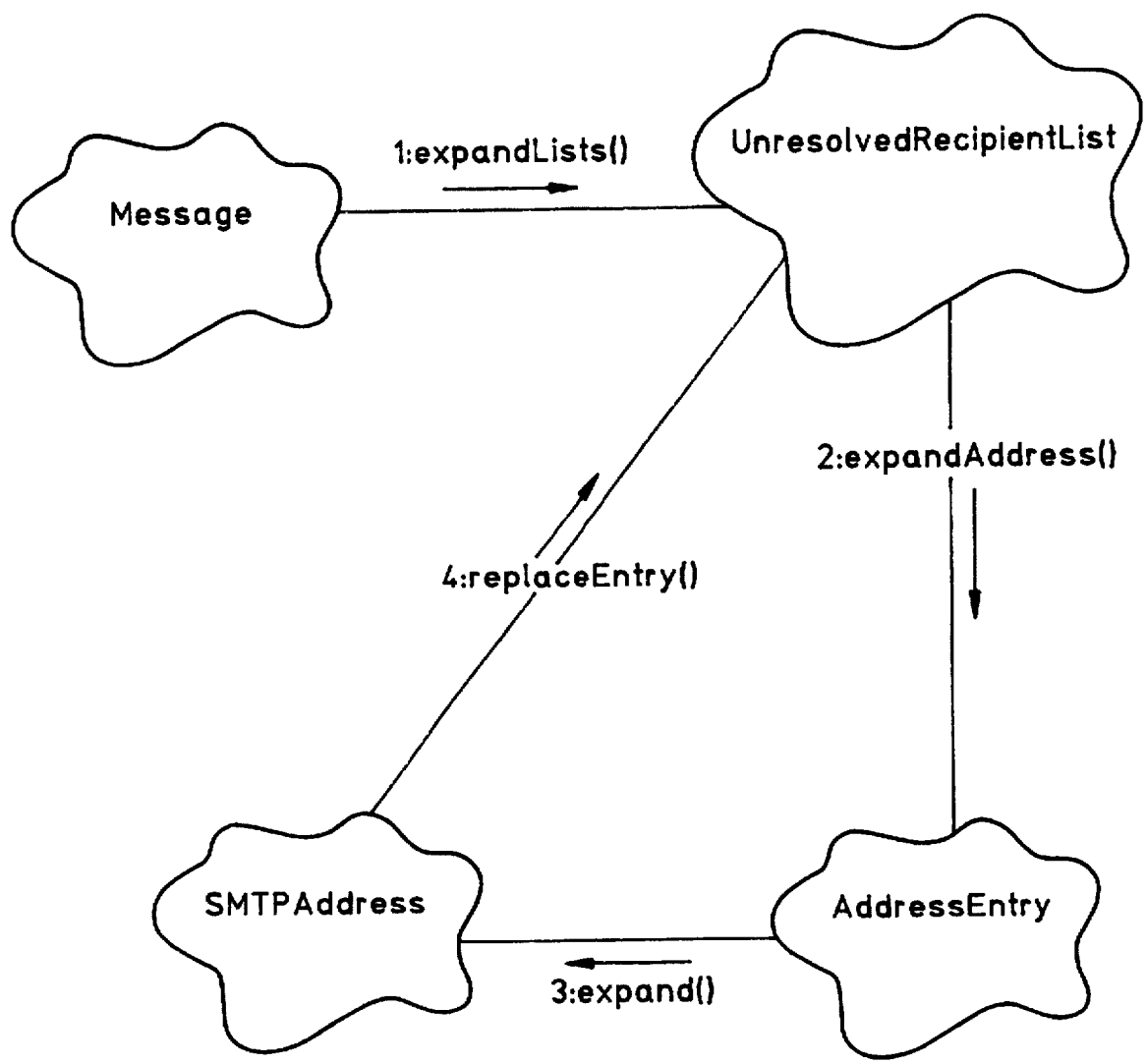
FIG. 31 is an object diagram that represents processing steps executed by the host processor illustrated in FIG. 8 when expanding the AddressEntry objects of a Message object's UnresolvedRecipientList.

As noted above, the expandLists( ) method expands a Message's recipient list(s). FIG. 31 is an illustration of such processing. As shown in FIG. 31, the expandLists( ) method operates on a Message's UnresolvedRecipientList AddressEntry objects to expand them, when required. The beginning of such processing is represented by the "1: expandLists( )" legend on the line from the Message cloud to the UnresolvedRecipientList cloud, which indicates that the object calls the expandLists( ) method of the UnresolvedRecipientList object. Next, the expandLists( ) method calls the expandAddress( ) method for every AddressEntry contained in the UnresolvedRecipientList object, as represented by "2: expandAddress( )" on the line from the UnresolvedRecipientList cloud to the AddressEntry cloud.

Every one of the AddressEntry objects will call the expand method against their address. In this example scenario, this is represented by the "3: expand( )" on the connecting line from the AddressEntry object to a SMTPAddress object (an extension to the framework made by its implementer). If the SMTPAddress object determines that it should be replaced by a list of addresses, it calls the replaceEntry( ) method against the UnresolvedRecipientList object. This processing is represented by "4: replaceEntry( )" on the connecting line from SMTPAddress back to UnresolvedRecipientList.

When the expandLists( ) method has completed, all UnresolvedRecipientList AddressEntry objects will have had an opportunity to expand an e-mail address attached to a Message object. Note that the framework implementer (or whomever sub-classes an Address object) can decide that there is no capability to expand an Address object of this type and in that case can implement a null method that returns to the caller.

It should be noted that not shown in the scenario diagrams is the fact that, since the expandAddresses( ) can result in an UnresolvedRecipientList AddressEntry object being replaced, the expandAddresses( ) method returns an indication to the Message if this has occurred and indicates that there are new UnresolvedRecipientList AddressEntry objects. This indicates to the Message object that it must again call the expandLists( ) method described in the above scenario. This recycling back through these methods will continue as long as new entries are being added to the UnresolvedRecipientList by the expandAddresses method.

Figure 32:
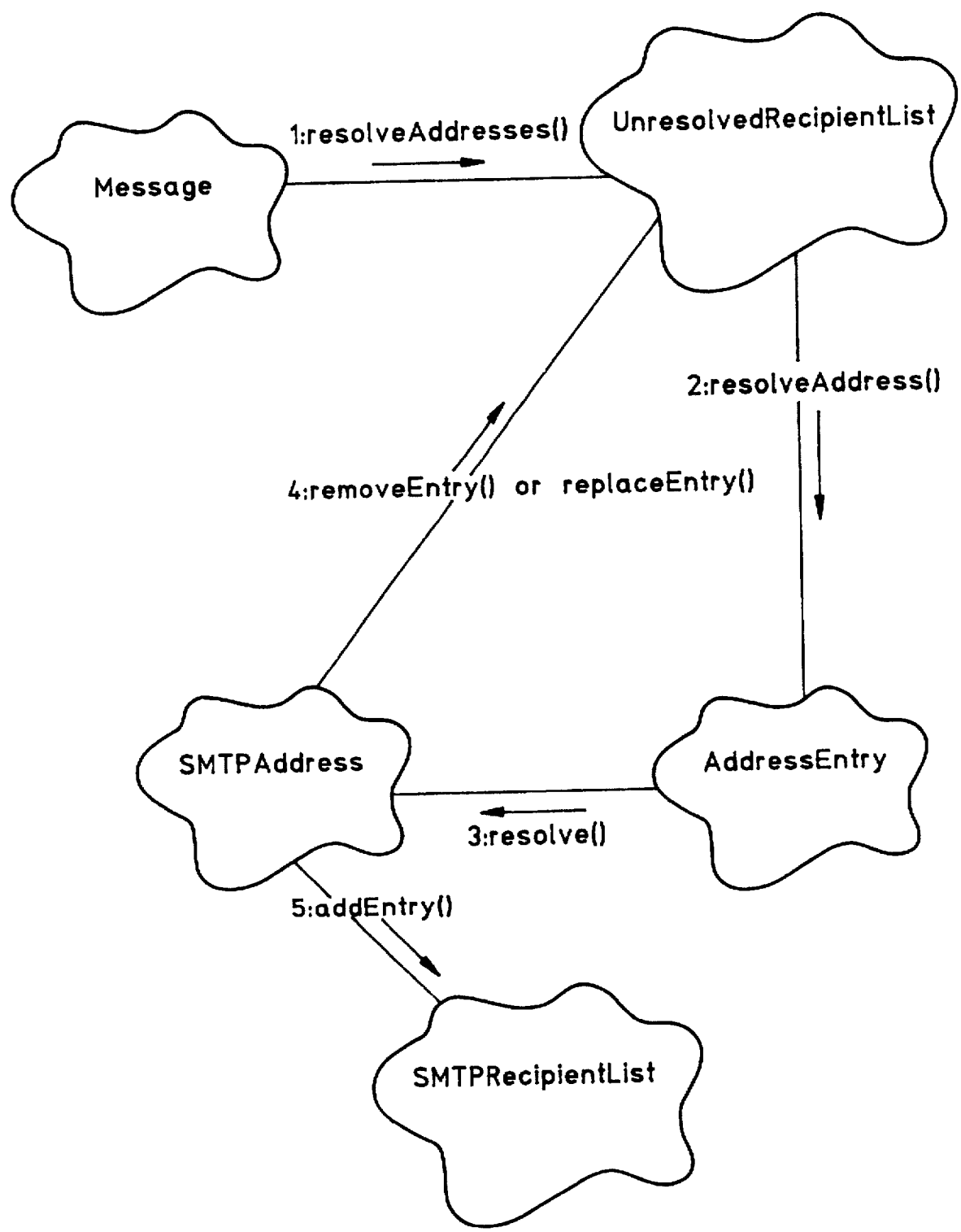
FIG. 32 is an object diagram that represents processing steps executed by the host processor illustrated in FIG. 8 when resolving the AddressEntry objects of a Message object's UnresolvedRecipientList.

As noted above, the resolveAddresses( ) method operates on the Message to resolve each AddressEntry object in the Message's UnresolvedRecipientList. FIG. 32 illustrates such processing in greater detail. To the framework, "resolution" of an AddressEntry object means that the AddressEntry object is removed from the UnresolvedRecipientList class and is placed in another RecipientList object class implemented by a framework extension. The resolving process involves the resolveAddresses( ) method of the Message calling the resolveAddresses( ) method of the UnresolvedRecipientList object. This is represented in FIG. 32 by the connecting line "1: resolveAddresses( )" from the Message object cloud to the UnresolvedRecipientList object cloud.

Next, the resolveAddresses( ) method of the UnresolvedRecipientList object will call the resolveAddress( ) method for every AddressEntry object contained in the UnresolvedRecipientList object. This processing is represented by "2: resolveAddress( )". Next, every AddressEntry object will call the resolve( ) method against its own Address. In this example scenario, this processing is represented by an SMTPAddress object (this object is an extension to the framework made by its implementer) and "3: resolve( )" on the connecting line from the AddressEntry object cloud to the SMTPAddress object cloud. Each Address object determines what it should do in terms of a "resolution". What criteria might be used to make the resolution determination is part of the user implementation of the resolve( ) method and is not defined by the framework. If the SMTPAddress is resolved by becoming part of the SMTPRecipientList object (this object is an extension to the framework made by the framework user), it calls the removeEntry( ) method against the UnresolvedRecipientList object. Alternatively, the resolution of an Address object might result in its AddressEntry being replaced by a different address. This is provided to allow e-mail address "swapping" or "switching" when switching a recipient address as part of the implementation of a gateway between e-mail protocols or possibly e-mail address aliasing. In FIG. 32, this alternative processing is represented by "4: removeEntry( ) or replaceEntry( )" on the line from SMTPAddress to UnresolvedRecipientList.

After e-mail address resolution, the SMTPAddress object will call the addEntry( ) method to add it's AddressListEntry that was removed from UnresolvedRecipientList to the SMTPRecipientList object. This completes the "resolution" shown in this scenario and is represented by "5: addEntry( )" on the connecting line from SMTPAddress to SMTPRecipientList.

When the resolveAddresses method has completed, all AddressEntry objects that started out in the UnresolvedRecipientList class will have had an opportunity to be "resolved" to other RecipientList objects attached to a Message. Note that the framework user (or whomever subclasses an Address object) can decide what action should take place if there are any remaining AddressList objects contained in the UnresolvedRecipientList object before the resolveAddresses( ) method returns to the Message. Other changes to a Message object (such as adding or changing an EnvelopeList object, for example) can be part of the "resolution" of an UnresolvedRecipientList AddressEntry. It is up to the framework user of the resolve( ) method. This is not shown in the scenario diagram.

It should be noted that, not shown in the scenarios, is the fact that, since the resolveAddresses( ) method can result in an UnresolvedRecipientList AddressEntry being replaced, the resolveAddresses( ) method will return an indication to the Message if this has occurred and indicate that there are new UnresolvedRecipientList AddressEntry objects. This indicates to the Message that it must again call the expandAddresses( ) method described in the above scenario and then again must call resolveAddresses( ), as shown in this scenario. This recycling back through the methods will continue as long as new AddressEntry objects are being added to the UnresolvedRecipientList by either the expandAddresses( ) or resolveAddresses( ) methods.

Figure 33:
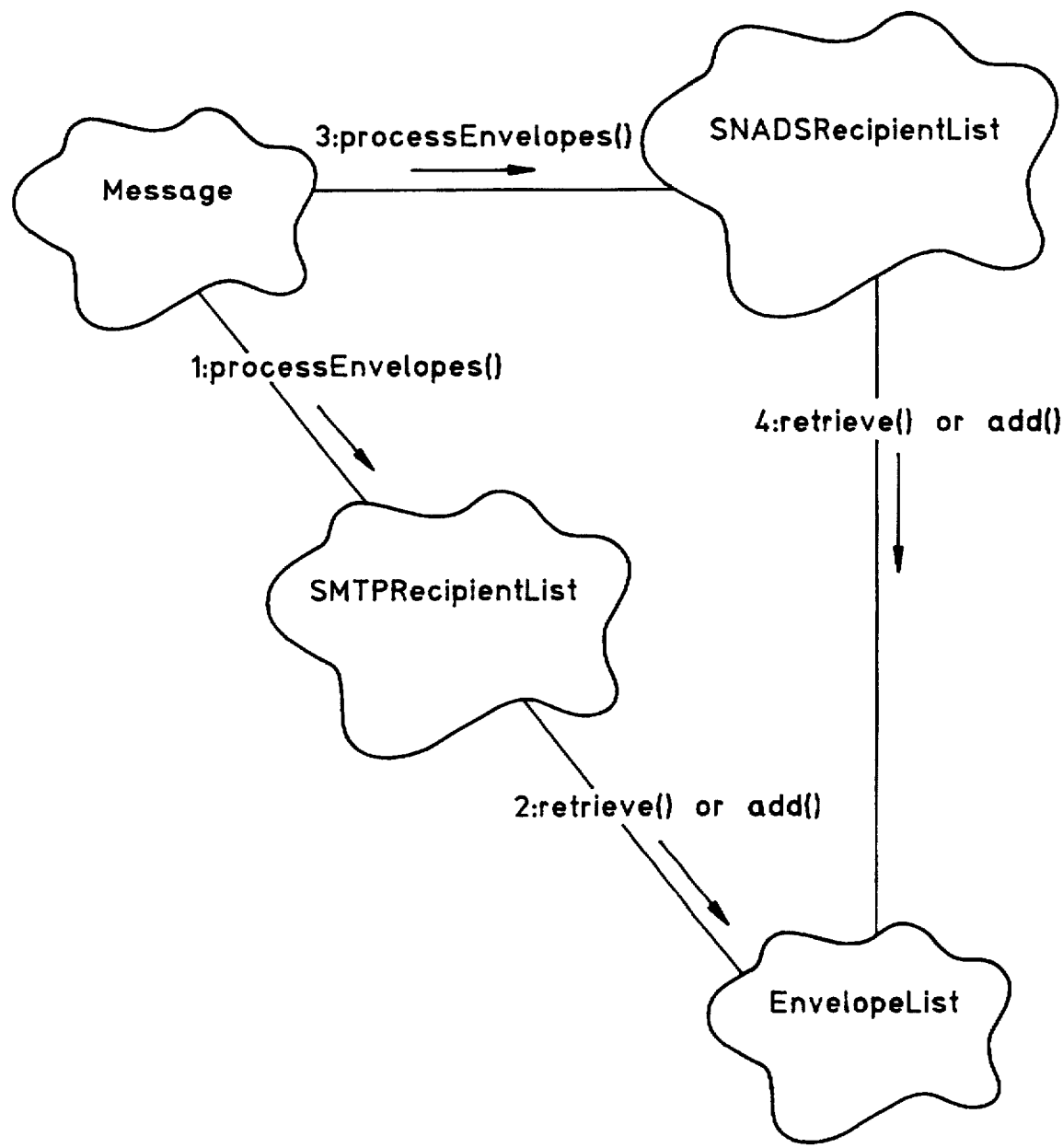
FIG. 33 is an object diagram that represents processing steps executed by the host processor illustrated in FIG. 8 when processing an Envelope object of a message's EnvelopeList.

Each Message includes an Envelope object. These objects are processed with the processEnvelope( ) method called on the Message object, as illustrated in FIG. 33. This method supports any specific extensions to the framework that perform functions on (or using) Envelope objects in the EnvelopeList. It should be noted that the framework assumes any desired Envelope object processing is designed around the kinds of recipient e-mail addresses present on an e-mail message. This means that the createEnvelopes( ) method is implemented as part of the extension of the RecipientList framework object. This is more easily understood when considering the localDelivery( ) or messageForwarding( ) methods. The functions that would be performed on a Message object's information are likely to be completely different for e-mail messages that have SMTP recipients and for e-mail messages that have SNADS recipients (there is at least one AddressEntry in an SNADSRecipientList object). The methods are defined and implemented by the extension of the RecipientList object by the framework user. In fact, all of the following scenarios reflect this major design assumption of the framework and it must be considered by the framework user when designing the extensions to the framework.

First, the createEnvelopes( ) method will call the createEnvelopes( ) method of every RecipientList object attached to the Message. In this scenario the assumption is that there are two of these, an SMTPRecipientList and a SNADSRecipientList. The method is called against the SMTPRecipientList first, as represented by "1: createEnvelopes( )" on the connecting line from the Message object cloud to the SMTPRecipientList object cloud. Next, the createEnvelopes( ) method will call the retrieve( ) or add( ) methods against the EnvelopeList object of the Message object. Such processing is represented by "2: retrieve( ) or add( )" on the connecting line to EnvelopeList. This scenario assumes that an Envelope of an e-mail message is being looked at or possibly added as part of the execution of the call to the createEnvelopes( ) method. The implementer of the createEnvelopes( ) method would design what function createEnvelopes( ) would actually perform on an e-mail message.

Next, the createEnvelopes( ) method of the Message will call the createEnvelopes( ) method of the next RecipientList object attached to the message. The processing in FIG. 33 shows the call "3: createEnvelopes( )" being made against the SNADSRecipientList from the Message object cloud. As before, the createEnvelopes( ) method will call the retrieve( ) or add( ) methods against the EnvelopeList of the Message object, represented by "4: retrieve( ) or add( )". This scenario again assumes that an Envelope of an e-mail message is being looked at or possibly added as part of the execution of the call to processEnvelopes( ).

Figure 34:
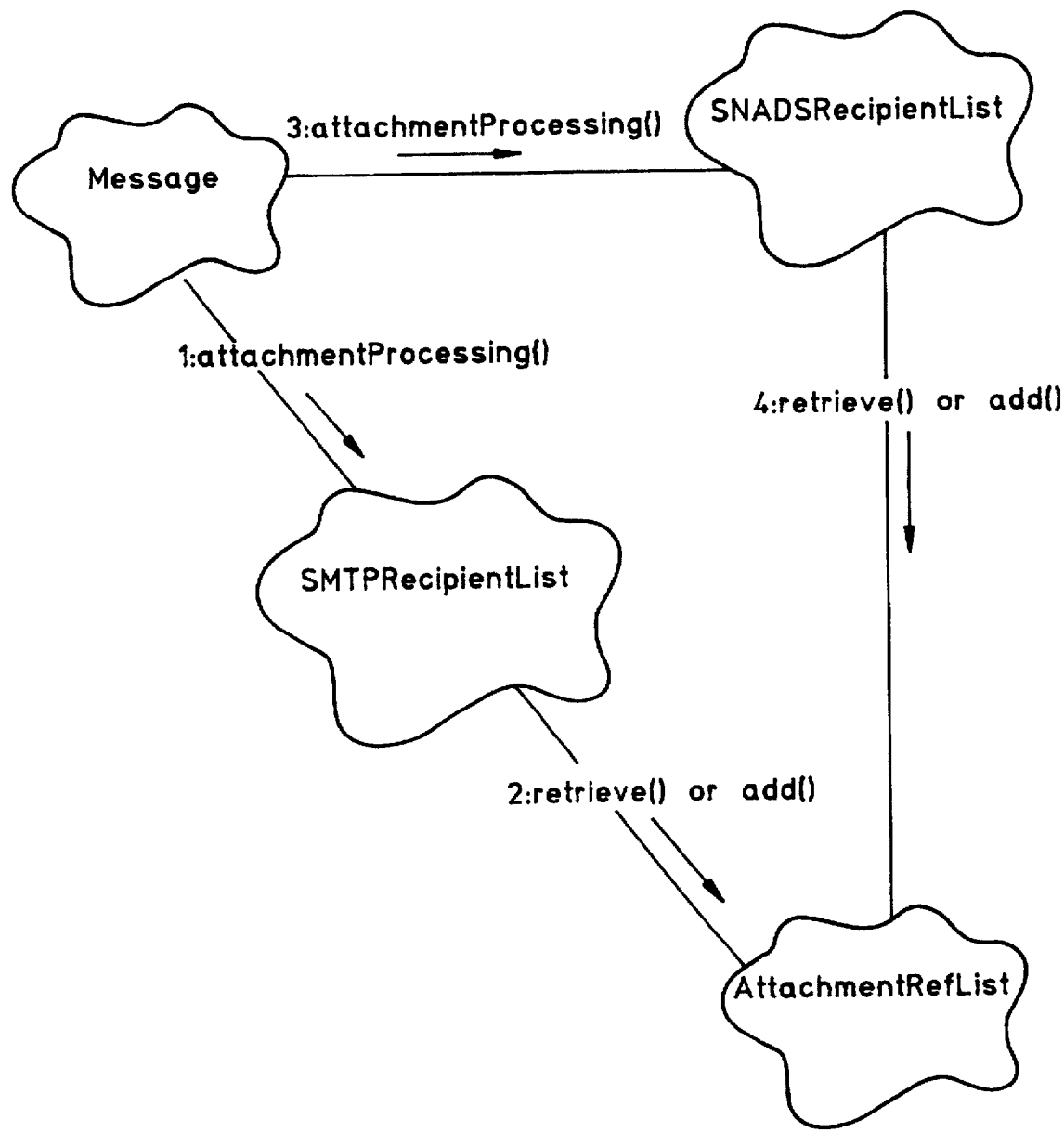
FIG. 34 is an object diagram that represents processing steps executed by the host processor illustrated in FIG. 8 when processing an AttachmentRef object of a message's AttachmentRefList.

In addition to processing of Message objects and Envelope objects, the framework also implements processing of attachments. FIG. 34 illustrates such processing. First, the attachmentprocessing( ) method is called on the Message object. The method supports any specific extensions to the framework that perform special functions on (or using) AttachmentRef objects in the AttachmentRefList. Note that there may not be an AttachmentRefList for any given instance of a Message object.

In the attachment processing, first the attachmentProcessing( ) method of the message will call the attachmentProcessing( ) method of every RecipientList object attached to the message. In this scenario, the assumption is that there are two of these, an SMTPRecipientList and a SNADSRecipientList. The attachmentProcessing( ) method is called against the SMTPRecipientList first, as represented by the "1: attachmentProcessing( )" on the line from the Message cloud to the SMTPRecipientList cloud. Next, the createEnvelopes( ) method will call the retrieve( ) or add( ) methods against the AttachmentRefList of the Message object. This scenario assumes that a referenced attachment of an e-mail message is being looked at or possibly added as part of the execution of the call to attachmentprocessing( ). The implementer of the attachmentProcessing( ) method would design what function attachmentProcessing( ) would actually perform on an e-mail message. This processing is represented in FIG. 34 by "2: retrieve( ) or add( )" on the line to AttachmentRefList.

The next attachment processing step is for the attachmentProcessing( ) method of the message to call the attachmentProcessing( ) method of the next RecipientList object attached to the Message. FIG. 34 shows the call "3: attachmentProcessing( )" being made against the SNADSRecipientList object cloud. Next, the attachmentProcessing( ) will call the retrieve( ) or add( ) methods against the AttachmentRefList of the Message object, as shown by "4: retrieve( ) or add( )". As before, this scenario assumes that a referenced attachment of an e-mail message is being looked at or possibly added as part of the execution of the call to attachmentProcessing( ).

In the preferred embodiment, the framework supports security processing. This is represented in the drawings by FIG. 35, which describes the securityAuthority( ) method. This method is called on the Message object and supports any specific extensions to the framework that perform special functions regarding security or authorization. The designer of the framework must decide what, if any, functions this might include and what parts of a Message object might be used by the method.

Figure 35:
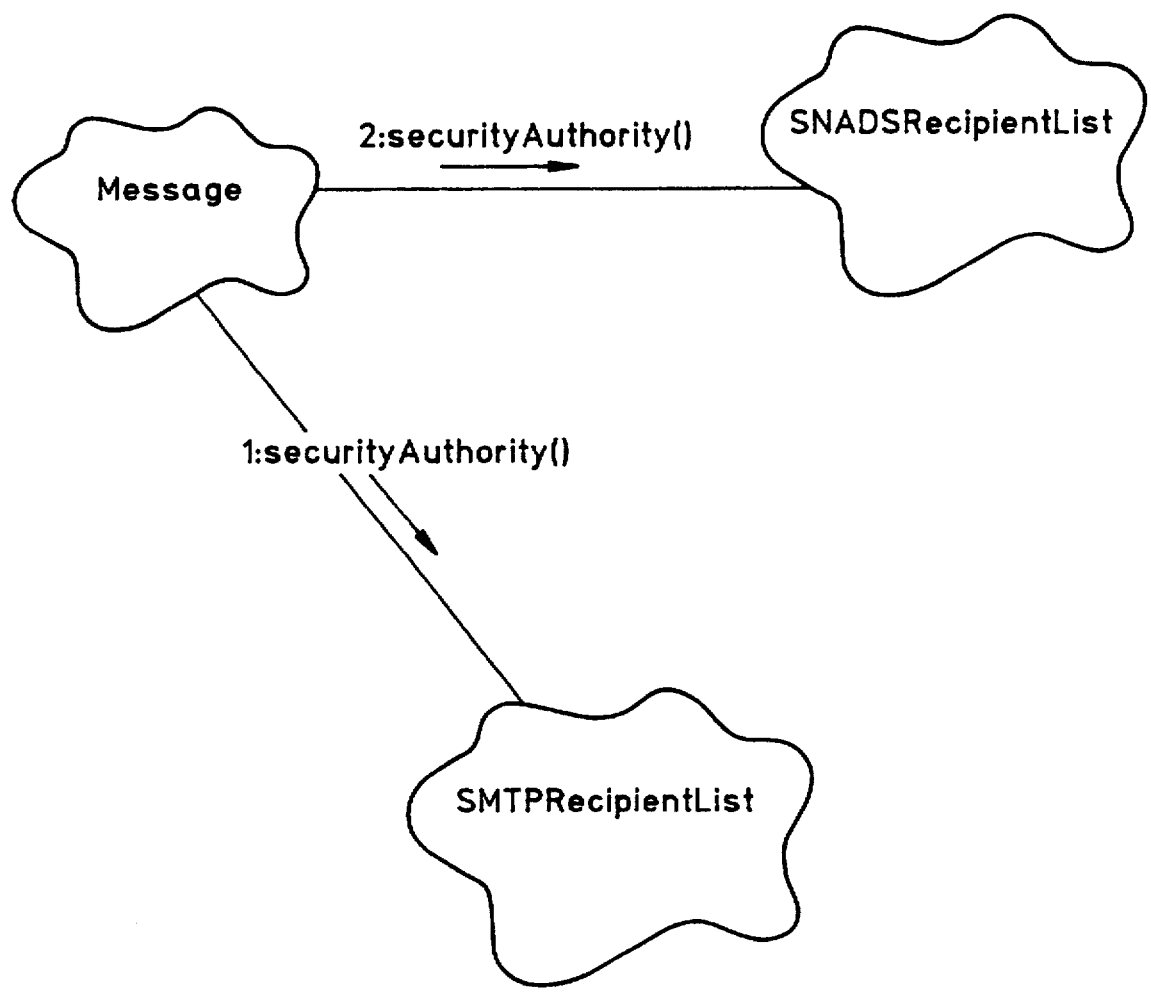
FIG. 35 is an object diagram that represents processing steps executed by the host processor illustrated in FIG. 8 when performing a security authorization function for the mail server system.

In the security processing, first the securityAuthority( ) method of the Message calls the securityAuthority( ) method of every RecipientList object attached to the Message. In this scenario the assumption is that there are two of these, an SMTPRecipientList object and a SNADSRecipientList object. The securityAuthority( ) method is called against the SMTPRecipientList first, represented in FIG. 35 by "1: securityAuthority( )" on the line from Message to SMTPRecipientList. The implementer of the securityAuthority( ) method must design what kind of security or authority function the method provides. Also not shown in this scenario is that any object of the Message can be retrieved (such as OriginatorList, EnvelopeList, or AttachmentRefList) and that object can be used in performing the security or authorization function. Next, the securityAuthority( ) method of the Message will call the securityAuthority( ) method of the next RecipientList object attached to the message. FIG. 35 shows the call being made against the SNADSRecipientList, represented by "2: securityAuthority( )" on the line from Message to SNADSRecipientList.

Figure 36:
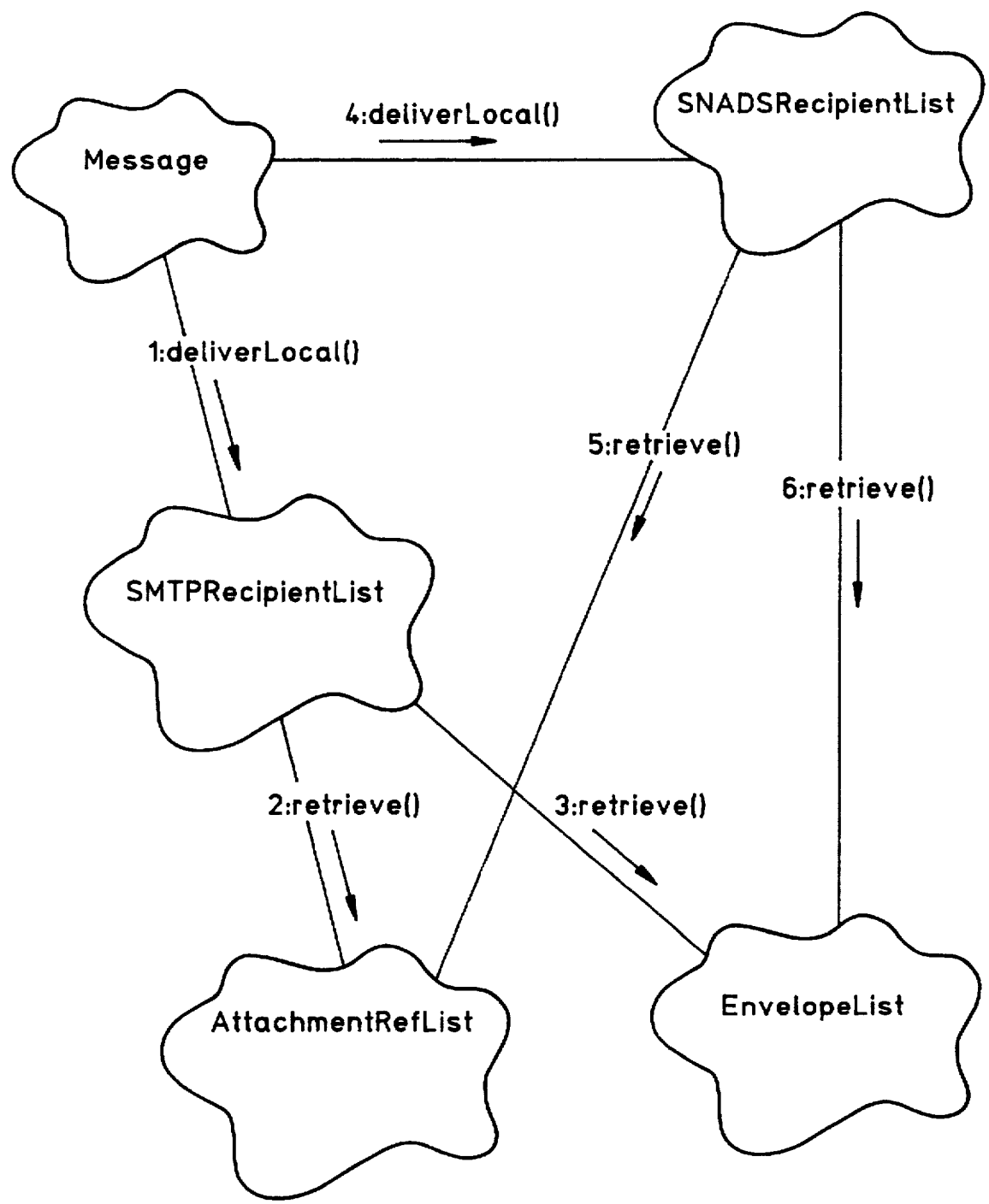
FIG. 36 is an object diagram that represents processing steps executed by the host processor illustrated in FIG. 8 when processing an incoming message for a local (network) delivery.

Some messages will have a local destination, meaning that they are intended for recipients at the same network node location as the operating system. In such a case, the deliverLocal( ) method is used. FIG. 36 illustrates processing for this method. The deliverLocal( ) method is called on the Message object and supports any specific extensions to the framework that perform functions regarding the local delivery of the contents of an e-mail message. The designer of the framework must decide what, if any, functions this might include and what parts of a Message object might be used by the method. The intention is that parts or all of a Message object's information are copied.

FIG. 36 illustrates that, in the processing, first the deliverLocal( ) method is applied to the Message object. This method invokes the deliverLocal( ) method against each of the RecipientLists attached to the message. In the FIG. 36 scenario, the first address list processed is the SMTPRecipientList, as indicated by "1: deliverLocal( )" on the line from Message to SMTPRecipientList. The deliverLocal( ) method is applied to the SMTPRecipientList object to control the delivery of e-mail messages to local recipients. This method invokes the retrieve( ) method on the AttachmentRefList to get the list of AttachmentRef objects associated with the Message, as represented by "2: retrieve( )".

Once the AttachmentRef objects associated with the Message have been retrieved, the retrieve( ) method is invoked against the EnvelopeList class to retrieve an EnvelopeList object. This is represented in FIG. 36 by "3: retrieve( )" on the line to EnvelopeList. Once the AttachmentRef objects and Envelope objects have been retrieved, the deliverLocal( ) method is prepared to go through the SMTPRecipientList to perform the basic delivery functions. This can be done by retrieving each Address entry in the SMTPRecipientList and checking the RecipientData to see if the e-mail message recipient is local or remote. If the e-mail recipient is local, then the processing required to deliver the Message is performed, as determined by the framework user.

Next, the deliverLocal( ) method is applied to the SNADSRecipientList. This method is intended to control the delivery of e-mail messages to local recipients, as indicated by "4: deliverLocal( )" on the line from Message to SNADSRecipientList. This method in turn invokes the retrieve( ) method on the AttachmentRefList to get the list of AttachmentRef objects associated with the Message. This processing is represented by "5: retrieve( )" on the line from SNADSRecipientList to AttachmentRefList. Once the AttachmentRef objects associated with the Message have been retrieved, the retrieve( ) method is invoked against the EnvelopeList to retrieve the EnvelopeList objects. This is represented by "6: retrieve( )" on the connecting line to EnvelopeList. Once the AttachmentRef and Envelope objects have been retrieved, the deliverLocal( ) method is prepared to go through the SNADSRecipientList to perform the basic delivery functions. This can be done by retrieving each Address entry in the SNADSRecipientList and checking the RecipientData to see if the e-mail recipient is local or remote. If the e-mail recipient is local, then the processing required to deliver the Message is performed, as determined by the framework user.

If a Message is not intended for a local e-mail recipient, then it must be forwarded to another part of the network. In that circumstance, another processing routine not part of the framework conveys the e-mail message contents on to another system. Such processing involves the forwardMessage( ) method illustrated in FIG. 37. The forwardMessage( ) method is called on the Message object and supports any specific extensions to the framework that perform functions regarding the forwarding of the contents of an e-mail message to other parts of a network. The designer of the framework must decide what, if any, functions this might include and what parts of a Message object might be used by the method. The intention is that parts or all of a Message object's information are copied.

Figure 37:
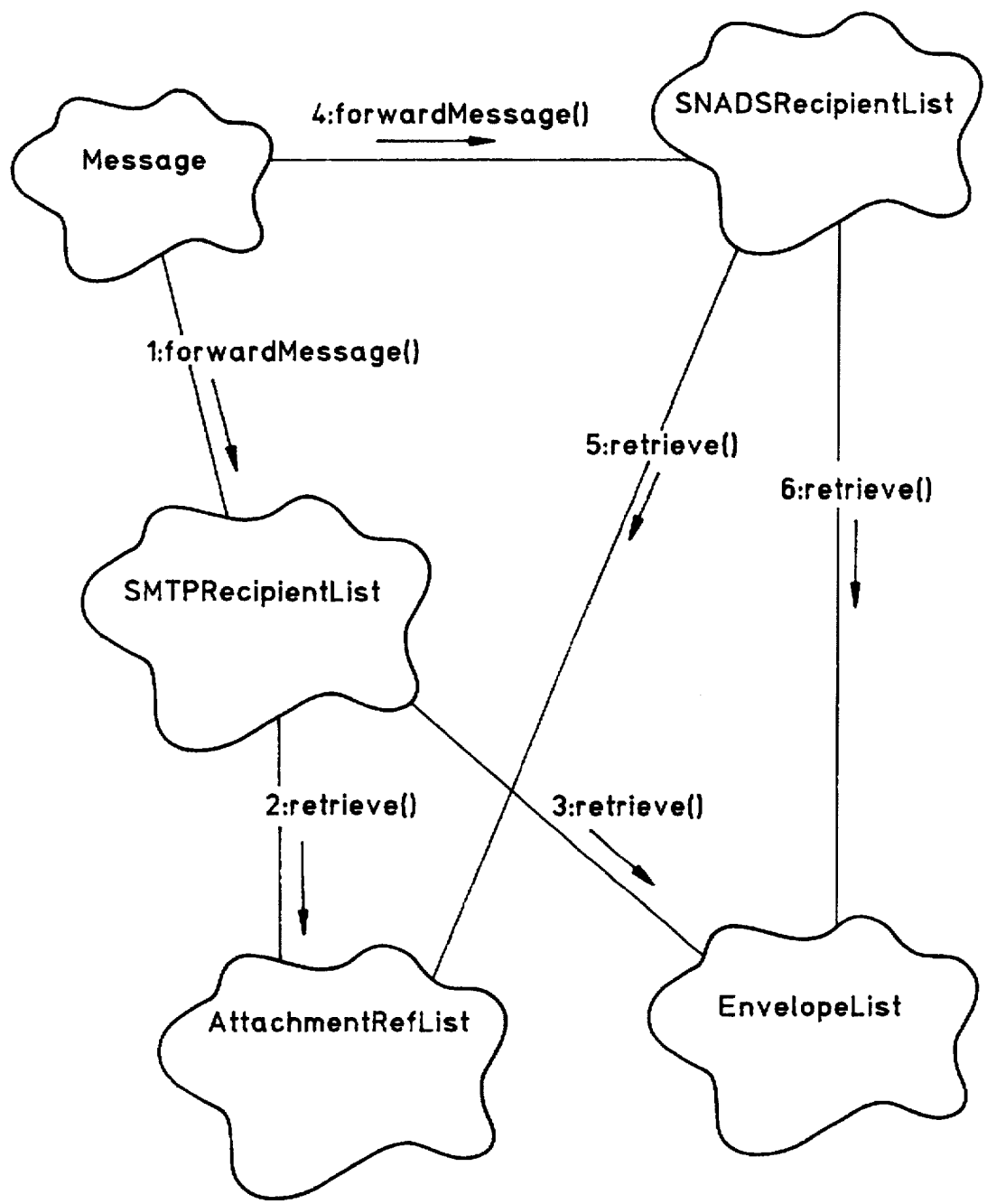
FIG. 37 is an object diagram that represents processing steps executed by the host processor illustrated in FIG. 8 when processing an incoming message to be forwarded on to another network.

The FIG. 37 illustration shows that the forwardMessage( ) method is applied to the Message object and is invoked against each of the RecipientList objects attached to the Message. In this scenario, the first address list processed is the SMTPRecipientList, as represented by "1: forwardMessage( )" on the connecting line from Message to SMTPRecipientList. The forwardMessage( ) method is applied to the SMTPRecipientList to control the delivery of e-mail messages to remote recipients. The method next invokes the retrieve( ) method on the AttachmentRefList to get the list of attachments associated with the message. This processing is represented by "2: retrieve( )".

Once the AttachmentRef objects associated with the Message have been retrieved, the retrieve( ) method is invoked against the EnvelopeList to retrieve the EnvelopeList. This is represented by "3: retrieve( )" on the connecting line from SMTPRecipientList to EnvelopeList. After the Message AttachmentRef and Envelope objects have been retrieved, the forwardMessage( ) method is prepared to go through the SMTPRecipientList to perform the basic delivery functions. This can be done by retrieving each Address entry in the SMTPRecipientList and checking the RecipientData to see if the e-mail recipient is local or remote. If the e-mail recipient is remote, then the processing required to deliver the Message is performed, as determined by the framework user.

Next, the forwardMessage( ) method is applied to the SNADSRecipientList, as indicated by "4: forwardMessage( )" on the line from Message to SNADSRecipientList. The method controls the delivery of e-mail messages to remote e-mail recipients and invokes the retrieve( ) method on the AttachmentRefList to get the list of AttachmentRef objects associated with the Message. This processing is indicated by "5: retrieve( )" on the connecting line to AttachmentRefList. Once the attachments associated with the Message have been retrieved, the retrieve( ) method is invoked against the EnvelopeList to retrieve the EnvelopeList objects, as represented by "6: retrieve( )" on the line to EnvelopeList. Once the AttachmentRef and Envelope objects have been retrieved, the forwardMessage( ) method is prepared to go through the SNADSRecipientList to perform the basic delivery functions. This can be done by retrieving each Address entry in the SNADSRecipientList and checking the RecipientData to see if the e-mail recipient is local or remote. If the e-mail recipient is remote, then the processing required to forward the message is performed, as determined by the framework user.

A nondelivery event occurs when an e-mail message is returned or if a report on an e-mail message is desired. Such events involve the handleNonDelivery( ) method processing illustrated in FIG. 38. The method is called on the Message object and supports any specific extensions to the framework that perform functions regarding the returning or reporting of the contents of an e-mail message. The designer of the framework must decide what, if any, functions this might include and what parts of a Message object might be used by the method. The intent is that parts or all of a Message object's information that must be reported are copied (possibly by creating a new "report" Message object).

Figure 38:
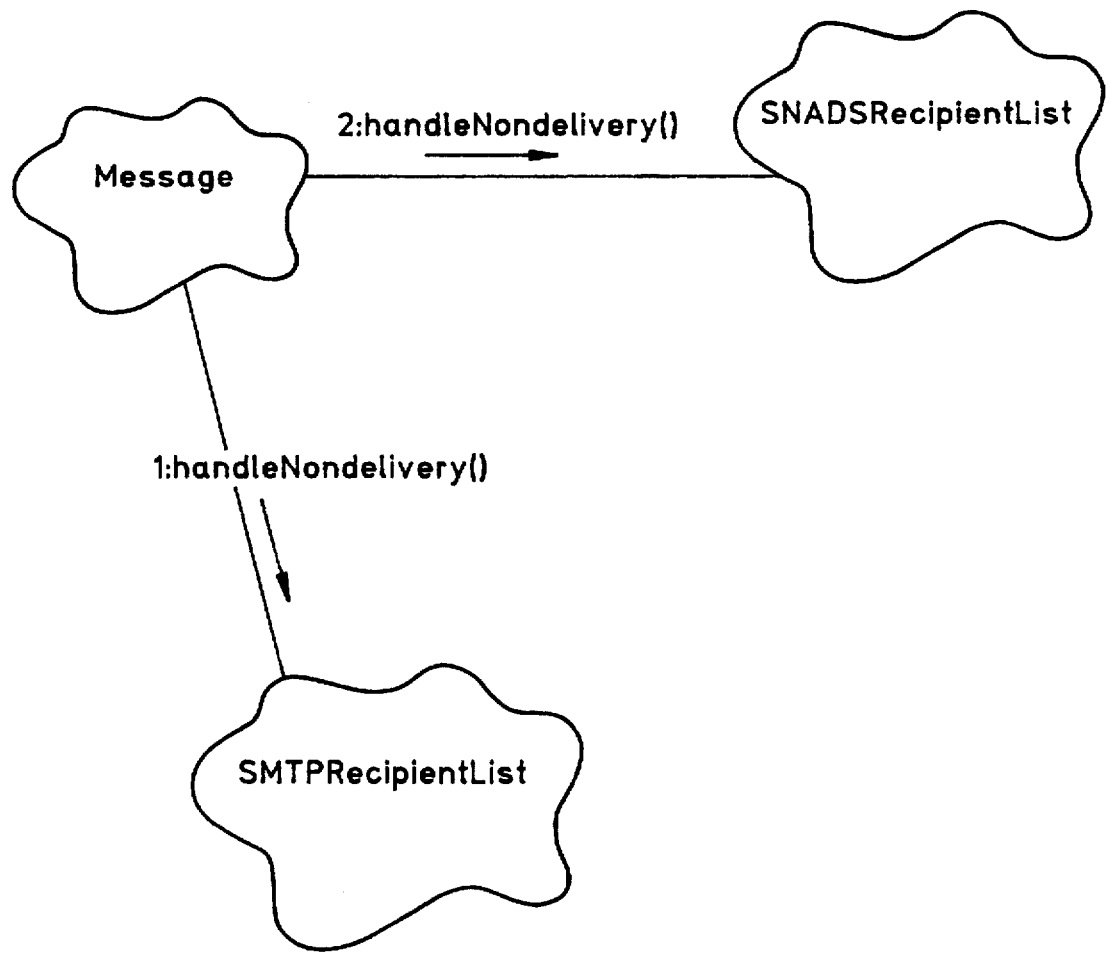
FIG. 38 is an object diagram that represents processing steps executed by the host processor illustrated in FIG. 8 when processing an incoming message to return the message or report on its contents.

FIG. 38 shows the processing begins with the handleNonDelivery( ) method of a Message calling the handleNonDelivery( ) method of each recipientList object attached to the Message. In this scenario there are two of these, an SMTPRecipientList and a SNADSRecipientList. In FIG. 38, the method is called against the SMTPRecipientList object first, as indicated by "1: handleNonDelivery( )" on the connecting line from the Message object cloud to the SMTPRecipientList object cloud. The implementer of the handleNonDelivery( ) method must decide what kind of non-delivery function the method provides. The method is next called against the SNADSRecipientList, as indicated in FIG. 38 by "2: handleNonDelivery( )" on the connecting line from Message to SNADSRecipientList. The implementer of the handleNonDelivery( ) method must decide what kind of non-delivery function the method provides.

In some instances, a Message object might include an AttachmentRefList, which must be processed. This is handled by the manageAttachments( ) method illustrated in FIG. 39. The method is called on a Message object and supports any specific extensions to the framework that perform special functions on (or using) AttachmentRef objects in the AttachmentRefList. Note that there may be no AttachmentRefList for any given instance of a Message object.

Figure 39:
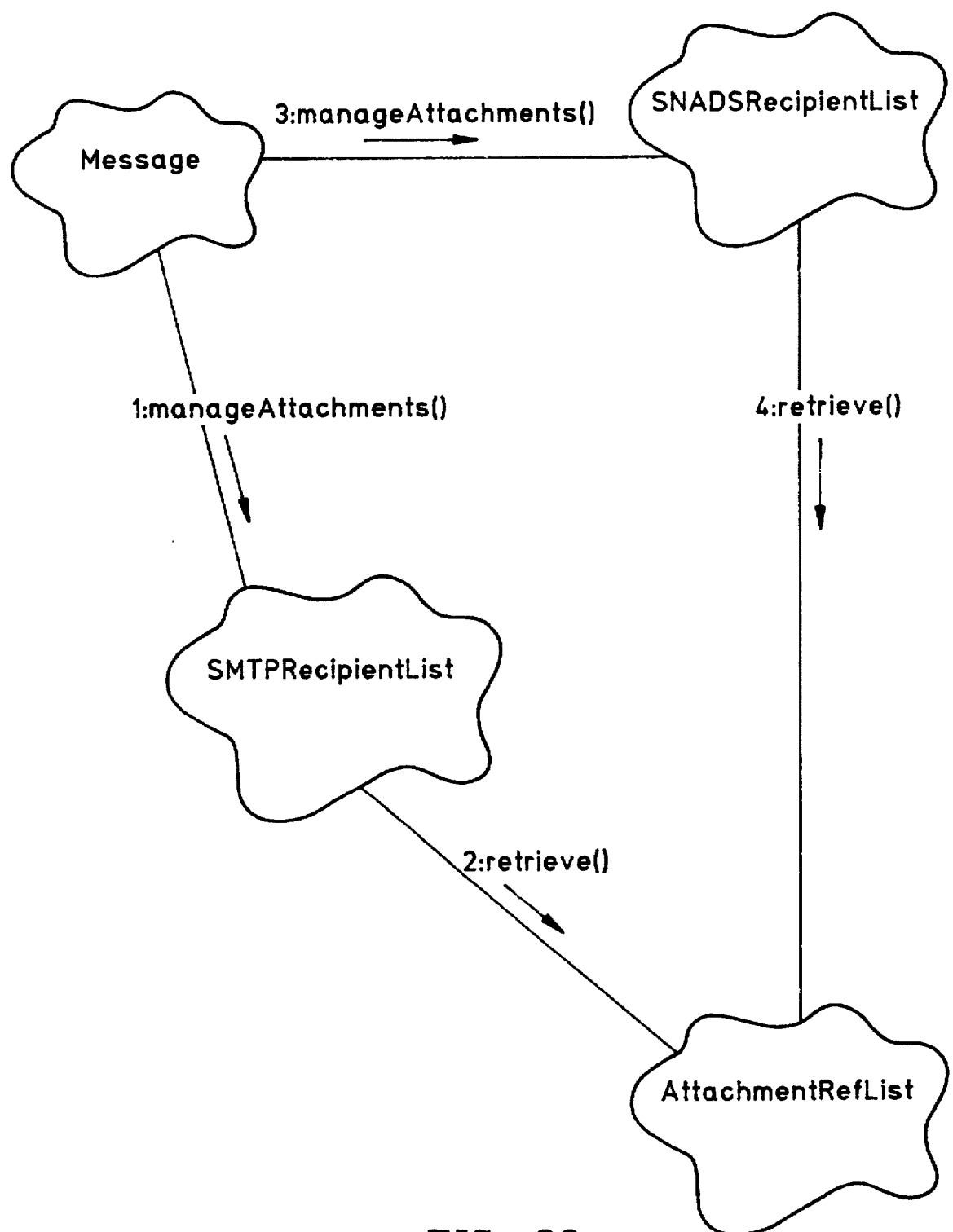
FIG. 39 is an object diagram that represents processing steps executed by the host processor illustrated in FIG. 8 when processing any AttachmentRef objects in a message's AttachmentRefList.

The FIG. 39 processing begins with the manageAttachments( ) method of the Message calling the manageAttachments( ) method of every RecipientList object attached to the Message. In the FIG. 39 scenario the assumption is that there are two of these, an SMTPRecipientList and a SNADSRecipientList. The method is called against the SMTPRecipientList first, as indicated by "1: manageAttachments( )" on the line from Message to SMTPRecipientList. Next, the manageAttachments( ) method will call the retrieve( ) method against the AttachmentRefList of the Message object. This scenario assumes that a referenced attachment of an e-mail message is being looked at or possibly as part of the execution of the call to manageAttachments. The implementer of the manageAttachments( ) method would design what function manageAttachments( ) would actually perform on an e-mail message. This processing step is represented in FIG. 39 by the "2: retrieve( )" legend on the line to AttachmentRefList.

The next processing is for the manageAttachments( ) method of the Message to call the manageAttachments( ) method on the next RecipientList object attached to the Message. FIG. 39 shows the call being made against the SNADSRecipientList, as indicated by "3: manageAttachments( )". Next, the manageAttachments( ) method of the RecipientList will call the retrieve( ) method against the AttachmentRefList, indicated by "4: retrieve( )". As before, this scenario assumes that a referenced attachment of an e-mail message is being looked at as part of the execution of the call to manageAttachments( ).

Figure 40:
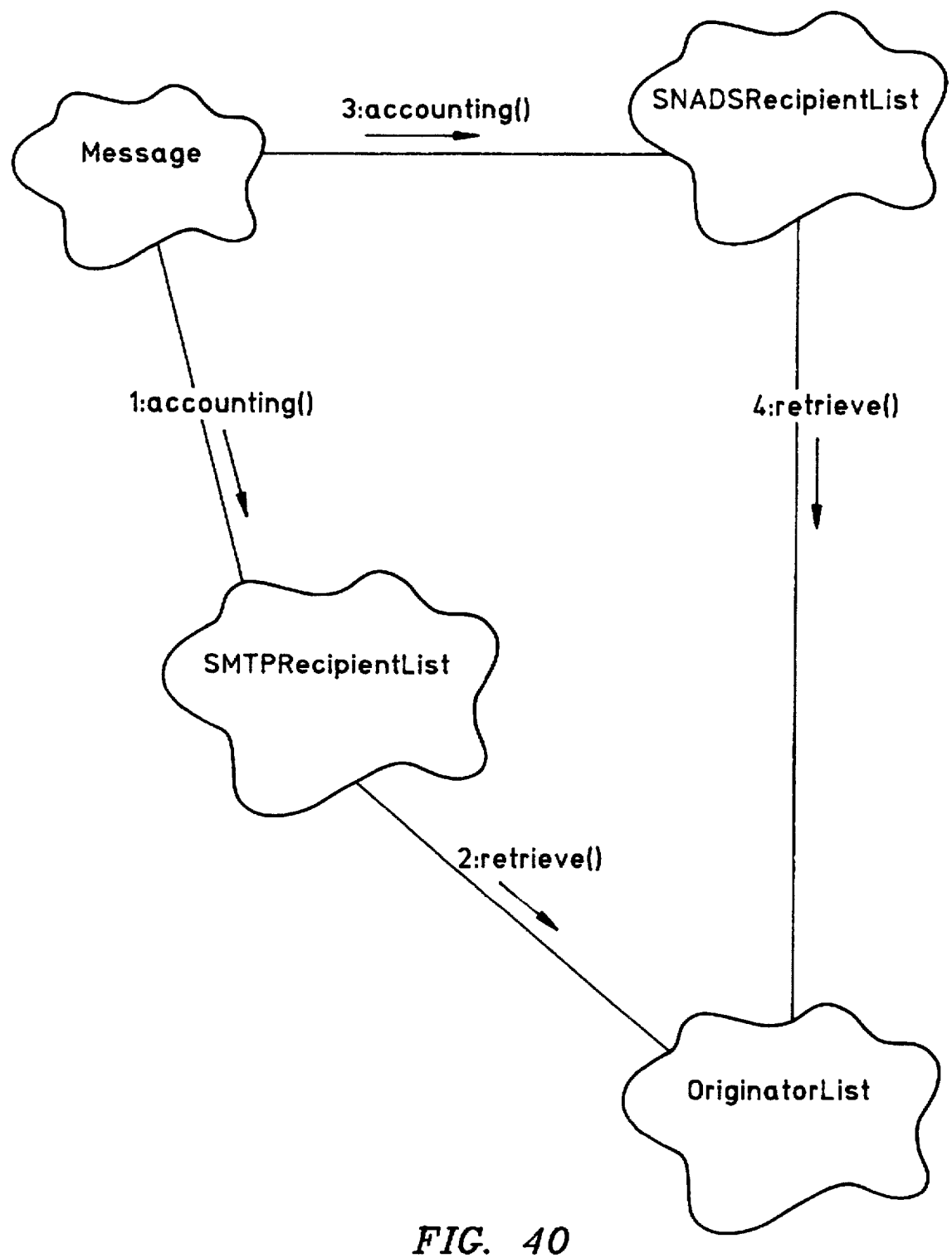
FIG. 40 is an object diagram that represents processing steps executed by the host processor illustrated in FIG. 8 when performing an accounting function for the mail server system.

Finally, the framework provides an accounting function to keep track of charges for message handling and the like. The accounting( ) method illustrated in FIG. 40 is called on the Message object and supports any specific extensions to the framework that perform special functions regarding accounting for e-mail messages handled by the framework. The designer of the framework must decide what, if any, functions this might include and what parts of a Message object might be used by the method. The intent is that parts or all of a Message object's information that must be accounted for are copied.

First, the accounting( ) method of the Message calls the accounting( ) method of every RecipientList object attached to the Message. In this scenario the assumption is that there are two of these, an SMTPRecipientList and a SNADSRecipientList. In FIG. 40, the method is called against the SMTPRecipientList first, as indicated by "1: accounting( )" on the connecting line from the Message object cloud to the SMTPRecipientList object cloud. The accounting( ) method next calls the retrieve( ) method against the OriginatorList of the Message object, indicated by "2: retrieve( )" on the line to the OriginatorList cloud. This scenario assumes that the accounting method looks at the originator address of a piece of e-mail as part of the execution of the call to accounting. The implementer of the accounting method must design what kind of accounting function the method would provide. This scenario does not show that any other object of the Message can be retrieved (such as RecipientList, EnvelopeList, or AttachmentRefList) and that object can be used in performing the accounting function.

In the next processing step, the Message accounting( ) method calls the accounting( ) method on the next RecipientList object attached to the Message. FIG. 40 shows the call being made against the SNADSRecipientList, as indicated by "3: accounting( )" on the connecting line from the Message object cloud to the SNADSRecipientList object cloud. Lastly, the accounting( ) method processing calls the retrieve( ) method against the OriginatorList of the Message object, indicated by "4: retrieve( )" on the connecting line from SNADSRecipientList to OriginatorList. Again, this scenario assumes that the accounting method looks at the originator address of a piece of e-mail as part of the execution of the call to accounting.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2d ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171-228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labelled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation or method names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add animal( )", and "add_containment_unit( )". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of object diagrams rather than interaction diagrams, but those skilled in the art will recognize that they are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

We claim:

1. A computer system comprising:

a central processing unit;

a user interface; and a main memory having an operating system that supports an object-oriented programming environment containing a framework that provides an extensible network mail server processing system that receives an e-mail message from an originating network user and transfers the e-mail message to one or more destination addresses of network users who are intended recipients of the e-mail message, wherein the framework defines a message center object that controls message processing, a message class that contains a set of message objects that comprise originator, recipient, and message content information contained in the e-mail message, and a set of object methods that are used by the message center object to place the information of the e-mail message into the message objects according to a message processing protocol of the e-mail message and process it accordingly;

wherein the message objects include objects belonging to classes comprising a message originator list that identifies the network address of the originating network user, a recipient list that identifies intended recipients of the e-mail message, and an envelope list that contains message attribute information for a message protocol, such that the mail server processing system can be configured to support a plurality of e-mail message protocol standards or mail server functions.

2. A computer system as defined in claim 1, wherein the class of message originator list comprises objects that define an originating user network address and a message protocol type.

3. A computer system as defined in claim 2, wherein the message protocol type is defined by an originating user network address object.

4. A computer system as defined in claim 1, wherein the class of recipient list comprises objects that are defined by a recipient user network address and a recipient address message protocol type.

5. A computer system as defined in claim 4, wherein the recipient list objects of the e-mail message specify a plurality of different message protocol types.

6. A computer system as defined in claim 1, wherein the class of envelope list comprises objects that are defined by a message protocol type.

7. A computer system as defined in claim 6, wherein the envelope list objects of the e-mail message specify a plurality of different message protocol types.

8. A computer system as defined in claim 1, wherein the message objects further include objects belonging to an attachment reference class that identifies information attached to the e-mail message.

9. A computer system as defined in claim 8, wherein the attachment reference class objects specify a plurality of different protocol types of the information attached to the e-mail message.

10. A computer system as defined in claim 1, wherein the object methods include message originator list creator methods that create the originator list objects, recipient list creator methods that create the recipient list objects, and envelope list creator methods that create the envelope objects.

11. A computer system as defined in claim 1, wherein the object methods include envelope list creation methods that determine a message protocol type and create a corresponding envelope object.

12. A computer system as defined in claim 11, wherein the object methods further include an add method that places the e-mail message in a message queue for processing by the message center object.

13. A computer system as defined in claim 11, wherein the object methods further include a retrieve method that retrieves the e-mail message from a message queue for processing by the message center object.

14. A computer system as defined in claim 1, wherein the object methods include an address resolution method that determines a recipient user network address for each member of the recipient list class.

15. A computer system as defined in claim 1, wherein the object methods include a security authorization method that performs message security checking and authorization of an e-mail message.

16. A computer system as defined in claim 1, wherein the object methods include an attachment reference list method that creates attachment list objects containing information attached to the e-mail message.

17. A computer system as defined in claim 1, wherein the message objects further include objects belonging to classes comprising a message originator list, original recipient list, recipient list, and envelope list.

18. A computer system as defined in claim 17, wherein the class of original recipient list contains one or more entry objects, each of which contains one or more objects that are defined by a recipient user network address and a distribution type.

19. A computer system as defined in claim 18, wherein the class of recipient list comprises objects that are defined by a recipient user network address and a recipient address message protocol type.

20. A computer system as defined in claim 19, wherein each recipient user network address specifies a message protocol type.

21. A computer system as defined in claim 19, wherein the message objects include multiple recipient list objects of different message protocols.

22. A computer system as defined in claim 19, wherein the object methods include recipient list resolve methods that create the recipient list objects from the original recipient list entry objects.

23. A computer system as defined in claim 22, wherein the recipient list resolve methods repeatedly operate on the original recipient list entry objects until no additional destination addresses are specified by a distribution type, whereby the distribution type specifies a set of destination addresses corresponding to a single original recipient list entry.

24. A computer system comprising:

a central processing unit;

a user interface;

a network interface through which e-mail messages are received: and a main memory having an operating system that supports an object-oriented programming environment containing a framework that defines a message center object that controls message processing, a message class that contains a set of message objects that define originator, recipient, and message content information contained in a received e-mail message, and a set of object methods that are used by the message center object to place the information contained in the received e-mail message into the message objects according to a message processing protocol of the e-mail message and process it accordingly;

wherein the message objects include objects belonging to classes comprising a message originator list that identifies the network address of the originating network user, a recipient list that identifies intended recipients of the e-mail message, and an envelope list that contains message attribute information for a message protocol such that the mail server processing system can be configured to support a plurality of e-mail message protocol standards or mail server functions.

25. A computer system as defined in claim 24, wherein the class of message originator list comprises objects that define an originating user network address and a message protocol type.

26. A computer system as defined in claim 25, wherein the message protocol type is defined by an originating user network address object.

27. A computer system as defined in claim 24, wherein the class of recipient list comprises objects that are defined by a recipient user network address and a recipient address message protocol type.

28. A computer system as defined in claim 27, wherein the recipient list objects of the e-mail message specify a plurality of different message protocol types.

29. A computer system as defined in claim 24, wherein the class of envelope list comprises objects that are defined by a message protocol type.

30. A computer system as defined in claim 29, wherein the envelope list objects of the e-mail message specify a plurality of different message protocol types.

31. A computer system as defined in claim 24, wherein the message objects further include objects belonging to an attachment reference class that identifies information attached to the e-mail message.

32. A computer system as defined in claim 31, wherein the attachment reference class objects specify a plurality of different protocol types of the information attached to the e-mail message.

33. A computer system as defined in claim 24, wherein the object methods include message originator list creator methods that create the originator list objects, recipient list creator methods that create the recipient list objects, and envelope list creator methods that create the envelope objects.

34. A computer system as defined in claim 24, wherein the object methods include envelope list creation methods that determine a message protocol type and create a corresponding envelope object.

35. A computer system as defined in claim 34, wherein the object methods further include an add method that places the e-mail message in a message queue for processing by the message center object.

36. A computer system as defined in claim 34, wherein the object methods further include a retrieve method that retrieves the e-mail message from a message queue for processing by the message center object.

37. A computer system as defined in claim 24, wherein the object methods include an address resolution method that determines a recipient user network address for each member of the recipient list class.

38. A computer system as defined in claim 24, wherein the object methods include a security authorization method that performs message security checking and authorization of an e-mail message.

39. A computer system as defined in claim 24, wherein the object methods include an attachment reference list method that creates attachment list objects containing information attached to the e-mail message.

40. A computer system as defined in claim 24, wherein the message objects further include objects belonging to classes comprising a message originator list, original recipient list, recipient list, and envelope list.

41. A computer system as defined in claim 40, wherein the class of original recipient list contains one or more entry objects, each of which contains one or more objects that are defined by a recipient user network address and a distribution type.

42. A computer system as defined in claim 41, wherein the class of recipient list comprises objects that are defined by a recipient user network address and a recipient address message protocol type.

43. A computer system as defined in claim 42, wherein each recipient user network address specifies a message protocol type.

44. A computer system as defined in claim 42, wherein the message objects include multiple recipient list objects of different message protocols.

45. A computer system as defined in claim 42, wherein the object methods include recipient list resolve methods that create the recipient list objects from the original recipient list entry objects.

46. A computer system as defined in claim 45, wherein the recipient list resolve methods repeatedly operate on the original recipient list entry objects until no additional destination addresses are specified by a distribution type, whereby the distribution type specifies a set of destination addresses corresponding to a single original recipient list entry.

47. An object oriented framework for use in a computer system connected to a network, the computer system receiving e-mail messages from originating network users and having an operating system that supports an object oriented programming environment that maintains a message center object that controls e-mail message processing, a message class comprising a set of message objects that comprise originator, recipient, and message content information contained in a received e-mail message, and a set of object methods that are used by the message center object to place the information of the received e-mail message into the message objects according to a message processing protocol of the received e-mail message and process it accordingly;

wherein the message class objects include objects belonging to classes comprising a message originator list that identifies the network address of the originating network user, a recipient list that identifies intended recipients of the e-mail message, and an envelope list that contains message attribute information for a message protocol, such that the mail server processing system can be configured to support a plurality of e-mail message protocol standards or mail server functions.

48. A framework as defined in claim 47, wherein the class of message originator list comprises objects that define an originating user network address and a message protocol type.

49. A framework as defined in claim 48, wherein the message protocol type is defined by an originating user network address object.

50. A framework as defined in claim 47, wherein the class of recipient list comprises objects that are defined by a recipient user network address and a recipient address message protocol type.

51. A framework as defined in claim 50, wherein the recipient list objects of the e-mail message specify a plurality of different message protocol types.

52. A framework as defined in claim 47, wherein the class of envelope list comprises objects that are defined by a message protocol type.

53. A framework as defined in claim 52, wherein the envelope list objects of the e-mail message specify a plurality of different message protocol types.

54. A framework as defined in claim 47, wherein the message objects further include objects belonging to an attachment reference class that identifies information attached to the e-mail message.

55. A framework as defined in claim 54, wherein the attachment reference class objects specify a plurality of different protocol types of the information attached to the e-mail message.

56. A framework as defined in claim 47, wherein the object methods include message originator list creator methods that create the originator list objects, recipient list creator methods that create the recipient list objects, and envelope list creator methods that create the envelope objects.

57. A framework as defined in claim 47, wherein the object methods include envelope list creation methods that determine a message protocol type and create a corresponding envelope object.

58. A framework as defined in claim 57, wherein the object methods further include an add method that places the e-mail message in a message queue for processing by the message center object.

59. A framework as defined in claim 57, wherein the object methods further include a retrieve method that retrieves the e-mail message from a message queue for processing by the message center object.

60. A framework as defined in claim 47, wherein the object methods include an address resolution method that determines a recipient user network address for each member of the recipient list class.

61. A framework as defined in claim 47, wherein the object methods include a security authorization method that performs message security checking and authorization of the e-mail message.

62. A framework as defined in claim 47, wherein the object methods include an attachment reference list method that creates attachment list objects containing information attached to the e-mail message.

63. A framework as defined in claim 47, wherein the message objects further include objects belonging to classes comprising a message originator list, original recipient list, recipient list, and envelope list.

64. A framework as defined in claim 63, wherein the class of original recipient list contains one or more entry objects, each of which contains one or more objects that are defined by a recipient user network address and a distribution type.

65. A framework as defined in claim 64, wherein the class of recipient list comprises objects that are defined by a recipient user network address and a recipient address message protocol type.

66. A framework as defined in claim 65, wherein each recipient user network address specifies a message protocol type.

67. A framework as defined in claim 65, wherein the message objects include multiple recipient list objects of different message protocols.

68. A framework as defined in claim 65, wherein the object methods include recipient list resolve methods that create the recipient list objects from the original recipient list entry objects.

69. A framework as defined in claim 68, wherein the recipient list resolve methods repeatedly operate on the original recipient list entry objects until no additional destination addresses are specified by a distribution type, whereby the distribution type specifies a set of destination addresses corresponding to a single original recipient list entry.

70. A program product for use in a computer system having an operating system that supports an object-oriented programming environment, the program product comprising:
 a recordable media; and
 a framework recorded on the recordable media the framework providing an extensible network mail server processing system that receives an e-mail message from an originating network user and transfers the e-mail message to one or more destination addresses of network users who are intended recipients of the e-mail message;
 wherein the framework defines a message center object that controls message processing, a message class that contains a set of message objects that comprise originator, recipient, and message content information contained in the e-mail message, and a set of object methods that are used by the message center object to place the information of the e-mail message into the message objects according to a message processing protocol of the e-mail message and process it accordingly; and
 wherein the message class objects include objects belonging to classes comprising a message originator list that identifies the network address of the originating network user, a recipient list that identifies intended recipients of the e-mail message, and an envelope list that contains message attribute information for a message protocol, such that the mail server processing system can be configured to support a plurality of e-mail message protocol standards or mail server functions.

71. A program product as defined in claim 70, wherein the class of message originator list comprises objects that define an originating user network address and a message protocol type.

72. A program product as defined in claim 71, wherein the message protocol type is defined by an originating user network address object.

73. A program product as defined in claim 70, wherein the class of recipient list comprises objects that are defined by a recipient user network address and a recipient address message protocol type.

74. A program product as defined in claim 73, wherein the recipient list objects of the e-mail message specify a plurality of different message protocol types.

75. A program product as defined in claim 70, wherein the class of envelope list comprises objects that are defined by a message protocol type.

76. A program product as defined in claim 75, wherein the envelope list objects of the e-mail message specify a plurality of different message protocol types.

77. A program product as defined in claim 70, wherein the message objects include objects belonging to an attachment reference class that identifies information attached to the e-mail message.

78. A program product as defined in claim 77, wherein the attachment reference class objects specify a plurality of different protocol types of the information attached to the e-mail message.

79. A program product as defined in claim 70, wherein the object methods include message originator list creator methods that create the originator list objects, recipient list creator methods that create the recipient list objects, and envelope list creator methods that create the envelope objects.

80. A program product as defined in claim 70, wherein the object methods include envelope list creation methods that determine a message protocol type and create a corresponding envelope object.

81. A program product as defined in claim 80, wherein the object methods further include an add method that places the e-mail message in a message queue for processing by the message center object.

82. A program product as defined in claim 80, wherein the object methods further include a retrieve method that retrieves the e-mail message from a message queue for processing by the message center object.

83. A program product as defined in claim 70, wherein the object methods include an address resolution method that determines a recipient user network address for each member of the recipient list class.

84. A program product as defined in claim 70, wherein the object methods include a security authorization method that performs message security checking and authorization of the e-mail message.

85. A program product as defined in claim 70, wherein the object methods include an attachment reference list method that creates attachment list objects containing information attached to the e-mail message.

86. A program product as defined in claim 70, wherein the message objects further include objects belonging to classes comprising a message originator list, original recipient list, recipient list, and envelope list.

87. A program product as defined in claim 86, wherein the class of original recipient list contains one or more entry objects, each of which contains one or more objects that are defined by a recipient user network address and a distribution type.

88. A program product as defined in claim 87, wherein the class of recipient list comprises objects that are defined by a recipient user network address and a recipient address message protocol type.

89. A program product as defined in claim 88, wherein each recipient user network address specifies a message protocol type.

90. A program product as defined in claim 88, wherein the message objects include multiple recipient list objects of different message protocols.

91. A program product as defined in claim 88, wherein the object methods include recipient list resolve methods that create the recipient list objects from the original recipient list entry objects.

92. A program product as defined in claim 91, wherein the recipient list resolve methods repeatedly operate on the original recipient list entry objects until no additional destination addresses are specified by a distribution type, whereby the distribution type specifies a set of destination addresses corresponding to a single original recipient list entry.

* * * * *

UNITED STATES PATENT AND TRADEMARK OFFICE
CERTIFICATE OF CORRECTION

PATENT NO.   :   5,768,505
DATED        :   June 16, 1998
INVENTOR(S)  :   Gilchrist, et al It is certified that error appears in the above-identified patent and that said Letters Patent is hereby corrected as shown below:

Col. 46, Line 38, after "protocol" insert a --,--.

Col. 46, Line 50, "arc" should be --are--.

Col. 49, Line 42, after "media" insert a --,--.

Signed and Sealed this

Sixth Day of October, 1998

Attest:

Attesting Officer

BRUCE LEHMAN

Commissioner of Patents and Trademarks